United States Patent [19]
Friedrich et al.

[11] Patent Number: 5,276,877
[45] Date of Patent: Jan. 4, 1994

[54] DYNAMIC COMPUTER SYSTEM PERFORMANCE MODELING INTERFACE

[76] Inventors: Karl S. Friedrich, 2 Whitewood Rd., Worcester County, Milford, Mass. 01757; Ann R. Bousquet, 18 Causeway St., Middlesex County, Hudson, Mass. 01749

[21] Appl. No.: 599,221

[22] Filed: Oct. 17, 1990

[51] Int. Cl.⁵ .............................................. G06F 3/153
[52] U.S. Cl. ................................ 395/650; 364/DIG. 2
[58] Field of Search ............ 364/DIG.; 395/200, 325, 395/500, 600, 650, 700, 725, 800, 100, 155, 156, 157, 158, 159, 160, 161

[56] References Cited

U.S. PATENT DOCUMENTS 4,449,182  4/1984  Robison et al. ................... 132/75.6
4,560,985 12/1980  Strecker et al. .................. 340/825.5
4,849,879  7/1989  Chinnaswamy ............. 395/DIG. 1

OTHER PUBLICATIONS

"DE Ccp Reference Manual", Digital Equipment Corporation (Dec. 1989) pp. iii-Al.
"NetCenter Graphic Network Monitor", U.S. West Network Systems, Inc. (1987) pp. 5-22.

*Primary Examiner*—Robert B. Harrell
*Attorney, Agent, or Firm*—Al Cefalo; Denis Maloney

[57] ABSTRACT

A modeling system provides a display of a computer system's configuration along with selected system metrics. An operator can change the configuration by using the display and display commands. Metrics representative of the performance of the computer system would then be determined for the changed configuration, and could presented along with the display of the new system configuration.

47 Claims, 66 Drawing Sheets

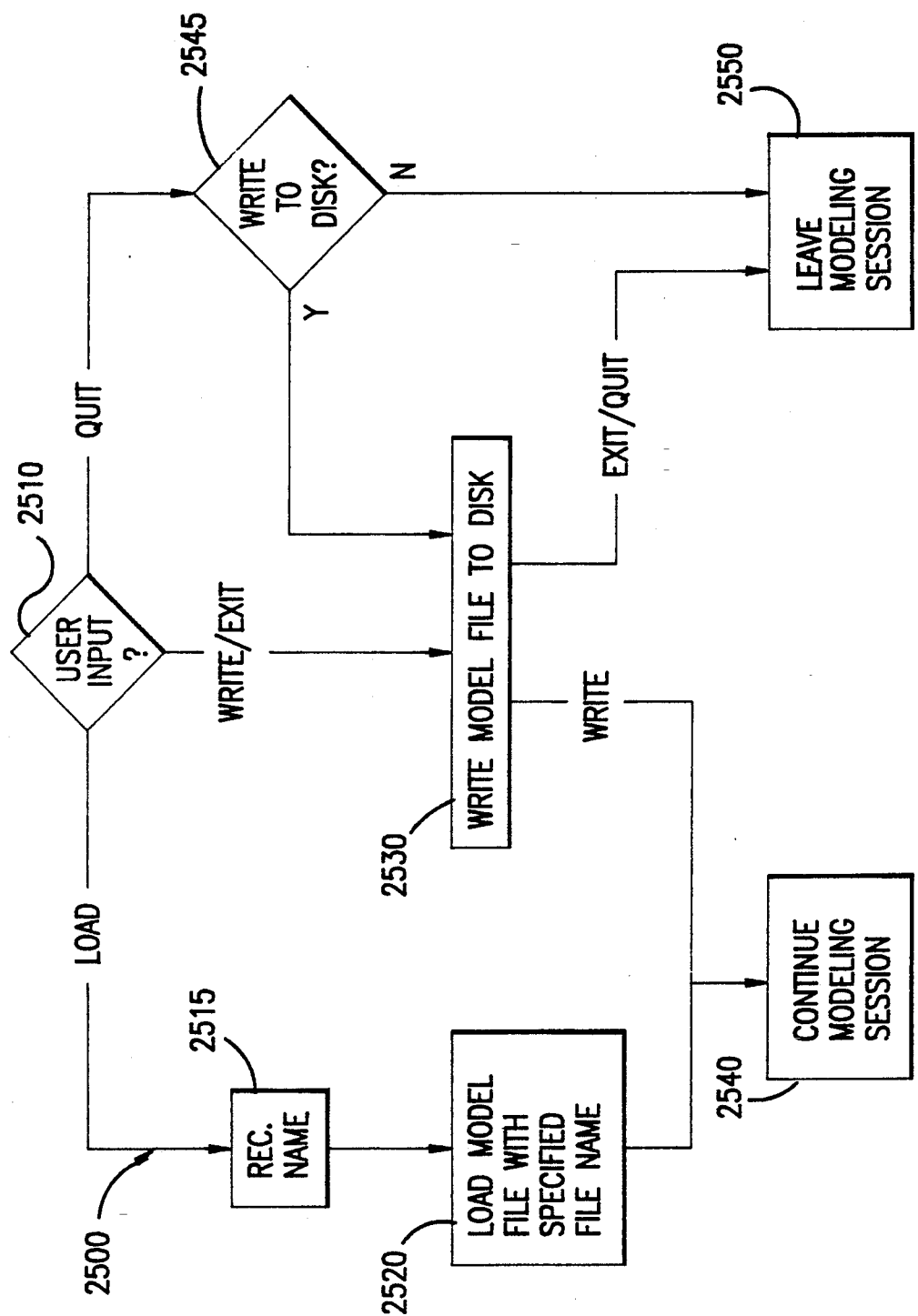

MOVE 50% OF WORKLOAD FROM CPU1 TO CPU2 AND CPU3

BEFORE

CPU1
(25%)

CPU2
(35%)

CPU3
(40%)

AFTER

CPU1
(12.5%)

CPU2
(41.25% OR 40.83%)

CPU3
(46.25% OR 46.67%)

FIG. 30

DYNAMIC COMPUTER SYSTEM PERFORMANCE MODELING INTERFACE

BACKGROUND OF THE INVENTION

The present invention relates to the field of automatic performance analysis and capacity planning and, more specifically, to the field of automatic performance analysis and capacity planning of computer systems which have been modified in response to interactive operator input.

Performance analysis in computer systems is used to determine the effectiveness and efficiency of a computer system's management of its workloads. The term "workload" refers to processes running on a computer system. Different types of processes are often treated as different workloads. For example, word processing is often considered as one workload even though several computer system users are operating word processing programs. Similarly, spreadsheets could be considered as a distinct workload.

Each workload requires system resources, such as CPU (central processing unit) processing time or disk capacity. Performance analysis is designed to facilitate the management of such system resources.

In carrying out performance analysis, one must always measure some values for computer system and component parameters in order to determine efficiency and efficacy. The parameter being measured have been referred to as "metrics." Examples of metrics are the number of cache in a particular time period, or the length of a device's queue. Metrics are discussed more fully in U.S. Pat. No. 4,849,879 to Chinnaswamy et al., which is incorporated herein by reference.

The metrics reflect the performance of the computer system in a particular configuration. The term "configuration" is used to refer not only to the types and interconnection of physical components, but also to the distribution of the workloads among the components.

Most conventional methods of performance analysis and capacity planning involve presenting selected information in reports. The reports are usually tabular presentations of data. Usually several different kinds of reports are needed for analysis. For example, one report might indicate the system configuration in terms of components, another report might indicate the system configuration in terms of workload, and another report may list certain metrics of interest.

One performance analysis and capacity planning product which generates tabular reports is the DECcp or DEC Capacity Planner for VMS made available by Digital Equipment Corporation for use with certain VAX computers. This product collects, reduces, analyzes, models and reports data in a tabular format for purposes of computer system capacity planning. Another such product is the VAX Performance Advisor made available by Digital Equipment Corporation to provide information useful in analyzing the performance of certain VAX computers.

Although the tabular presentation of data may be acceptable for determining the performance of a computer system in one configuration, it does not lend itself well to analyzing the performance of the computer system if its configuration were modified. Such analysis is important in determining whether and how to reconfigure a system.

For example, if performance analysis indicated an overload or bottleneck condition in a computer system, the system should be tuned or reconfigured to alleviate such conditions. It is not always apparent, however, which tuning or reconfiguration is the most appropriate. Physical reconfiguration of a system without knowing whether that reconfiguration will be effective is both impractical and costly.

To avoid unnecessary or incorrect reconfiguration, system engineers try to construct a model based upon actual system parameters. In this way, modeling may be used to measure the impact of certain actions on system performance before physically reconfiguring a computer system.

Modeling can also be used in sales. If a modeling technique were not too cumbersome, salespeople could use it to determine whether additional components were needed for a particular customer, or whether a customer's problems or needs could be handled in other ways.

Conventional performance analysis systems, however, do not lend themselves well to such uses. A common means of performing modeling involves using the information gathered as part of the performance analysis to calculate the effect of reconfiguring a computer system. This is both time consuming and inaccurate.

Systems such as the DECcp system will perform certain automated calculations, however, the calculations are presented in a tabular format, which may again require the use of several sheets or tables to analyze results.

It is therefore desirable to provide a mechanism for performance analysis that allows for a more meaningful presentation of performance information.

Another desire is to provide an improved mechanism for changing the configurations of the computer system, at least in a virtual sense, to determine the effects of such changes.

An additional desire would be to provide an improved mechanism for presenting the effects of the changes in configuration in a manner which allows ready decision making.

Additional advantages of this invention will be set forth in part in the description which follows and in part will be obvious from that description, or may be learned by practice of this invention. The advantages of this invention may be realized and attained by means of the instrumentalities and combinations particularly pointed in the appended claims.

SUMMARY OF THE INVENTION

To achieve the objects and in accordance with the purpose of the invention, as embodied and broadly described herein, the present invention provides a display of a computer system's configuration along with selected system metrics. An operator can change the configuration by using the display. Metrics representative of the performance of the computer system would then be determined for the changed configuration, and could be presented along with the display of the new system configuration.

More particularly, a method of evaluating the performance of a computer system described by a configuration representing physical devices, the connections of the physical devices in the computer system, and workloads which are processes that use system resources provided by the physical devices, comprises the steps, executed by a modeling data processor, of: creating a model of the configuration of the computer system in the modeling data processor; displaying, on a visual display device coupled to the data processor, a diagram of the configuration of the computer system; receiving an input to modify the configuration of the computer system; modifying the model of the computer system in response to the received input to reflect the modified configuration of the computer system; determining new values of selected metrics for the modified model of the computer system, metrics including measurable values representative of the performance of the computer system; and displaying on the visual display device a diagram of the modified configuration of the computer system.

A data structure, according to the present invention, for use in modeling a computer system containing a plurality of physical devices supporting a plurality of workloads resides in a modeling data processor and comprises a plurality of first data entries organized into an easily modifiable first data structure, each of the first data entries corresponding to a different physical device of the computer system, and a plurality of second data entries organized into an easily modifiable second data structure, each of the second entries corresponding to one of the workloads which the devices in the computer system support by supplying system resources to the workloads. The first entries include device identification means for identifying the corresponding physical device, and device data structure means for indicating a hierarchical relationship in the computer system configuration of the corresponding device with selected other ones of the physical devices. The second entries each include workload pointer means for identifying the corresponding workload, device pointer means for associating the corresponding workload with the ones of the devices supporting the corresponding workload, and probability means for quantifying the system resources supplied to the corresponding workload by the associated one of the physical devices.

Additionally, a modeling system of this invention for facilitating analysis of a computer system comprises: data structure means for holding physical device information and workload information, both representative of the configuration of the computer system, and metrics information representative of the performance of the computer system; change means, coupled to the data structure means, for receiving requests to modify the physical device information; solver means, coupled to the data structure means, for determining values for metrics information for the computer system from the physical device information and the workload information in the data structure means; and user interface means, coupled to the change means and to the data structure means, for providing an interface to a user of the modeling system. The data structure means includes configuration context means for storing the physical configuration information and the workload information. The changer means includes data structure modification means for transmitting to the data structure means, in response to the received requests, commands to modify the representation of the computer system configuration. The user interface means includes means for transmitting to the change means the requests to modify the physical device information made by a user, and means for displaying a diagram of the configuration of the computer system, including values for the metrics information.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIG. 3 (b) is a diagram of another preferred implementation of the modeling interface of this invention;

FIGS. 5(a), 5(b), 5(c), 5(d), 5(e), 5(f), 5(g), 5(h), 5(i), 5(j), 5(k), 5(l), 5(m), 5(n), 5(o), 5(p), 5(q), 5(r), 5(s), 5(t), 5(u), 5(v), 5(w), 5(x), 5(y), 5(z), 5(aa), 5(bb), 5(cc), 5(dd), 5(ee), 5(ff), 5(gg), 5(hh) and through 5(ii) are screen displays generated during the operation of the preferred implementation of the modeling interface of this invention;

FIG. 25 includes a flow diagram for the preferred implementation of the FILE procedure shown in FIG. 24;

FIG. 30 is a diagram for explaining how the loads are distributed according to the preferred implementation of the MOVE procedure in FIG. 29;

DESCRIPTION OF THE PREFERRED IMPLEMENTATIONS

Figure 1:
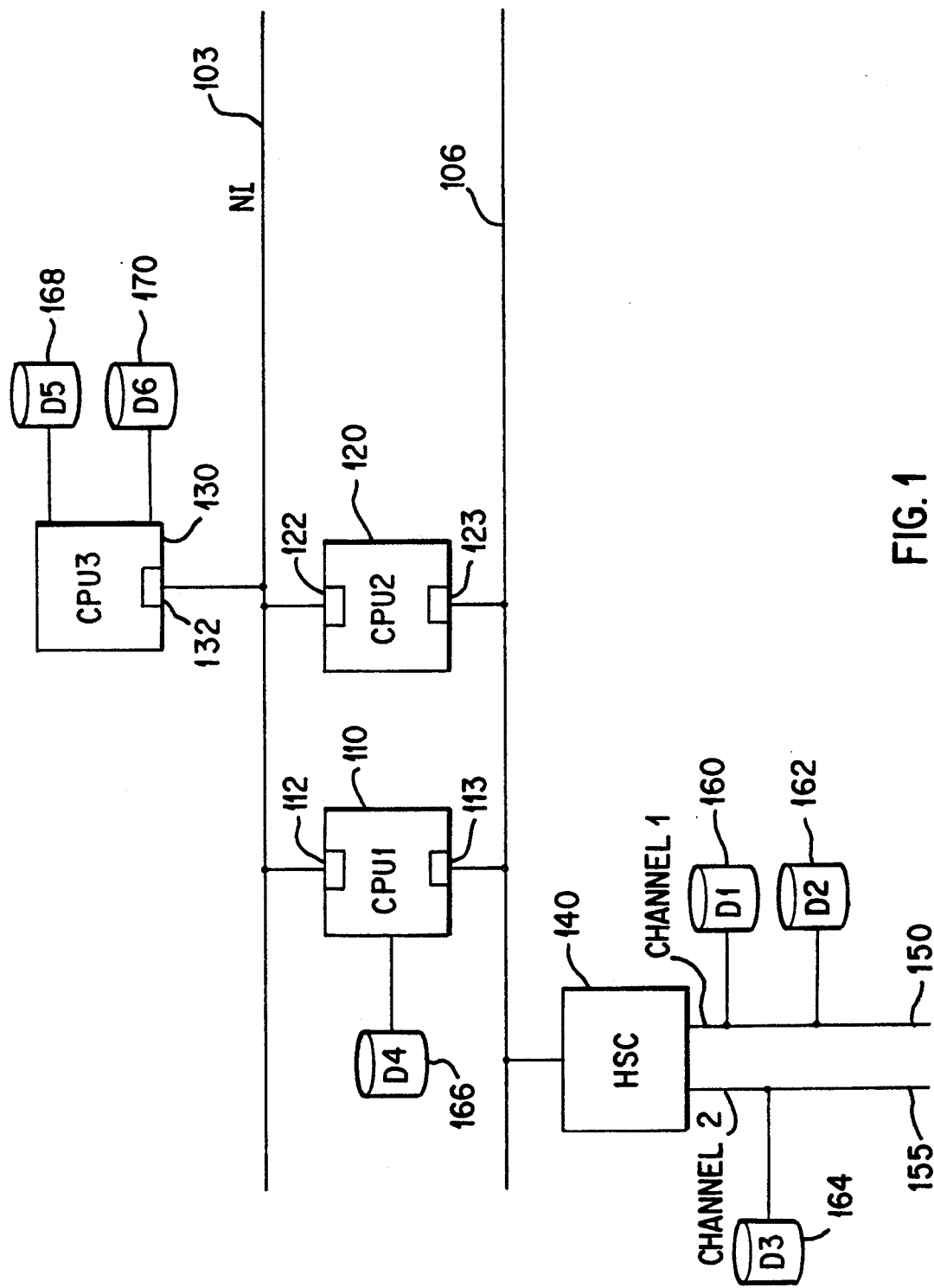
FIG. 1 is a diagram of a computer system that can be modeled in accordance with the present invention.

Reference will now be made in detail to the construction and operation of preferred implementations of the present invention which are illustrated in the accompanying drawings. In those drawings, like elements and operations are designated with the same reference characters.

In the following description, the preferred implementations described are examples of the present invention. The present invention, however, is not limited to these examples, but may be realized in other implementations.

A. System Design and Operation

1. Computer system being modeled

FIG. 1 shows a diagram of a computer system 100 which can be modeled and analyzed in accordance with the present invention. It should be understood that computer system 100 is merely exemplary, and use of the present invention is not limited to any particular computer system configuration.

System 100 contains two busses, NI bus 103 and CI bus 106. NI bus 103 is preferably an Ethernet-type bus for high speed data communication among a plurality of network nodes. CI bus 106 is preferably a bus used to connect devices in a cluster configuration. The details of a CI bus are described in U.S. Pat. No. 4,560,985 to Strecker, et al.

Coupled to CI bus 106 and NI bus 103 are CPU1 110, CPU2 120, and CPU3 130. CPU1 110 has a bus interface 112 for connection to NI bus 103, and a bus interface 113 for connection to CI bus 106. CPU2 120 has a bus interface 122 for connection to NI bus 103 and a bus interface 123 for connection to with CI bus 106. CPU3 130 has a bus interface 132 for connection to NI bus 103.

HSC (hierarchical storage controller) 140 manages communications between disks and CI bus 106. HSC 140 includes two channels, channel1 150 and channel2 155, each of which is connected to one or more disks. Channel1 150 is connected to disks D1 160 and disk D2 162. Channel2 155 is connected to disk D3 164.

In system 100, disk D4 166 is connected to CPU1 110. Disk D5 168 and disk D6 170 are both connected to CPU3 130.

Figure 2:
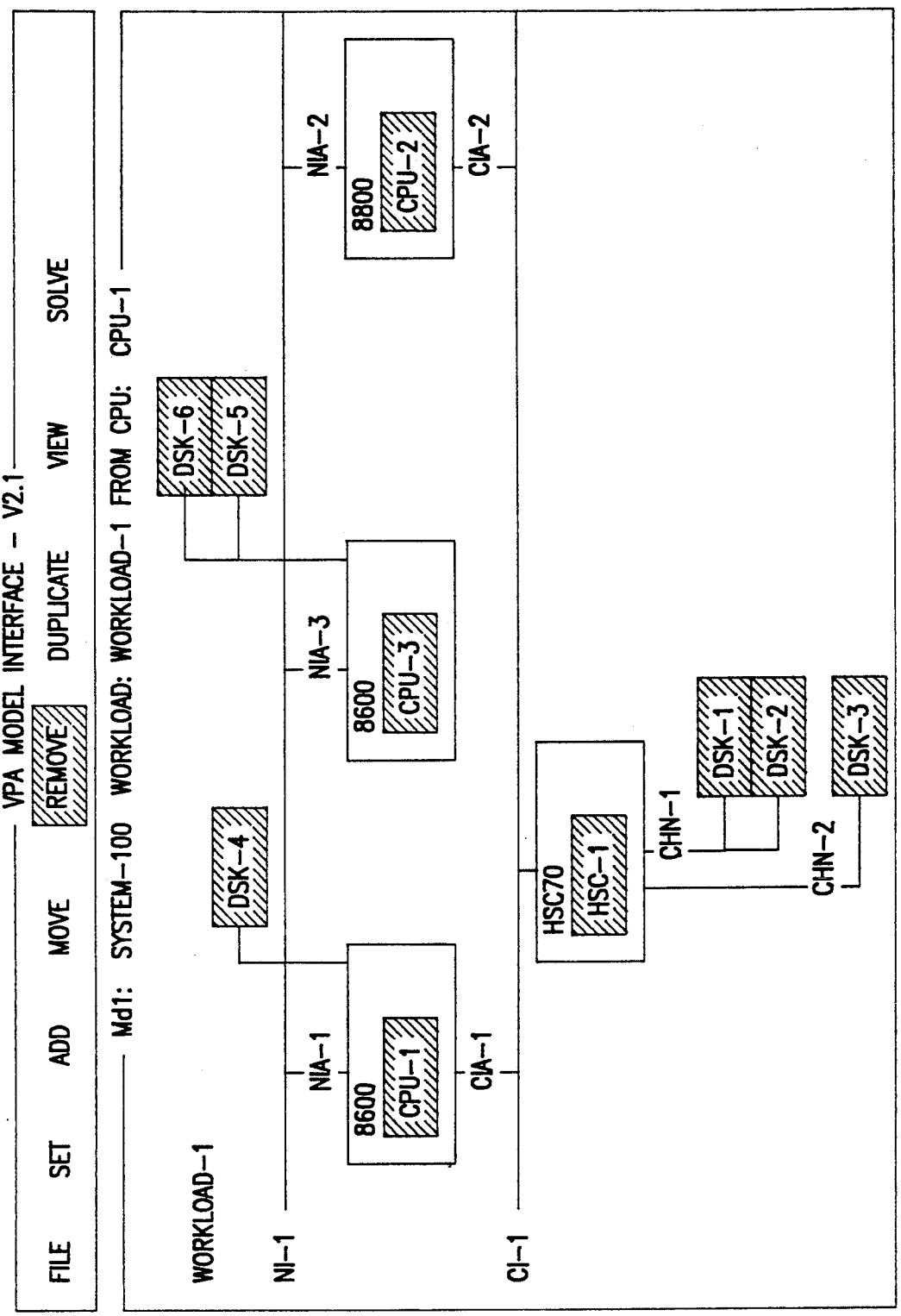
FIG. 2 is a display of the computer system in FIG. 1 generated by a modeling interface of the present invention.

FIG. 2 shows a computer generated display 200 of the computer system 100 shown in FIG. 1. Display 200 in FIG. 2 is generated on a modeling data processor. The modeling data processor can be one of the CPUs in computer system 100, but need not be. The purpose of the modeling data processor is to implement the processes necessary for performance analysis and capacity planning in accordance with the present invention.

Display 200 not only includes all of the busses, CPUs, HSCs, channels, and disks of system 100, but also includes information such as the type of CPUs and HSC, and an identification of at least one workload. As explained above, workloads are processes that use system resources.

Associated with each workload is one or more device branching probabilities. For each workload, there is a branching probability associated with every device that provides system resources for (or supports) that workload. The device branching probability for a workload and a device represents the percentage or fraction of the system resources required by a workload that is supported by the corresponding device. For example, if CPU1 has a branching probability of 20% for workload 1, then 20% of the CPU processing resources required by workload 1 are supplied by CPU1 110.

Two other concepts which are important to understand, but which are not shown in FIGS. 1 or 2, are user groups and MSCP protocols. A user group is a set of users which are organized together for some purpose, such as management. A user group's workload is the sum of the workloads created by the individual users in the user group.

User groups also have branching probabilities for workloads to which those user groups contribute. User group branching probabilities reflect the percentage or fraction of each workload which is created by the corresponding user group.

The MSCP, or mass storage communications protocol, is a protocol which allows a process executing on one CPU to access files on disks not connected to that CPU in a manner which is invisible to the process. A more detailed description of the MSCP can be found in U.S. Pat. No. 4,449,182 to Rubinson, et al.

The modeling interface of the present invention accommodates these and other concepts and provides interactive computer system modeling for performance analysis and capacity planning. In accordance with this invention, operators can view a representation of a computer system configuration and then designate changes to that configuration, such as the addition, removal, or reconfiguration of devices or workloads. The results of those changes would then be determined and presented so an operator can view the results.

Furthermore, the modeling and analysis can be performed according to user groups and can take into account the use of MSCP services. As the preferred implementations demonstrate, the present invention also allows the workloads to be altered either by specific workload, by user group workloads, or across all workloads.

In addition, when certain changes to a system are made, the workloads can be automatically redistributed in predetermined manners. This can be accomplished while still allowing an operator to fix certain branching probabilities.

2. Modeling interface overview

Figure 3A:
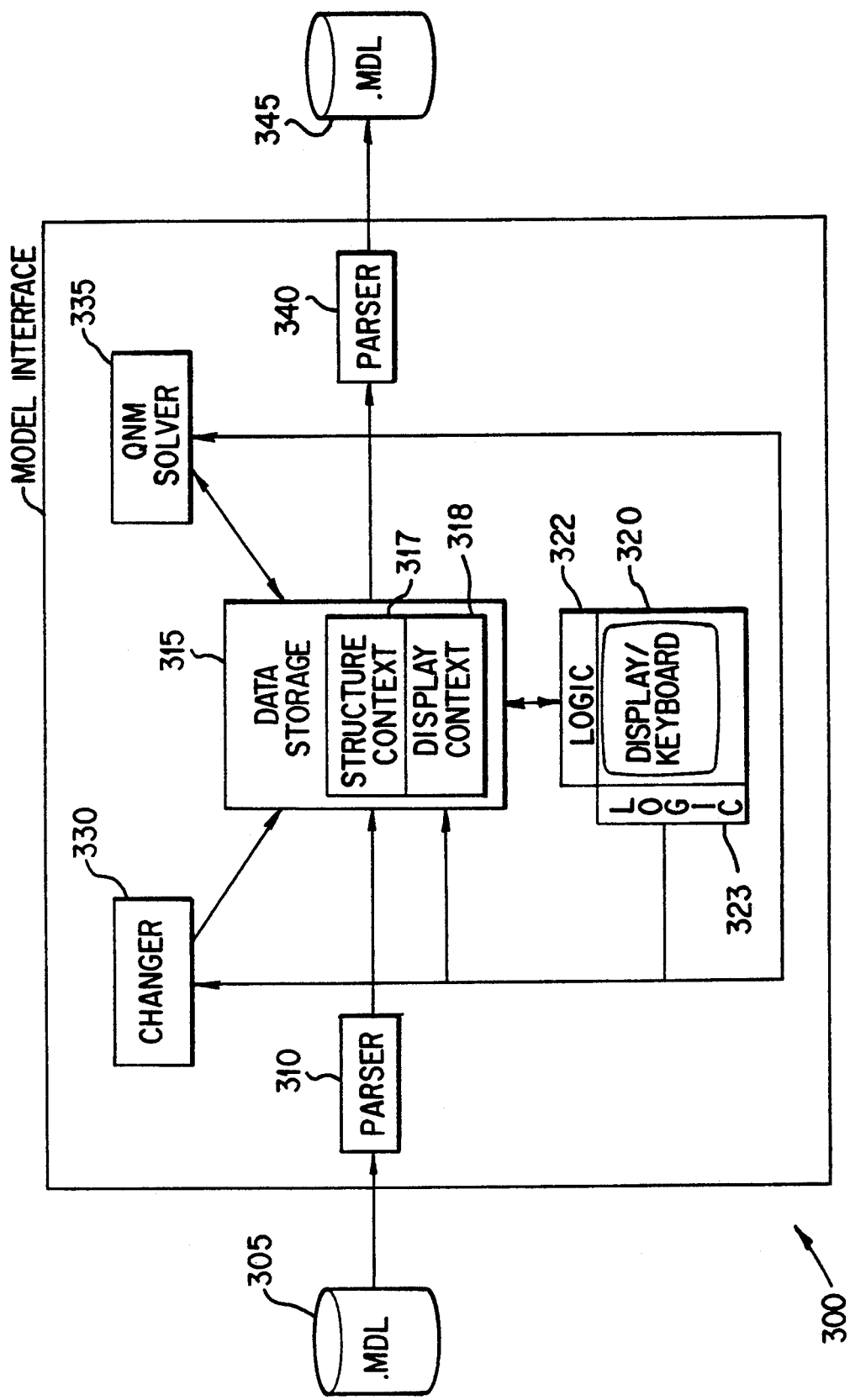
FIG. 3 (a) is a diagram of one preferred implementation of the modeling interface of this invention.

FIG. 3(a) shows a preferred implementation 300 of a modeling interface in accordance with the present invention which can provide the features described above. In the preferred implementation, modeling interface 300 receives its input about a computer system configuration from an .MDL file 305.

The .MDL file could be generated in many different ways. One way is described in U.S. Pat. No. 4,849,879 to Chinnaswamy et al., discussed in the Background of the Invention. Other techniques for generating the configuration information are also possible.

The output of modeling interface 300 is another .MDL file 345. In the preferred implementation, .MDL files 305 and 345 have the same format but different data. .MDL files 305 and 345 preferably contain two types of data. One type of data, device data, describes the devices in the computer system being analyzed as well as the interconnection of those devices. The other type of data, workload data, describes the workloads on the system including information on workload distribution by use group and device. The specific format of the .MDL file, however, is not important to the present invention.

In addition, initial values of performance metrics can be supplied, but such values are not necessary to the present invention. If such initial values are supplied, they can be provided in the .MDL file or in some other file.

Modeling interface 300 is a preferred implementation of the modeling system of the present invention. Modeling interface 300 includes parser 310, data storage 315, display/keyboard 320, changer 330, QNM solver 335, and parser 340.

Parser 310 is used to translate the data from the format stored in .MDL file 305 into an appropriate format for storage into data storage 315. As such, parser 310 acts as a type of compiler.

Data storage 315 stores in a structure context portion 317 information on the configuration of the computer system being modeled and analyzed, as well as information on workloads, user groups, and MSCP relationships. Data storage 315 stores that information in an easily modifiable form, preferably in a type of tree structure, so that changes to the configuration can be easily effected. Data storage 315 also contains performance metrics of interest in structure context portion 317.

Data storage 315 also includes a display context portion 318 which contains information about the data being displayed. For example, display context portion 318 preferably includes information regarding screen position, object being displayed, and performance metrics being displayed.

Display/keyboard 320 includes a screen to display the configuration of the memory system, including information about the system devices, the interconnection of those devices, and the workloads. Display/keyboard 320 can also display information about user groups and performance metrics. All of the information displayed by display/keyboard 320 is based on the information stored in the structure context portion 317 and display context portion 318 of data storage 315.

Display/keyboard 320 includes display logic 322 which accesses the information from display context portion 318 and structure context portion 317 to generate the displays. Basically display/keyboard 320 accesses display context portion 318 to determine what information from structure context portion 317 to display and how to display that information. The hardware and software to implement such function are known to persons skilled in this art.

Display/keyboard 320 also receives inputs from operators requesting modeling interface 300 to modify the configuration or to perform other tasks. Those inputs can be received from keyboard commands or from devices, such as a mouse, which allow for screen selection. The inputs are buffered and output by keyboard logic 323 to data storage 315, changer 330, and QNM solver 335.

Changer 330 receives the inputs from display/keyboard 320 and converts those requests into sets of commands for other elements of modeling interface 300, such as data storage 315. At the appropriate time, changer 330 also causes the necessary data from data storage 315 to be transmitted to QNM solver 335.

QNM solver 335 receives from data storage 315 modeling information describing the configuration of the computer system being analyzed. That modeling information also includes workload parameter, user group information, MSCP relationships, and system parameters. From the modeling information, QNM solver 335 determines what certain performance metrics would be for a system operating according to the received modeling information. QNM solver 335 then stores those performance metrics back into data storage 315.

Parser 340 acts in a manner complementary to parser 310 by transforming the information from the format of data storage 315 format back into the .MDL format. In response to an operator request received from display/keyboard 320, data storage 315 transmits the configuration and metrics information through parser 340 into .MDL file 345.

Figure 3B:
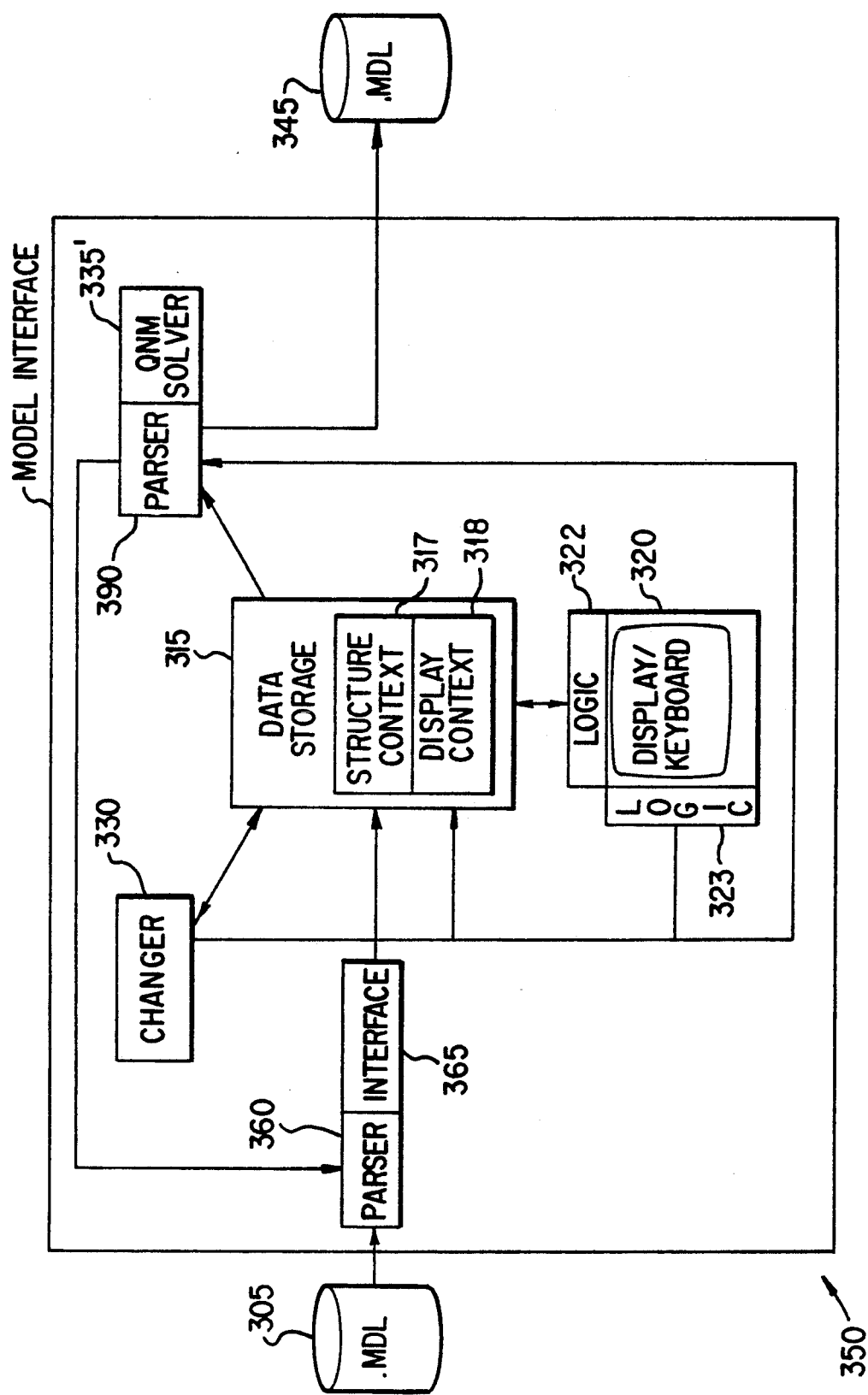

FIG. 3(b) shows an alternative implementation, modeling interface 350, in accordance with the present invention. Modeling interface 350 differs from modeling interface 300 in its use of parsers already employed for the .MDL files.

As in modeling interface 300, .MDL file 305 provides input and the .MDL file 345 receives the output from the modeling interface 350. Parser 360 is a parser used in conventional systems for .MDL files. Parser 360 translates the .MDL file 305 into an array. An interface 365 is added to parser 360 to provide final translation from the array into trees for data storage 315.

Another standard parser 390 is added to convert the information from the tree format used by data storage 315 into array formats for QNM solver 335. Parser 390 also is used to convert information from the array format which is an output QNM solver 335 back to the tree format used by data storage 315. This conversion also involves interface 365. Finally, parser 390 provides data conversion from the tree format for data storage 315 into a format for storage into .MDL file 345.

3. Modeling interface operation

Figure 4:
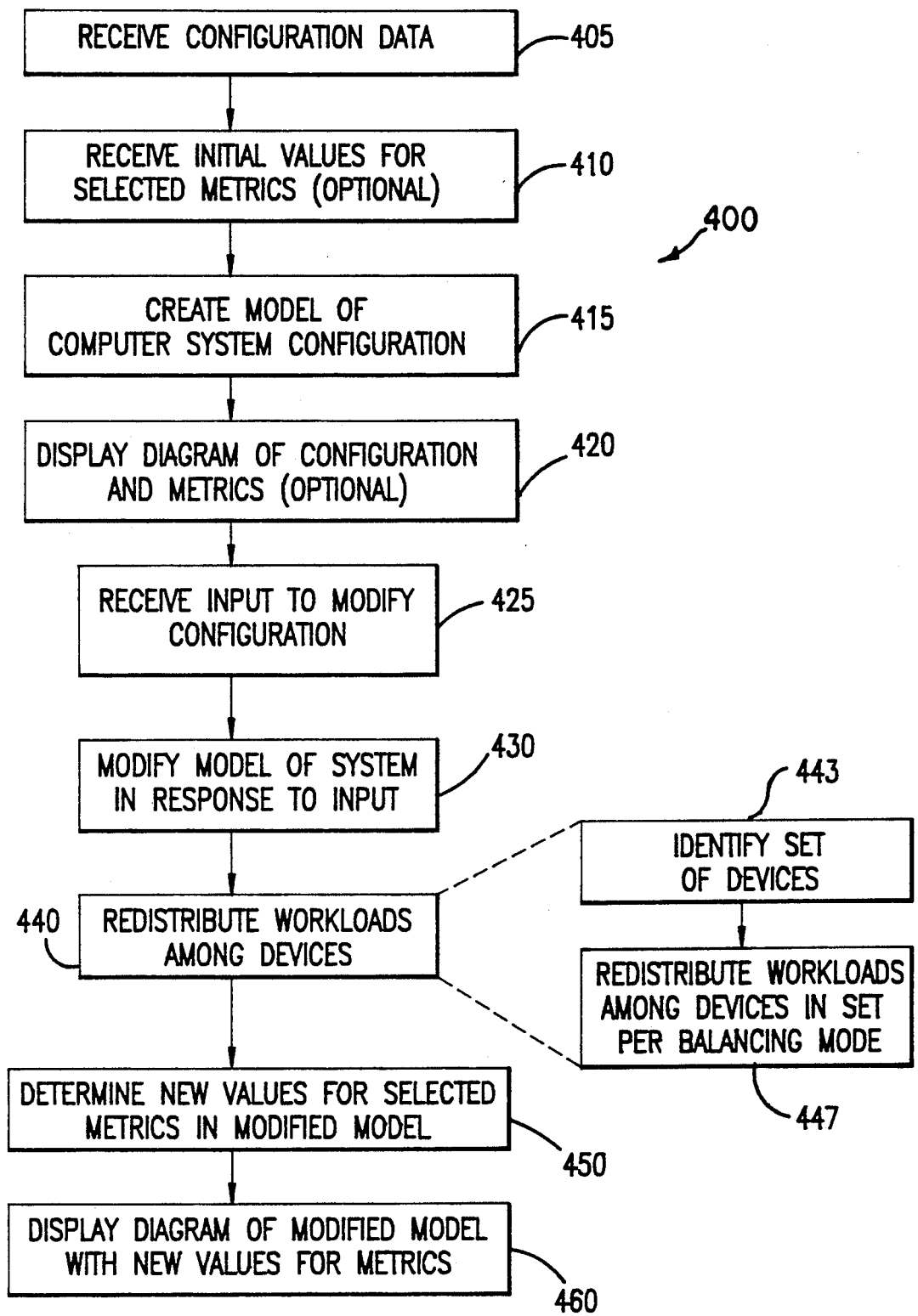
FIG. 4 is a flow diagram of the general operations in a preferred implementation of this invention.

FIG. 4 is a flow diagram 400 generally showing the steps performed during operation of the preferred implementation 300 of the present invention. At initialization of the operations represented by flow diagram 400, the modeling interface receives from the computer system being modeled data describing the computer system's configuration (step 405). As explained above, in the preferred implementation, this information is contained in the .MDL file 305.

In addition, if the option is chosen, the modeling interface in accordance with the present invention can receive initial values for selected metrics for the computer system (step 410). These metrics would preferably be part of .MDL file 305, but they could be provided in other ways, such as by operator input through a display/keyboard 320, or by input from a different file. The initial values of the metrics received from the computer system will generally be values that were actually measured during the operation of the computer system.

Figures 5A, 5B:
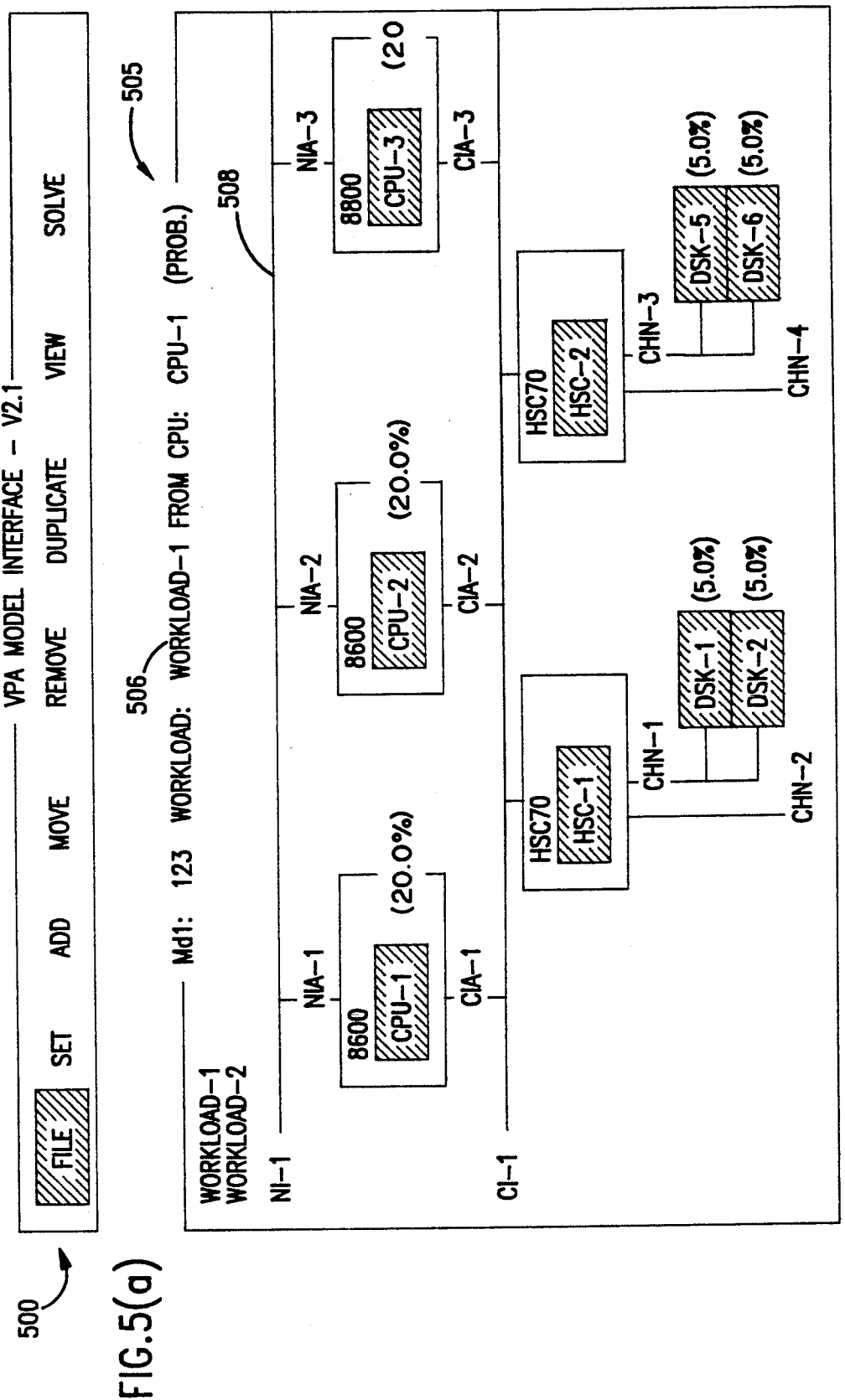

In a preferred implementation, this receipt of information is accomplished by choosing a FILE option from a modeling interface main menu 500, shown in FIG. 5(a), that appears on display/keyboard 320. Main menu 500 preferably allows selection of one of several options. In addition to the FILE option, there is also a SET option, an ADD option, a MOVE option, a REMOVE option, a DUPLICATE option, a VIEW option, and a SOLVE option. These options will be described in greater detail below.

The FILE option is preferably selected by standard methods of moving a cursor to a desired location on a menu displayed on display/keyboard 330 and then indicating a selection. Once the FILE option is selected, a submenu appears that gives an operator a choice either to load a model file (FILE LOAD), such as the .MDL file, into data storage 315, to write the model file to an .MDL file on a disk (FILE WRITE), to exit the modeling session and some the changes in an .MDL file (FILE EXIT), or to exit the modeling session without saving the changes (FILE QUIT).

When the FILE LOAD option is chosen, the name of the file must also be provided. When the FILE WRITE option, FILE EXIT option, or FILE QUIT option is chosen, no other information is needed. Choosing the FILE WRITE option does not end the modeling session, but choosing the FILE EXIT and FILE QUIT options do.

Returning to FIG. 4, after receipt of the configuration and initial parameter information, a model of the computer system configuration is created in modeling interface 300 from the received information (step 415). Preferably, either parser 310 in FIG. 3(a), or the combination of parser 360 and interface 365 in FIG. 3(b), build the model of the computer system configuration by placing the received configuration information into the proper format for storage in data storage 315. The details of the data format and preferred structure in data storage 315 are discussed below.

Next, a diagram of the configuration of the computer system, is displayed on display/keyboard 320 (step 420). Initial values of certain selected metrics may also be displayed if such values were provided. FIGS. 2 and 5(b) show examples of such a display. FIG. 5(b) is a diagram of a model display 505 showing workload information, workload parameters, devices, and performance metrics.

Model display 505 preferably includes a status line 506, a list of workloads 507, and a display of the current model 508. One of the workloads (Workload 1), called a current workload, is highlighted. The information in status line 506 preferably includes the display mode, the name of the model, the name of the current workload, and the name of a source CPU. The display mode, as explained in greater detail below, specifies which data is displayed in model display 505. The source CPU is the originator of the portion of the current workload.

Figure 5C:
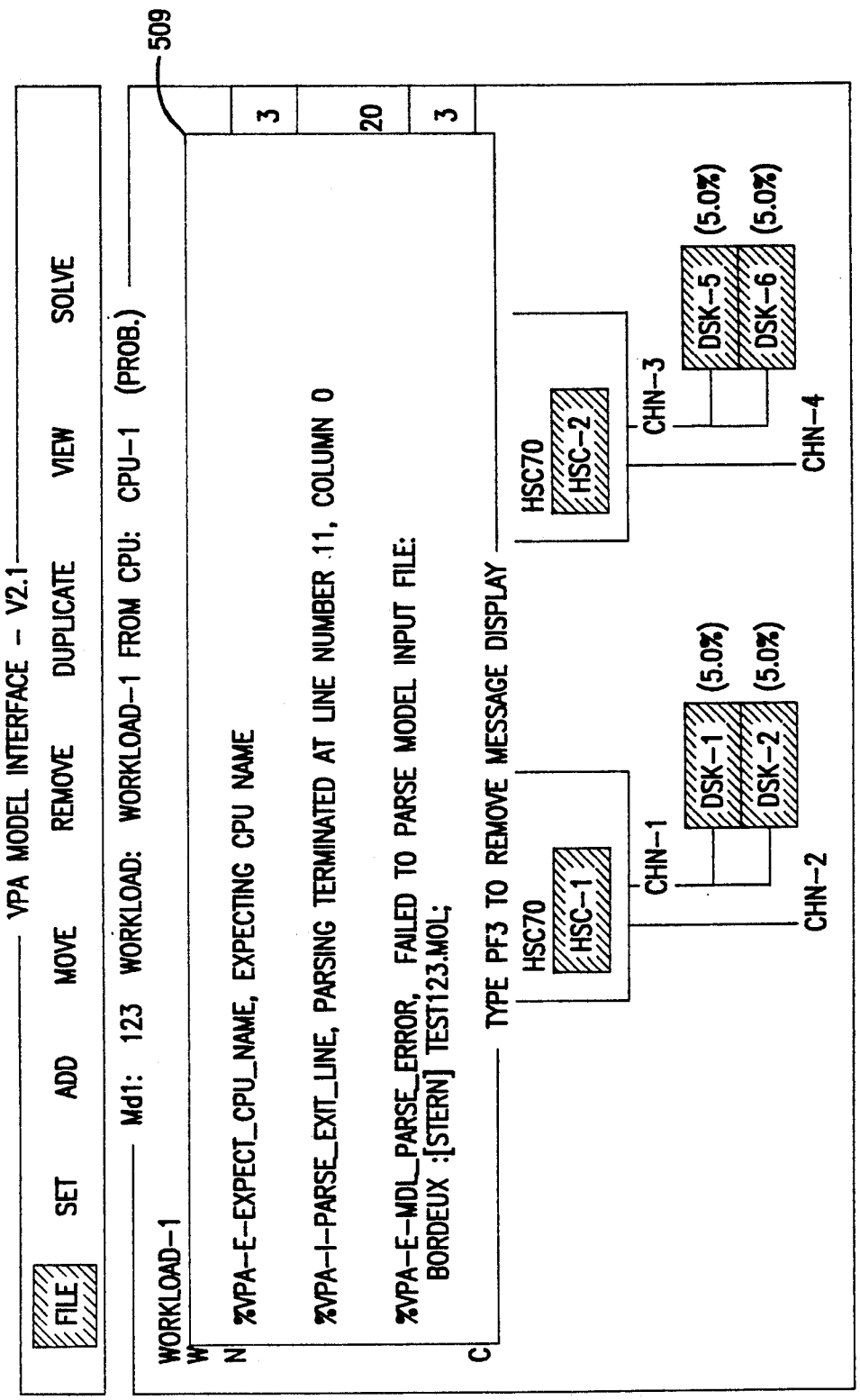

FIG. 5(c) shows a message window 509 which is preferably overlaid on model display 505. Message window 509 includes message text, such as messages either from the modeling interface itself, broadcast messages, such as electronic mail, or operator messages.

Figure 5M:
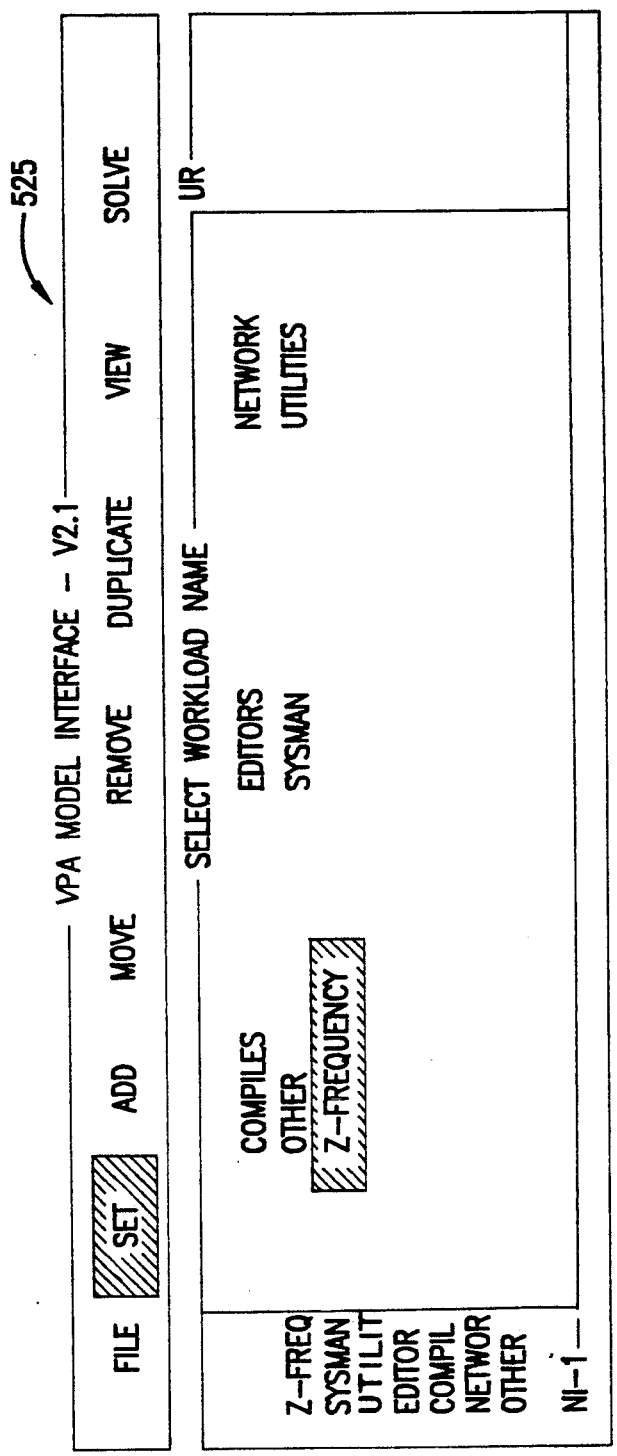
Figure 5D:
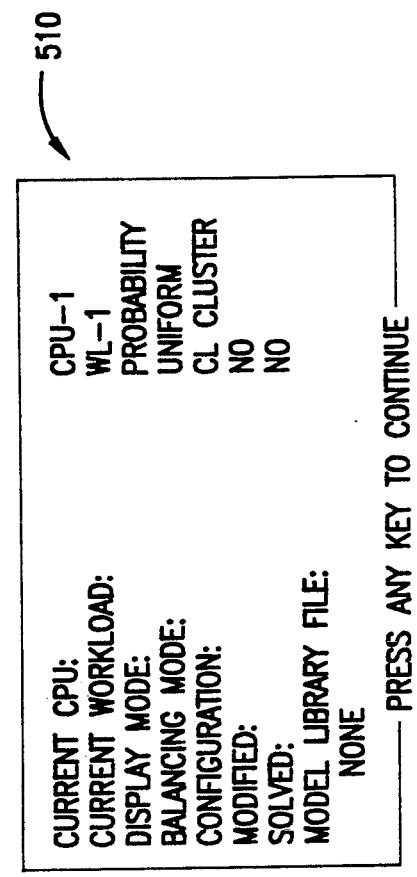

FIG. 5(d) shows a status window 510 which can be displayed by making appropriate selections on display/keyboard 320. The status window preferably provides information about the current CPU, the current workload, the display mode, the balancing mode (explained below), the configuration being modeled, the status of the model, whether the model has been solved, whether the model has been modified, and the name, if any, of the model library. The model library is a library which overrides the default parameters of the devices modeled. This allows an operator to modify device parameters in the model.

After display of the system, the next step in flowchart 400 is the receipt of an input to modify the configuration of the computer system (Step 425). The inputs can either indicate a modification in the number and types of workload, the distribution of the workload, the number and types of physical devices, or the connection of those devices.

The preferred manner of making changes to the workload involves use of the SET option from main menu 500 in FIG. 5(a). The SET option allows an operator to set various parameters for the workloads or various attributes for the modeling session.

One of the SET options is the SET Display Mode option which determines what information will be displayed for an identified object. In the preferred implementation, the SET Display Mode option allows an operator to choose to display branching probabilities, rates such as in TPS (transactions per second) or IOs/second, percentage utilization, service time (time to process a request) response time (service time plus queuing delay), queue length, throughput (in IOs/sec), and types of devices.

In the preferred implementation, two of the display modes, percentage utilization and queue length, will result in the values flashing on the screen to indicate possible problem conditions. The utilization value will flash if it exceeds a saturation point, which is set by default to 90%. The queue length value will flash if 2 or greater.

In addition, when any changes are made to the model that might affect the performance metrics, such as the removal of the device, the performance metrics that may be affected are displayed in bold text to indicate that they represent stale data.

Figure 5E:
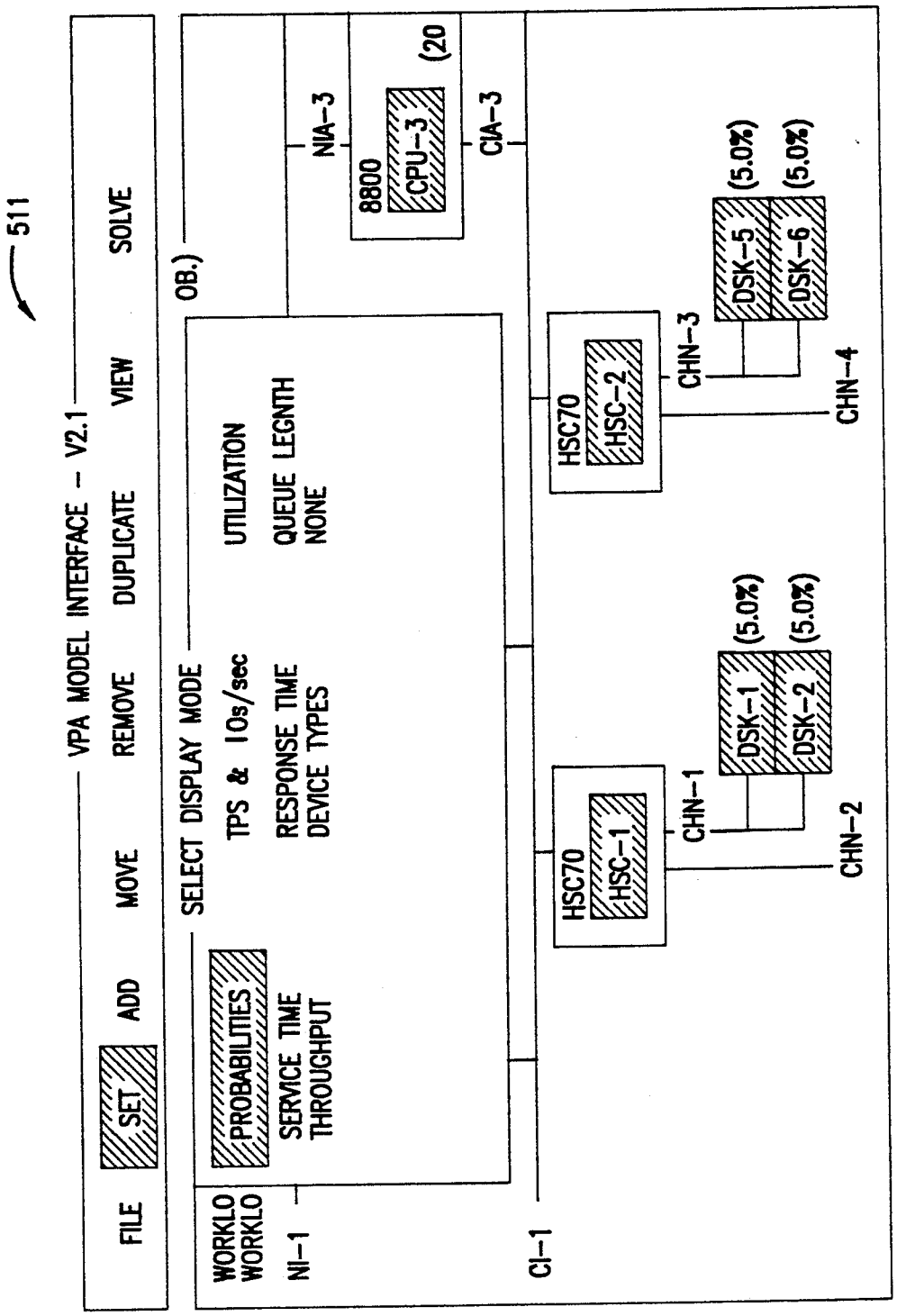

FIG. 5(e) is a diagram of a display 511 that would appear on display/keyboard 320 if the SET Display Mode option were chosen. The different types of Display Modes are shown in a window overlay, and the presentation of the "probabilities" entry in reverse text indicates that this is the Display Mode being chosen.

Figure 5F:
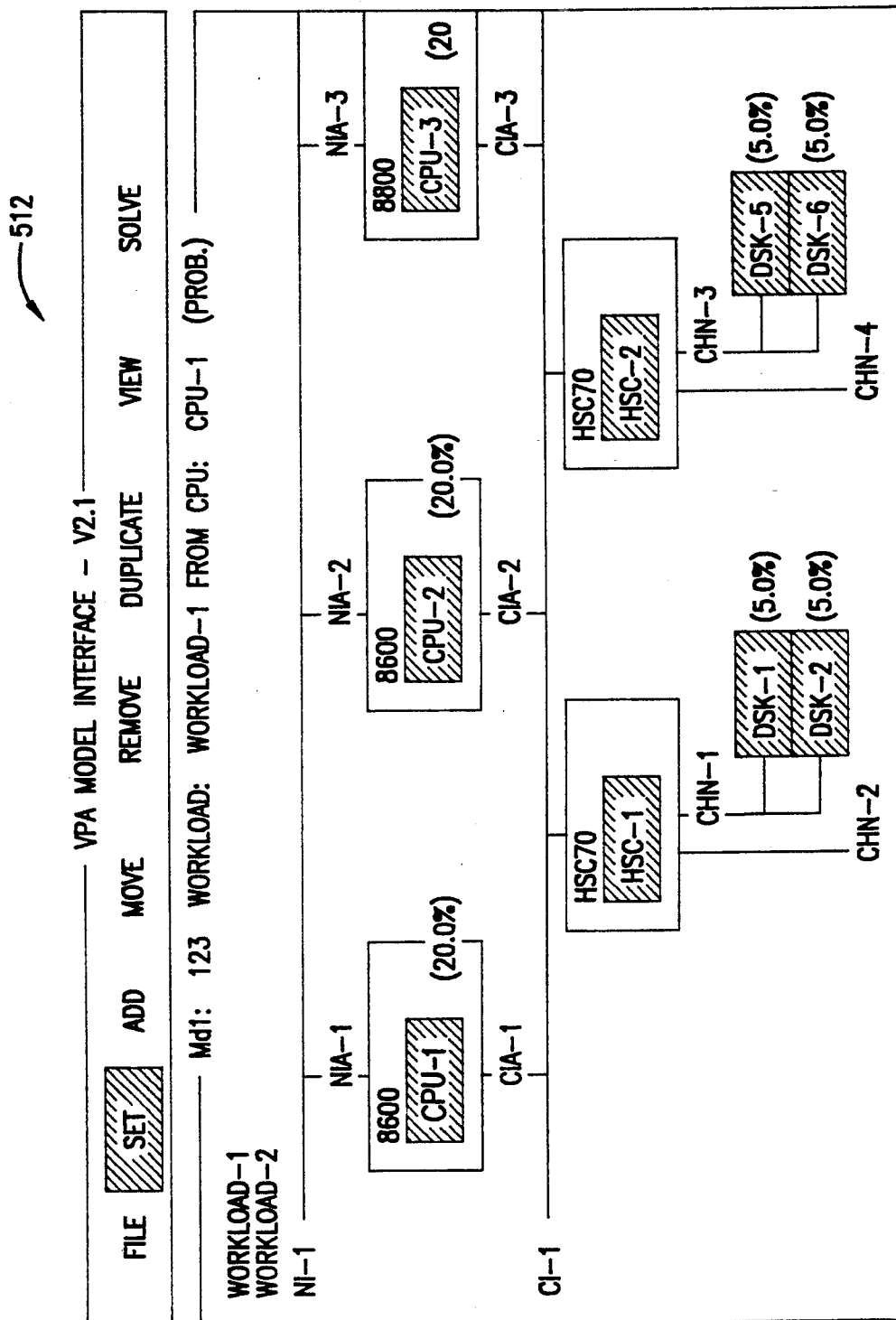

Upon choosing the probabilities Display Mode, a display 512 shown in FIG. 5(f) would appear. Next to the representation of each device is in display 512 is a value in parentheses representing the branching probability of that device for the current workload. In FIG. 5(f), the current workload is workload-1.

Figure 5G:
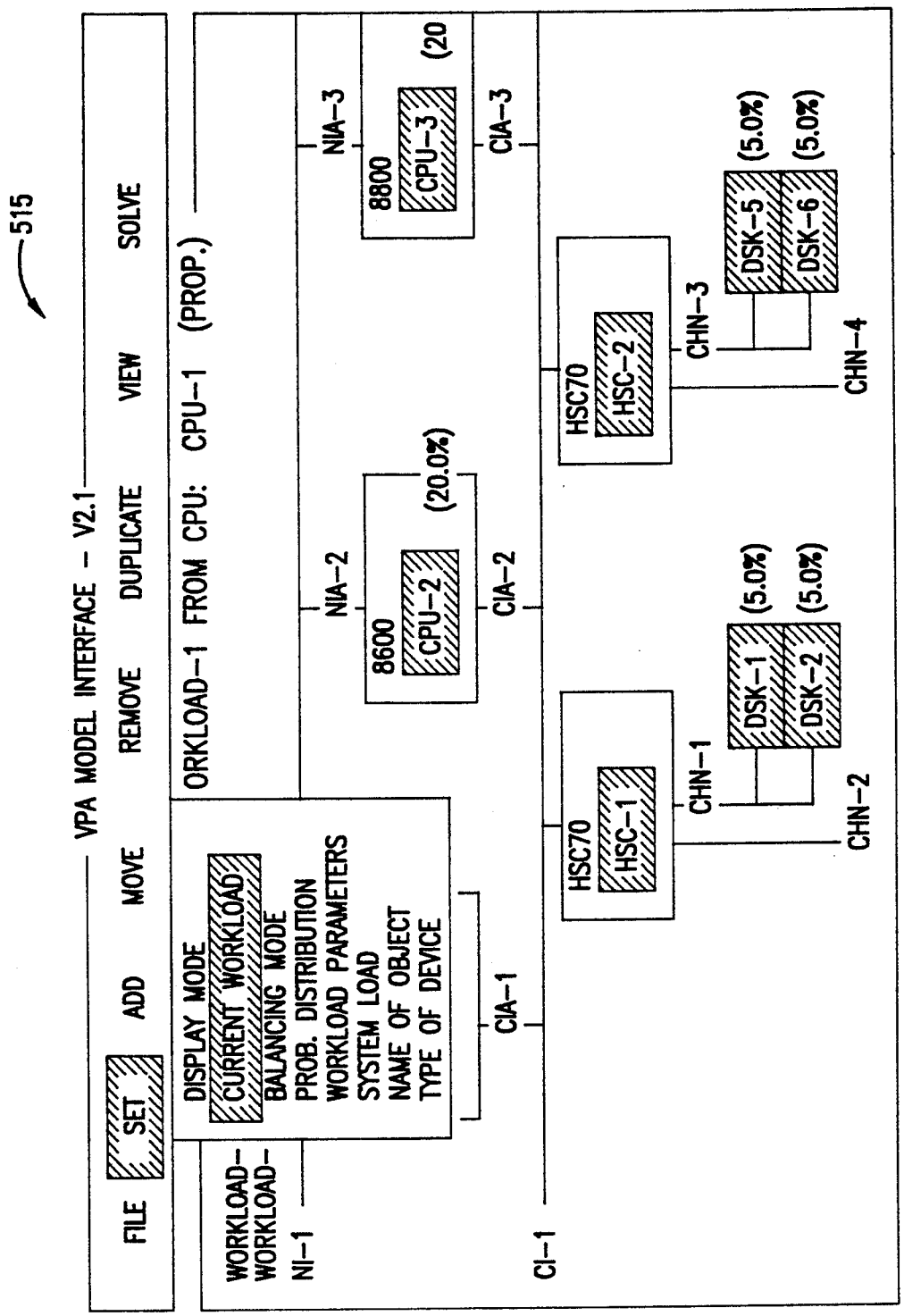

If the SET Current Workload option is chosen, a screen 515, such as shown in FIG. 5(g), is generated showing the "Current Workload" option highlighted in reverse text.

Figure 5H:
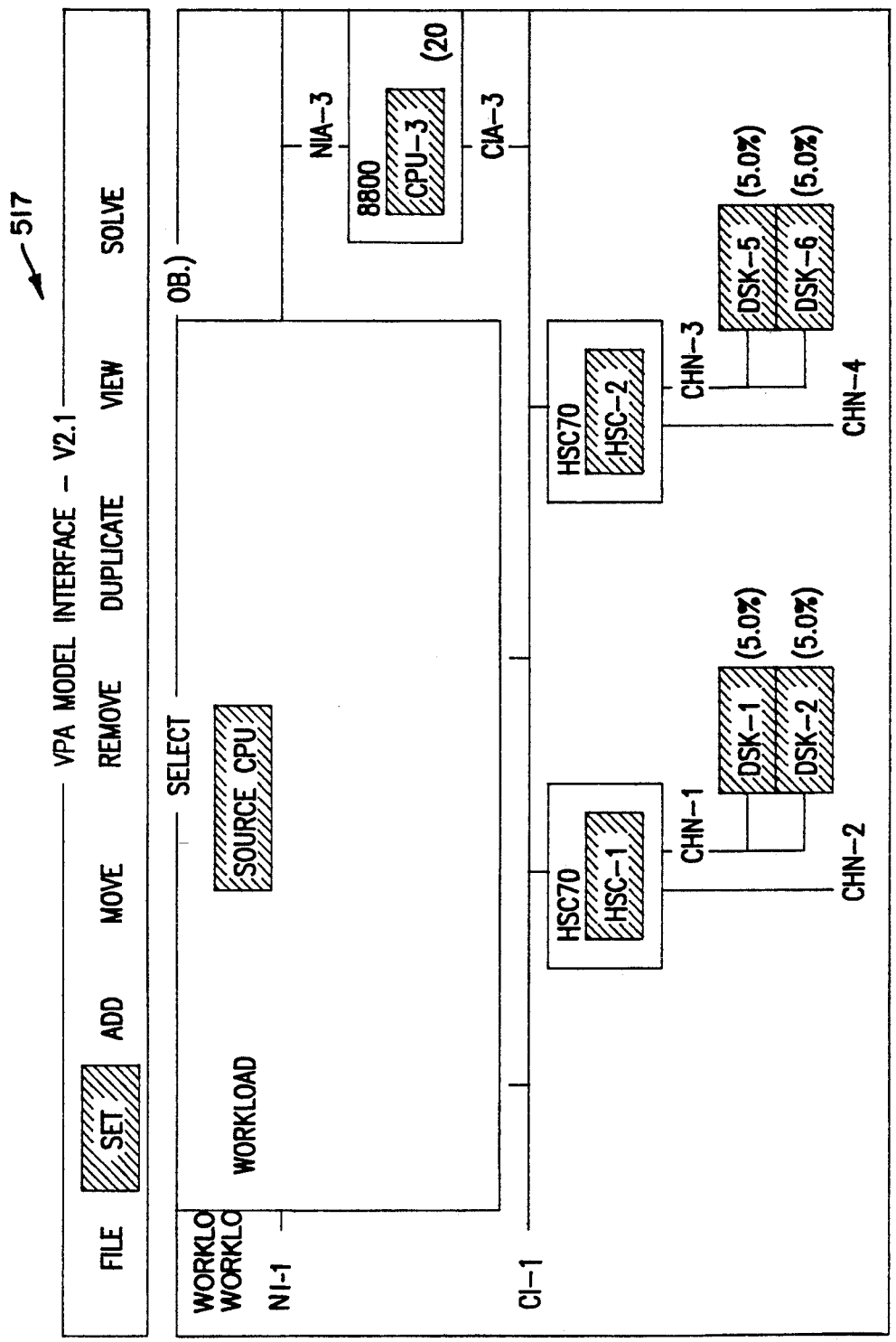

The selection of the "Current Workload" option causes a display 517, shown in FIG. 5(h), to appear on display/keyboard 320. Display 517 allows an operator to choose to display either a designated workload or source CPU.

Figure 5I:
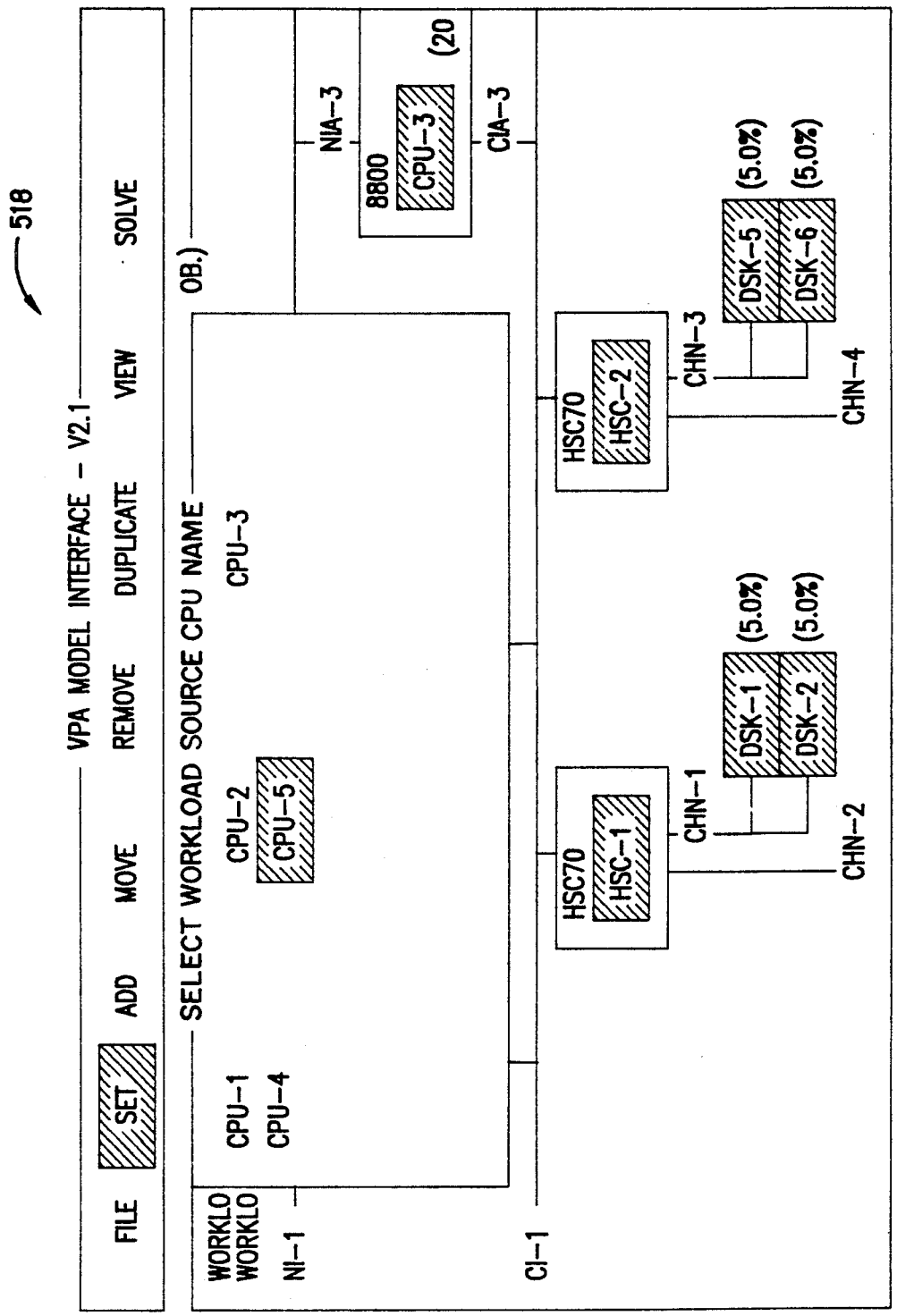

If the Source CPU option is chosen, as indicated by the reverse text in display 517 of FIG. 5(h), then a display 518 as shown in FIG. 5(i) appears on display/keyboard 320. Display 518 shows the various CPUs in the computer system being modeled.

Figure 5J:
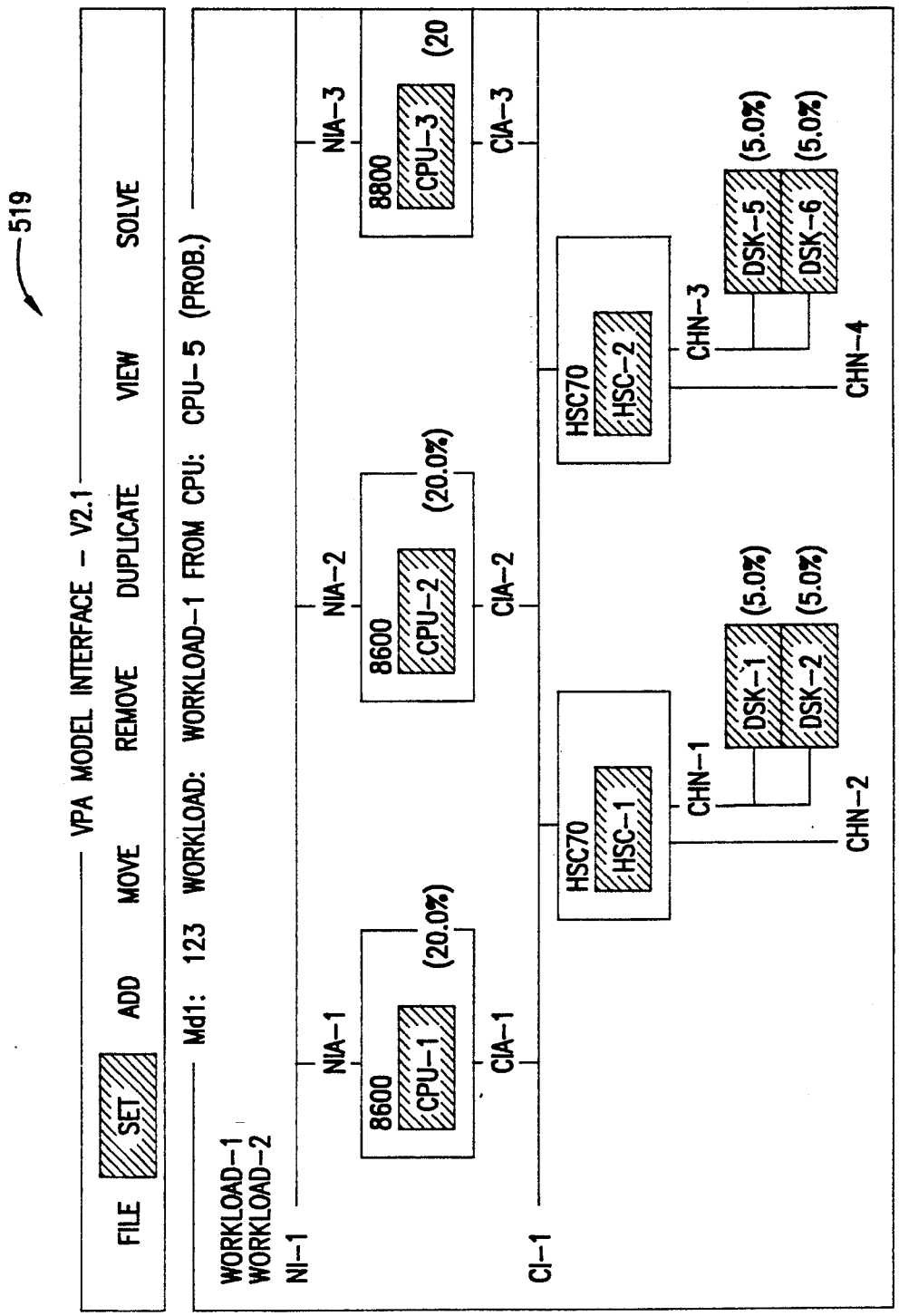

The operator would then choose one of the CPUs, such as CPU-5 in display 518 of FIG. 5(i), as shown in the reverse text. This choice is then reflected on the status line in display 519 of FIG. 5(j).

If a new workload or Source CPU is selected during the SET Current Workload option, the information displayed in parentheses on the displays will likely change if the Display Mode is "probabilities," or "TPS & IOs/sec." This is because the information displayed in these Display Modes represents a percentage or actual I/O rate from the current Source CPU and workload. Changing the CPU or workload would likely force a change in the corresponding information.

Figure 5K:
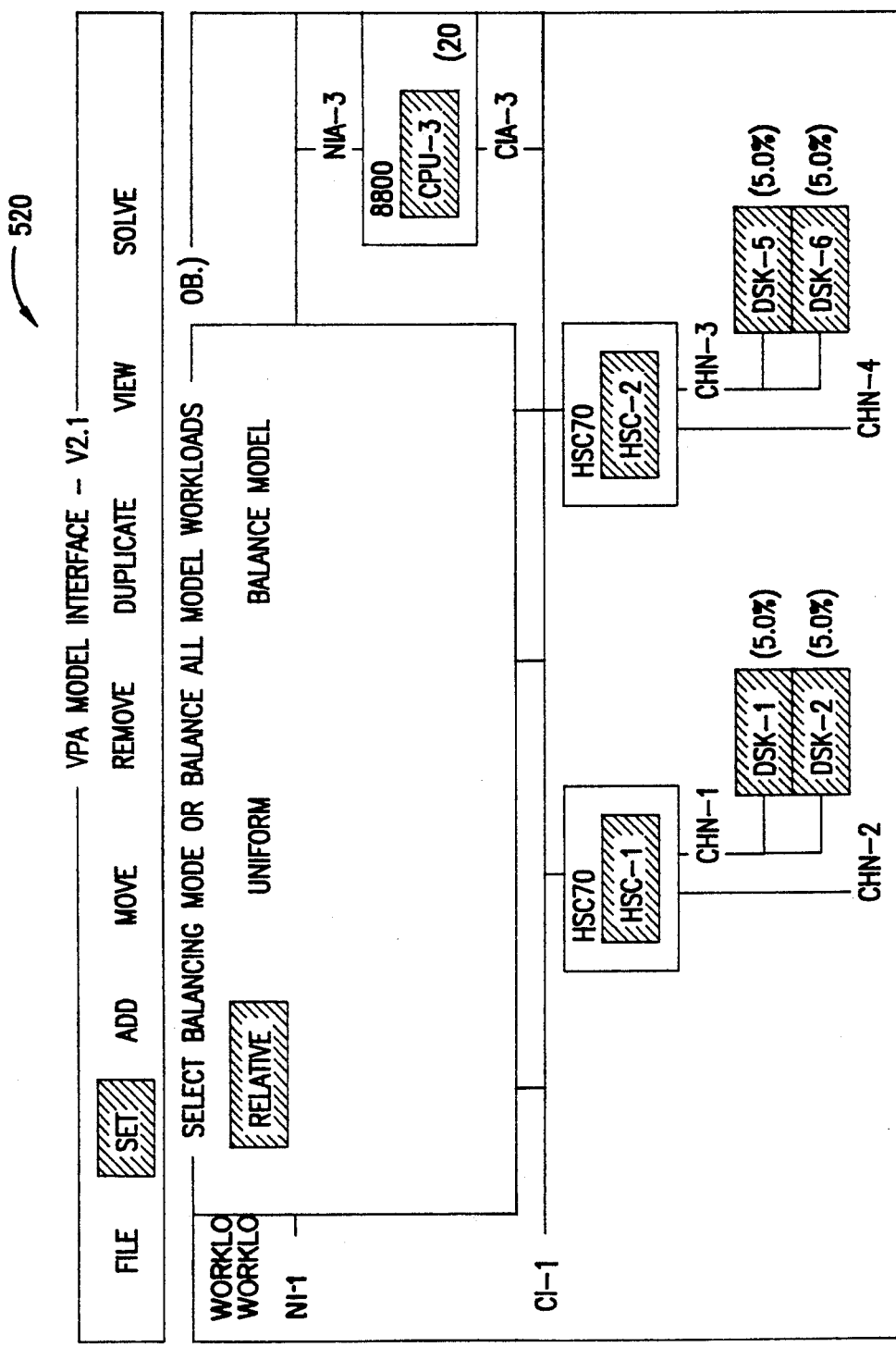
Figure 5I:
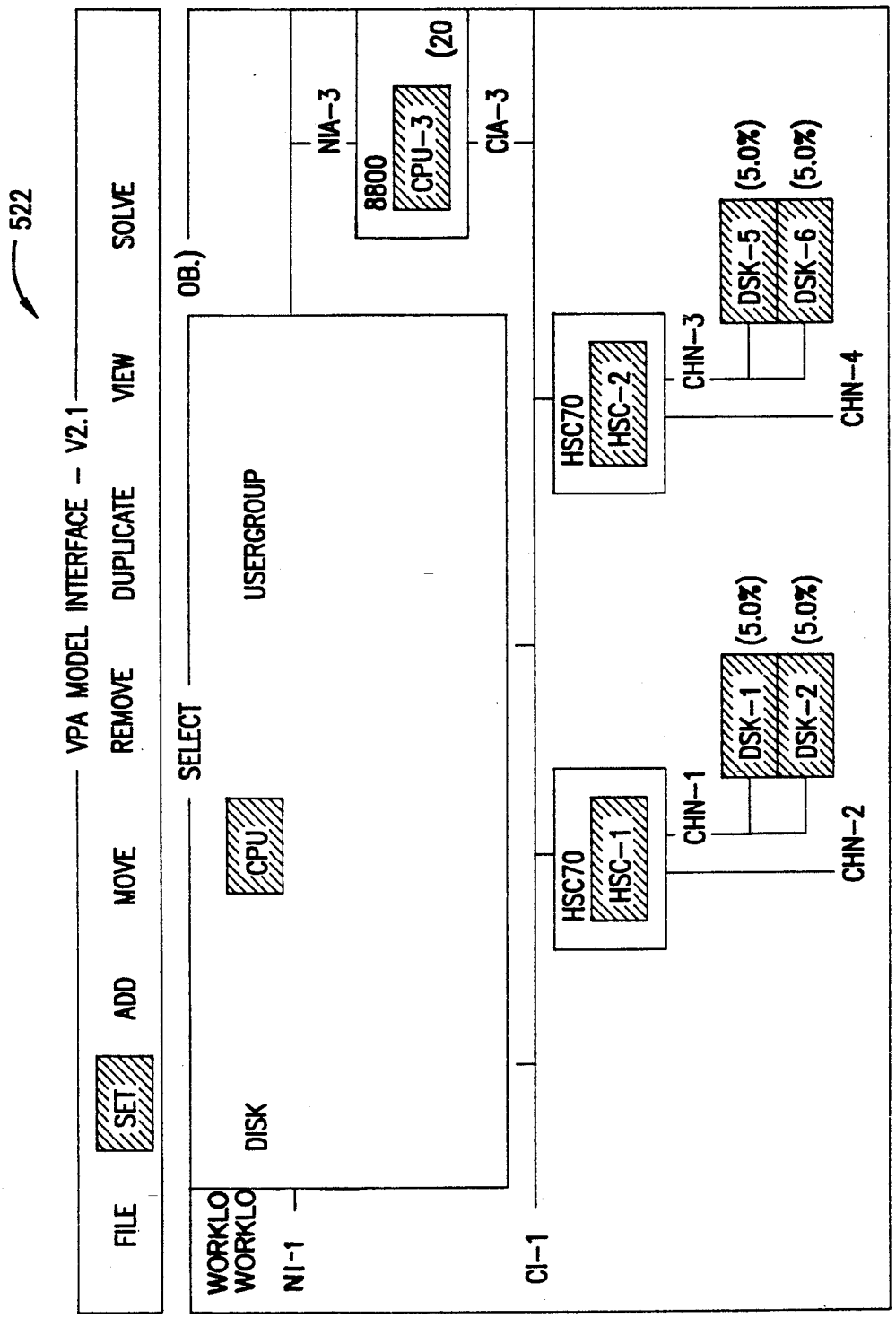

If the SET Balancing Mode option is chosen, then a display 520 as shown in FIG. 5(k) appears, which allows the Balancing Mode to be set. The Balancing Mode determines how workloads should be redistributed among the devices in a model when a change is made to the model that will affect that workload. For example, the removal of a disk causes the I/O for each workload on that disk to be shifted to other disks connected to the same CPU or HSC device. How the workloads are redistributed is determined by the Balancing Mode.

Workload distribution involves branching probabilities. As explained above, branching probability is a percentage of work supplied by a device for a given workload. Before solving a model, the branching probability for each workload must equal 100%. The probabilities can either be FIXED at a specific value or FLOATING. FLOATING probabilities can be adjusted to ensure that the sum of all related branching probabilities equals 100%. The balancing mode recalculations only affect the probabilities that are FLOATING.

In the preferred implementation, a workload on a device such as a CPU or disk can be apportioned among other devices in a set of devices in two different ways. The relevant set of devices are those which can supply a greater or lessor amount of system resources to a particular workload. The set of devices would not include those with a FIXED probability.

In uniform apportionment, the total amount of the adjustment made for a device is divided equally among the devices in the set. For example, if there were three CPUs, and the branching probability for one CPU dropped by a certain amount, the remaining two CPUs would have their branching probabilities increased by an amount equal to half of the amount that the first CPU's branching probability dropped.

In relative apportionment, the total amount of the adjustment is made proportionate to the ratios of branching probabilities the devices in the set. This insures that the ratios of branching probability for the devices in the set remain the same. In other words, if one of the two CPUs in the prior example has a branching probability for a workload which is twice as large as that of the other CPU, then two-thirds of the workload needing to be allocated would go to the CPU with the larger branching probability.

Related to the SET Balancing Mode option is the SET Probability Distribution option. If this option is chosen, a display 522 as shown in FIG. 5(l) appears on display/keyboard 320. Display 522 presents the operator with a choice of devices for which to set the probability. By the reverse text, display 522 shows that the operator has chosen to set the branching probability for a CPU. The next display to occur, which is not shown, contains a list of all the CPUs whose branching probability can be changed. When an appropriate CPU is chosen, then the operator is prompted to enter the branching probability for that CPU (or other device chosen). In addition, in the preferred implementation, the operator is prompted to set the probability to FIXED or FLOATING.

Branching probabilities may also be modified indirectly by deleting hardware and moving workloads between devices. When the modeling interface is first invoked, all branching probabilities are set to FLOATING and adjusted so that the branching probabilities for each workload add to 1.0. The FIXED probability attribute is used to indicate that a workload distribution should remained fixed for a given CPU, disk, or user group despite other changes that may affect certain workloads. Preferably, the branching probability is only fixed for the duration of a particular modeling session, and is not transferred into the .MDL file.

Figure 5N:
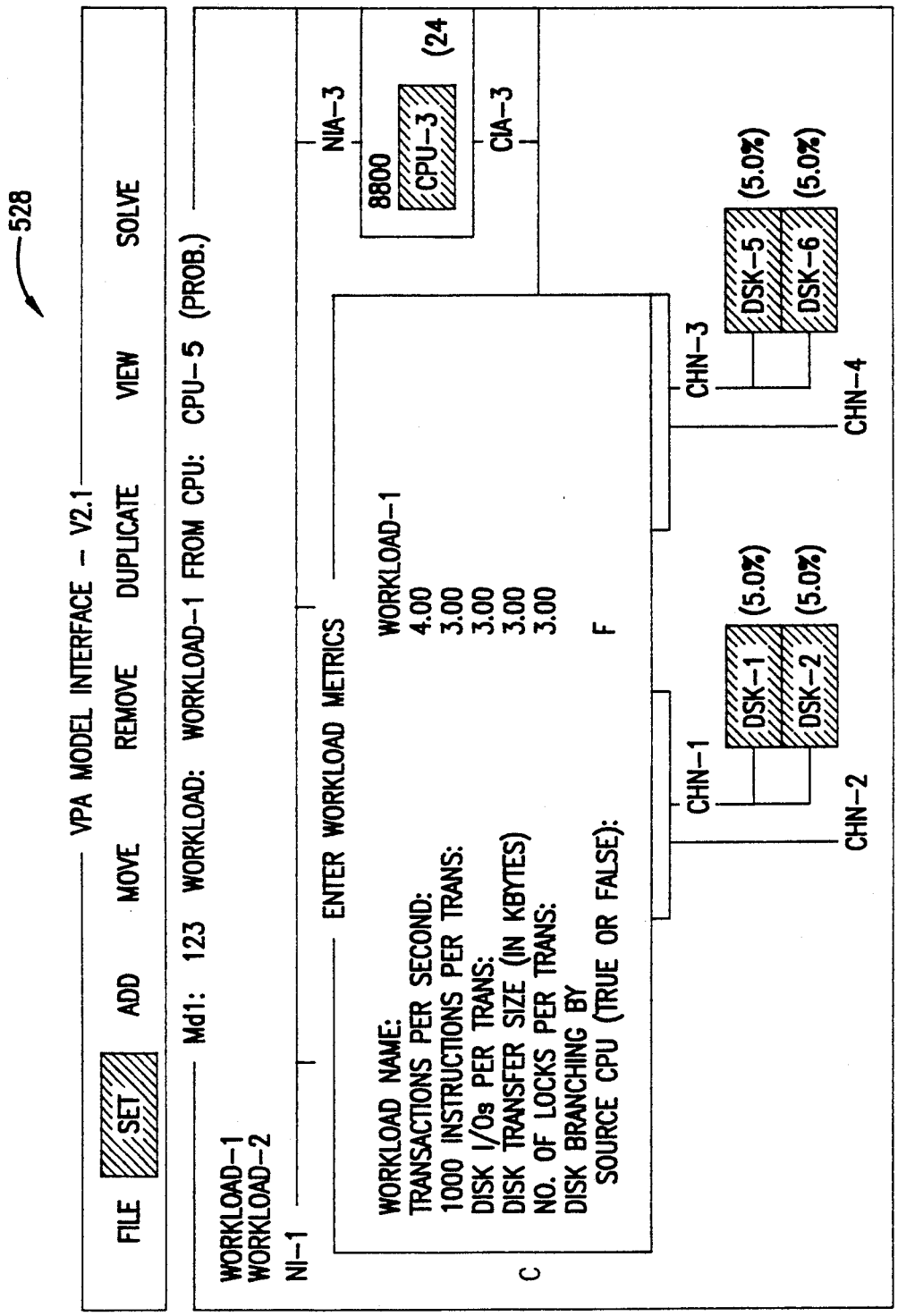

Workload parameters can also be set by using the SET Workload Parameters option for the display mode. If the SET Workload Parameters option is chosen, a workload display 525, shown in FIG. 5(m), appears. Workload display 525 includes a list of workloads that have parameters which can be modified. Once a workload is selected, such as the "Z-FREQUENCY" workload shown in reverse text in display 525, the workload parameters which can be modified are displayed. A display 528 of those workload parameters for workload Z-frequency is shown in FIG. 5(n).

As is apparent from display 528, the workload parameters that can be changed in the preferred implementation include the transaction per second (TPS) required by the associated workload, the numbers of instructions per second (in thousands) required by the workload, the number of I/Os per transaction for that workload, the size of the I/O per transaction, shown as disk transfer size, for that workload, and the number of locks per transaction. Locks are a cluster-wide synchronization mechanism to control access to common resources.

In addition, one can choose whether to indicate disk branching by SOURCE CPU. If the workload has disk branching by SOURCE CPU, each CPU's I/O distribution depends on the CPU running the workload. If not, there is common disk branching, and the I/O distribution across disks is the same regardless of which CPU is supporting the workload.

Figure 5O:
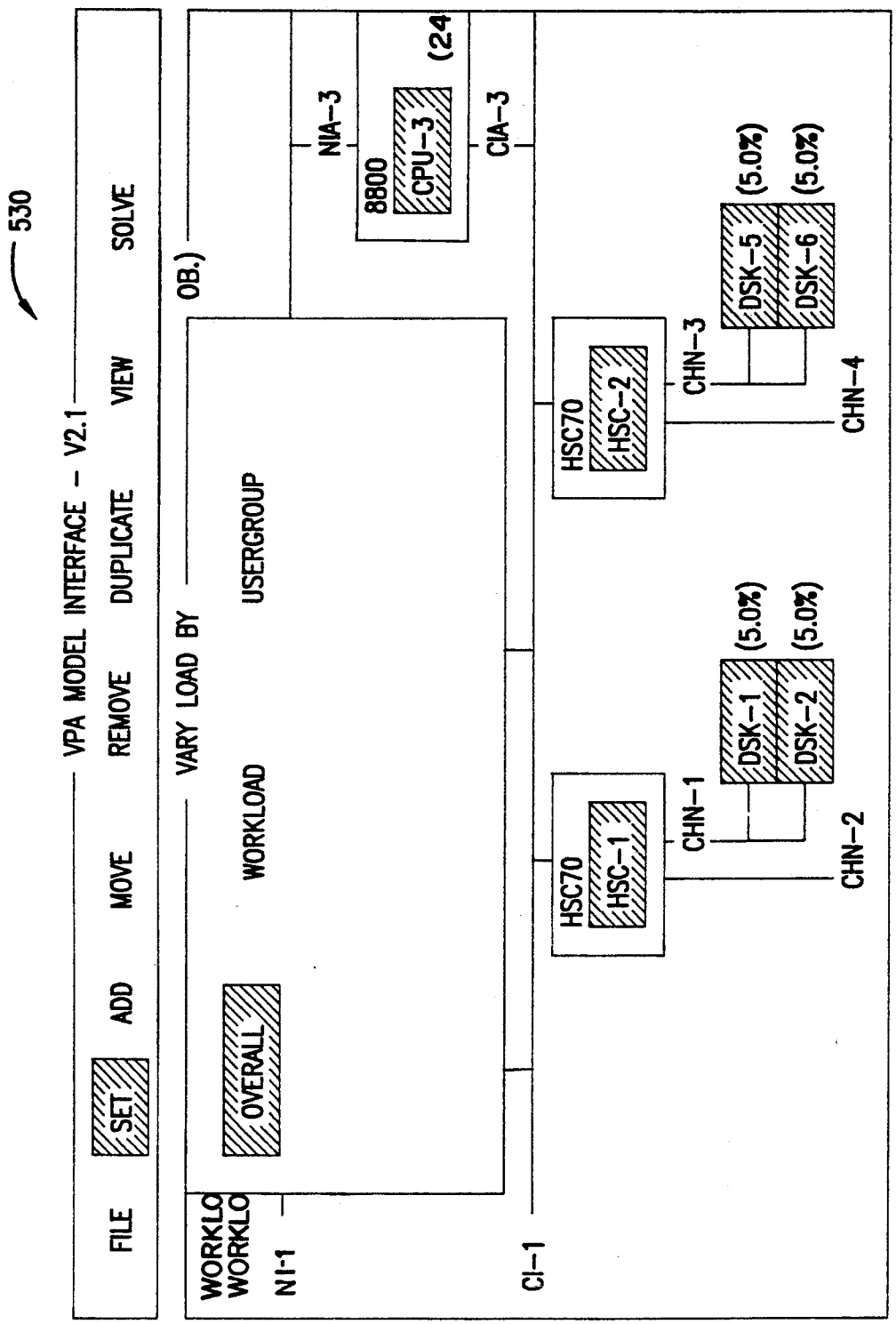

The SET System Load option behaves in a similar manner. If this option is chosen, a display 530 shown in FIG. 5(o) appears to allow an operator to change the load of the computer system either by workload, user group, or overall throughout the system. For example, one could double a particular workload, double the workload provided by a particular user group, or double the workload throughout the system.

Once the SET System Load option and the manner of workload modification is chosen, the operator is prompted to enter the percentage load change and indicate whether the load is to be increased or decreased. After changing the load, the SOLVE option for the model must be chosen to see the effects of the new load.

The SET Object Name option can be used to change the name of an object. Objects include models, busses (such as CI or NI), bus adapters, CPUs, HSCs, channels, disks, workloads and user groups. After the SET Object Name option is selected, and the object is identified, the operator is prompted to supply the new object name.

Figure 5P:
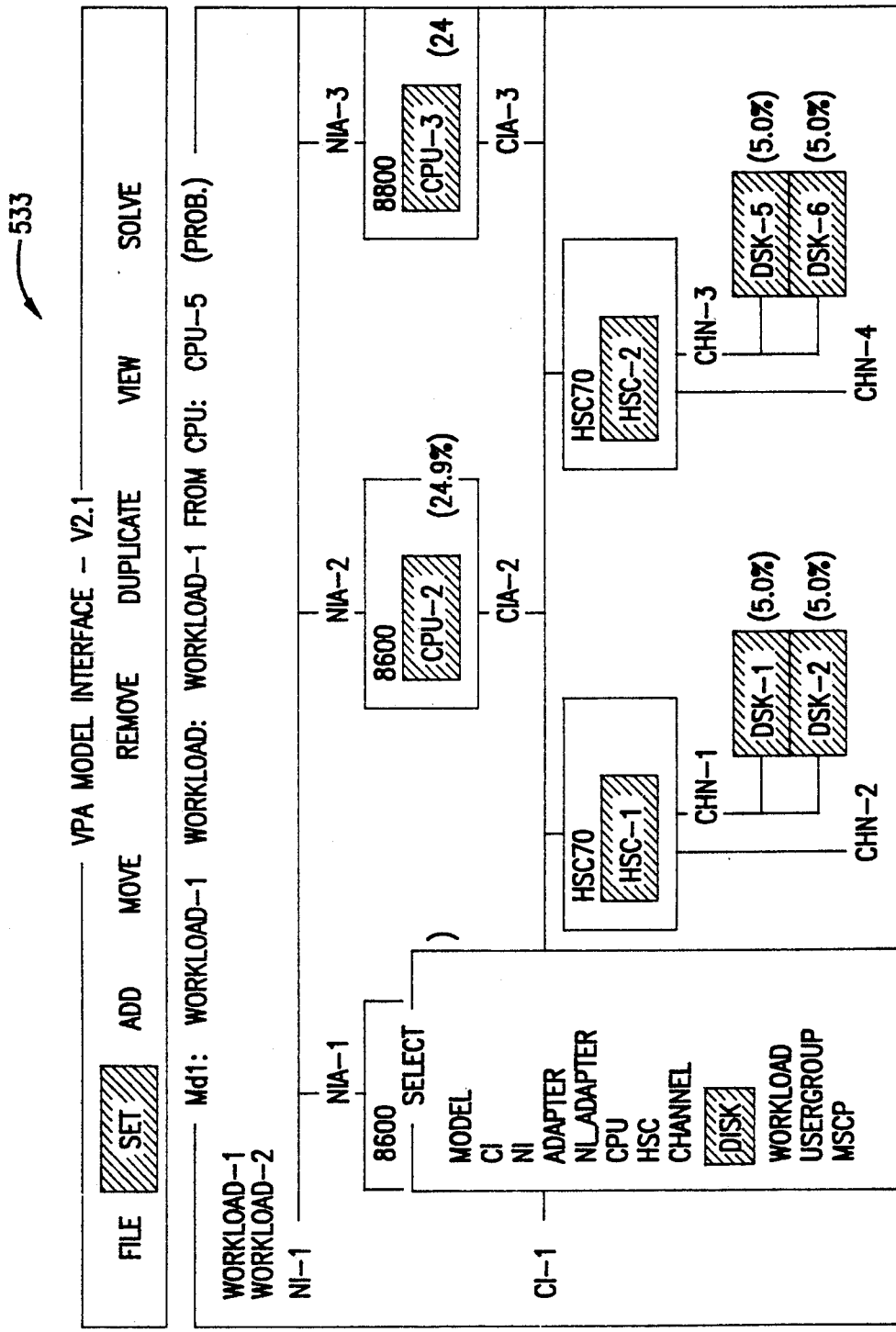
Figure 5Q:
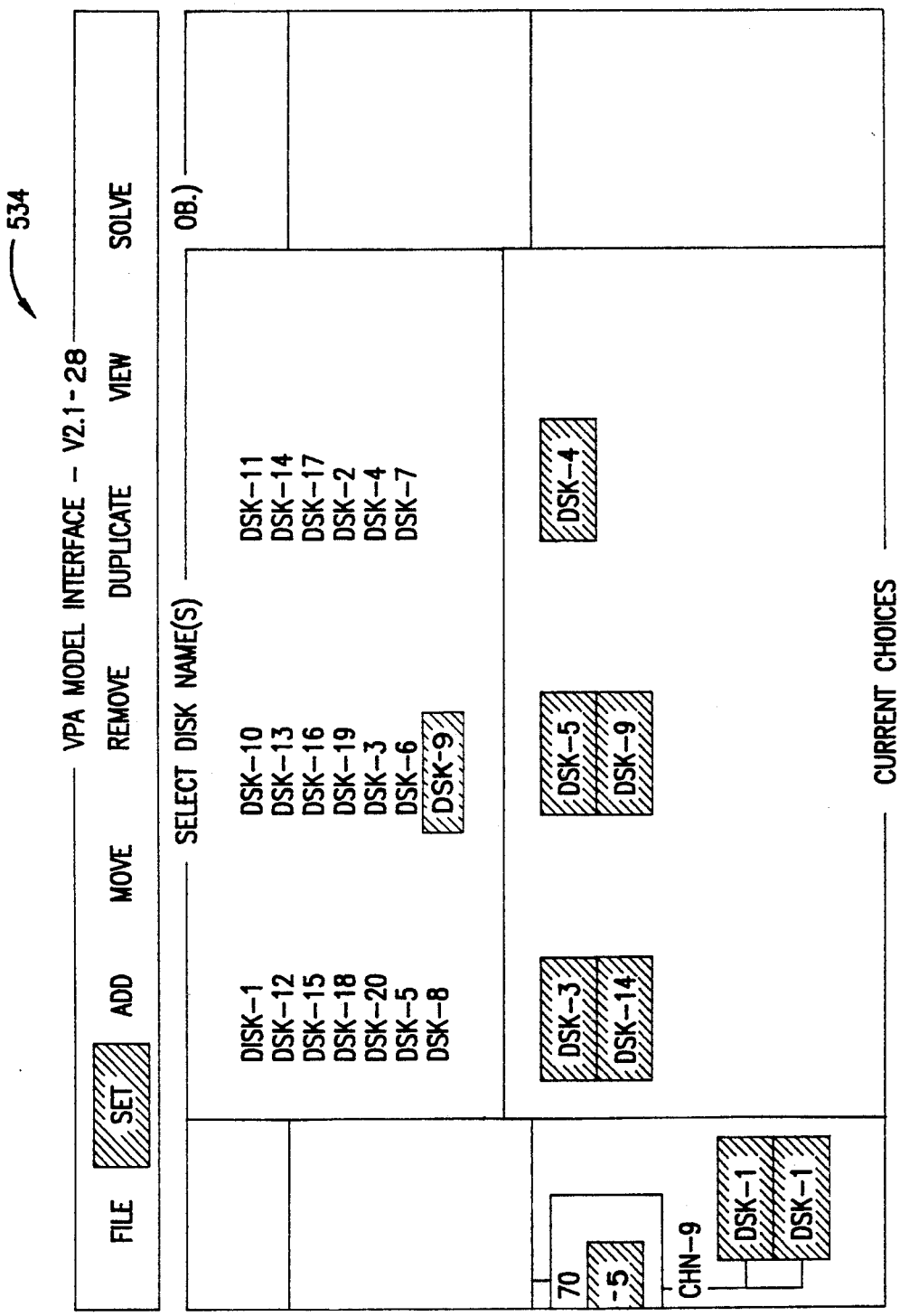

In a similar manner, the SET Object Type option can be used to change the type of bus adapter, CPU, HSC, or disk. If this option is chosen, a display 533 shown in FIG. 5(p) appears on keyboard/display 320 to indicate the device choices. Once a device is chosen, such as a disk in display 533 of FIG. 5(p), a new submenu is overlaid indicating the different devices of the type chosen. That submenu, shown as display 534 in FIG. 5(q), shows all the different disks in the computer system.

Figure 5R:
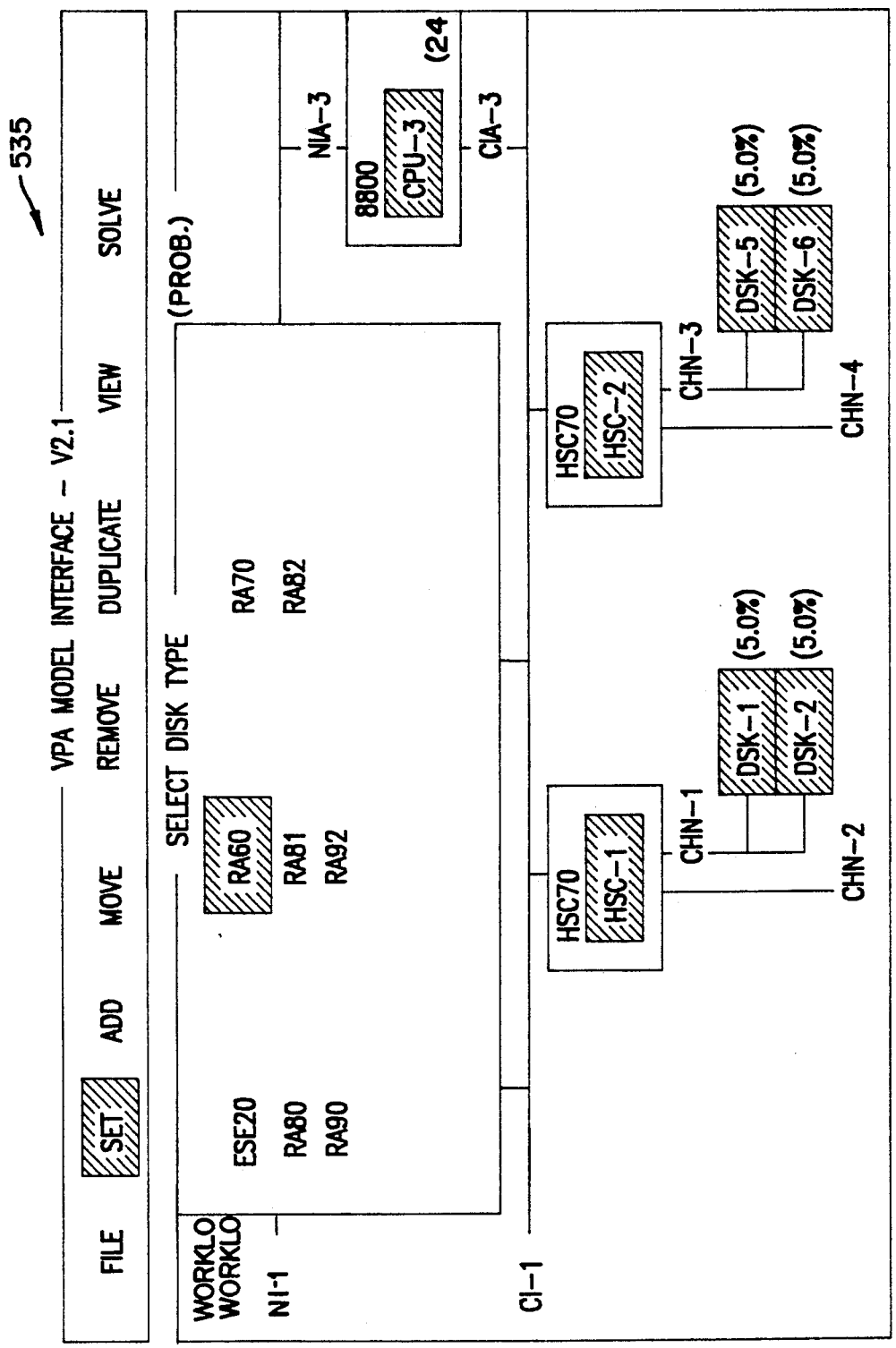

When one or more of the devices are chosen, then display 535 in FIG. 5(r) is selected to indicate the possible types of the selected devices. For example, in display 535 of FIG. 5(r), the RA60 type of disk has been selected.

Figure 5S:
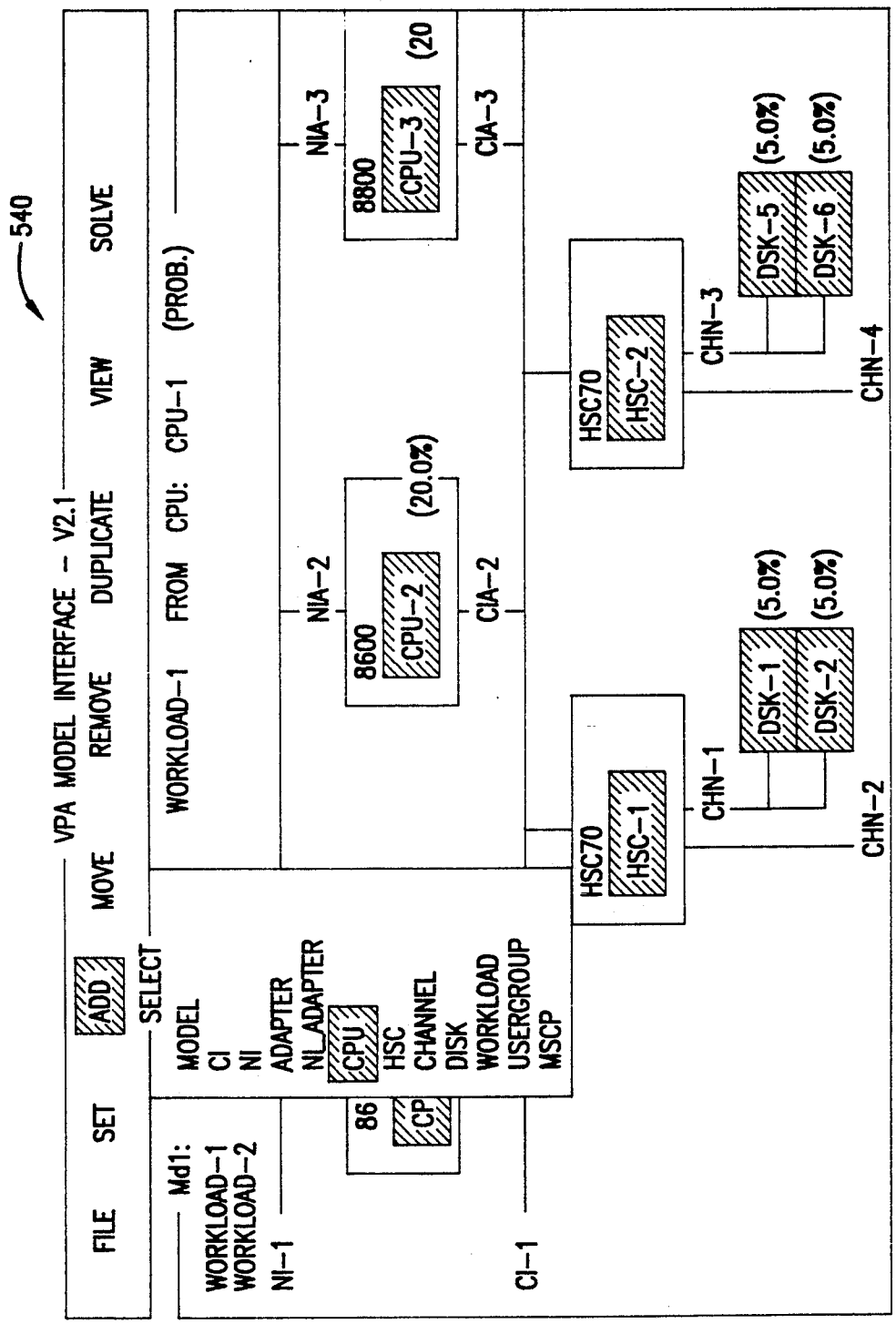

In addition to setting workload distributions and system parameters, physical devices can be added, deleted, or moved. When the ADD option on the main menu 500 of FIG. 5(a) is selected, then a display 540 shown in FIG. 5(s) appears. The ADD option allows one to add a model, a bus (CI or NI), an adapter, a CPU, an HSC, a channel, a disk, a workload, a user group, or MSCP server information.

Figure 5T:
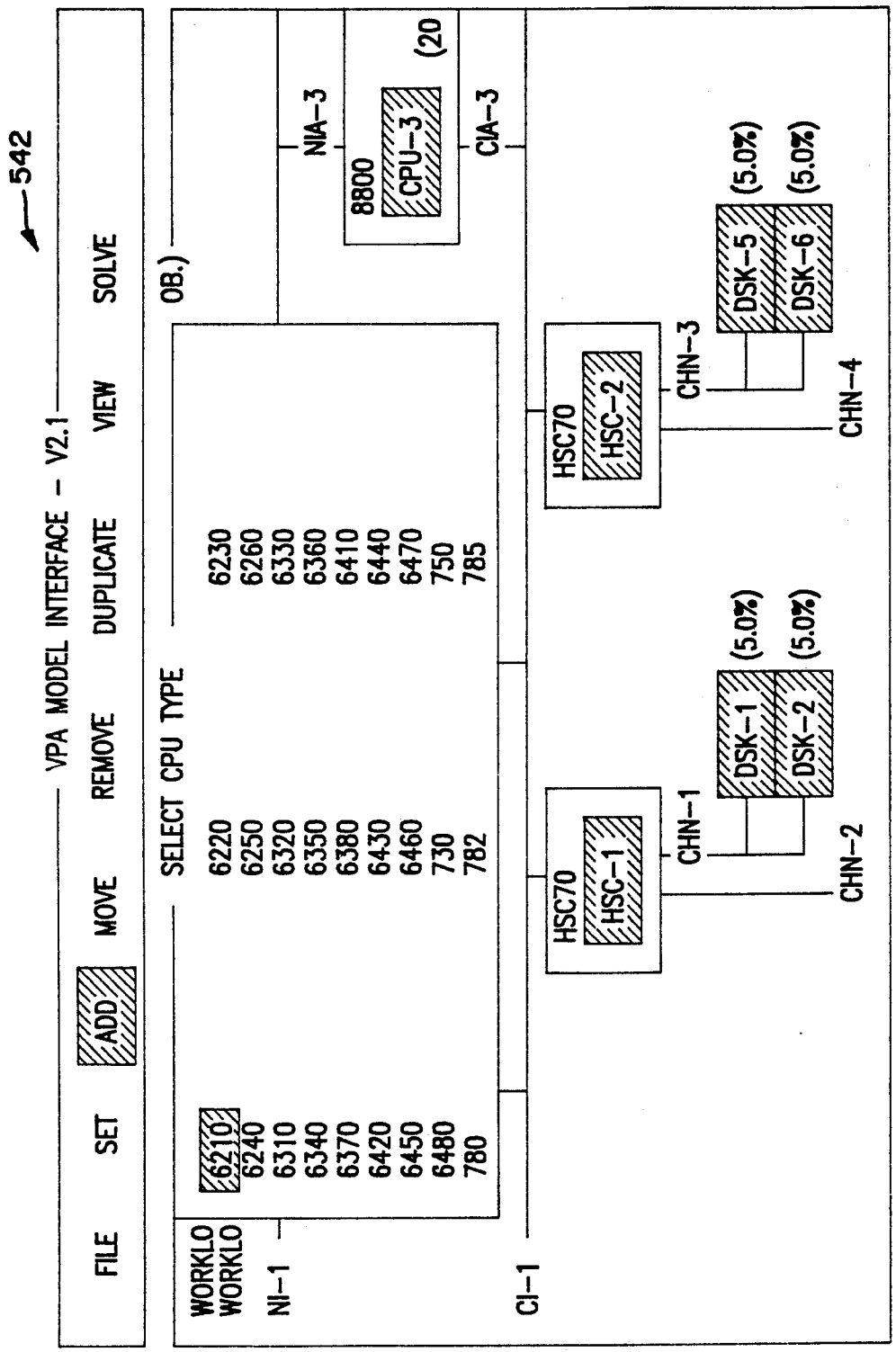

In display 540, the reverse text indicates that a CPU has been chosen to be added. This causes the display 542 shown in FIG. 5(t) to appear on display/keyboard 320. Display 542 indicates the different types of the CPUs which can be added. In adding a CPU, an operator would also be asked to select an adaptor by making a selection from a screen listing possible adapters.

The manner in which the modeling interface determines where to add the device depends upon the type of device. For disks, the operator is asked for the CPU or HSC channel to receiving the disk. CPUs, on the other hand, are added to the most recently identified bus and must be moved if necessary. This mechanism, however, is just the preferred implementation and is not required to practice this invention.

Figure 5U:
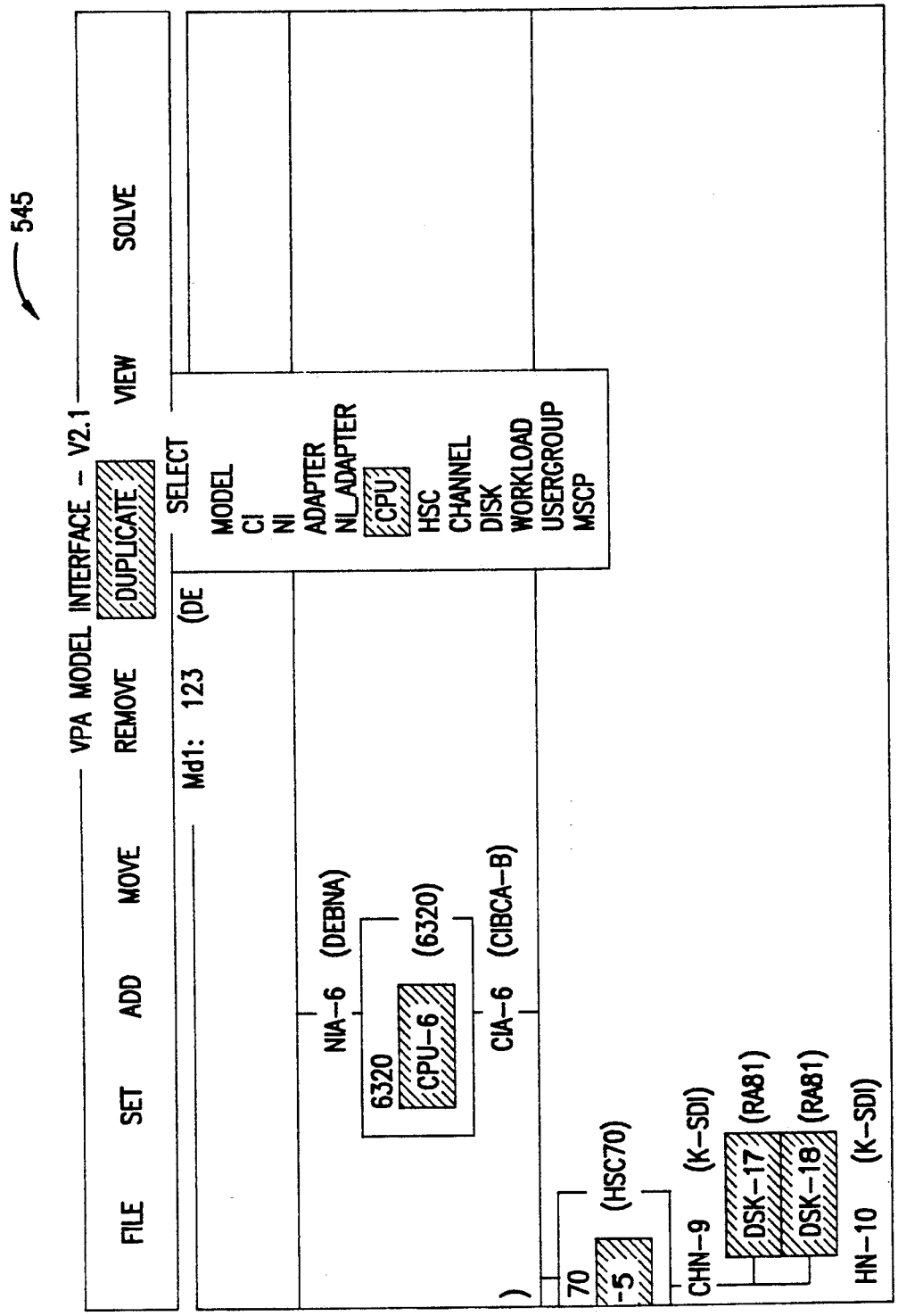
Figure 5V:
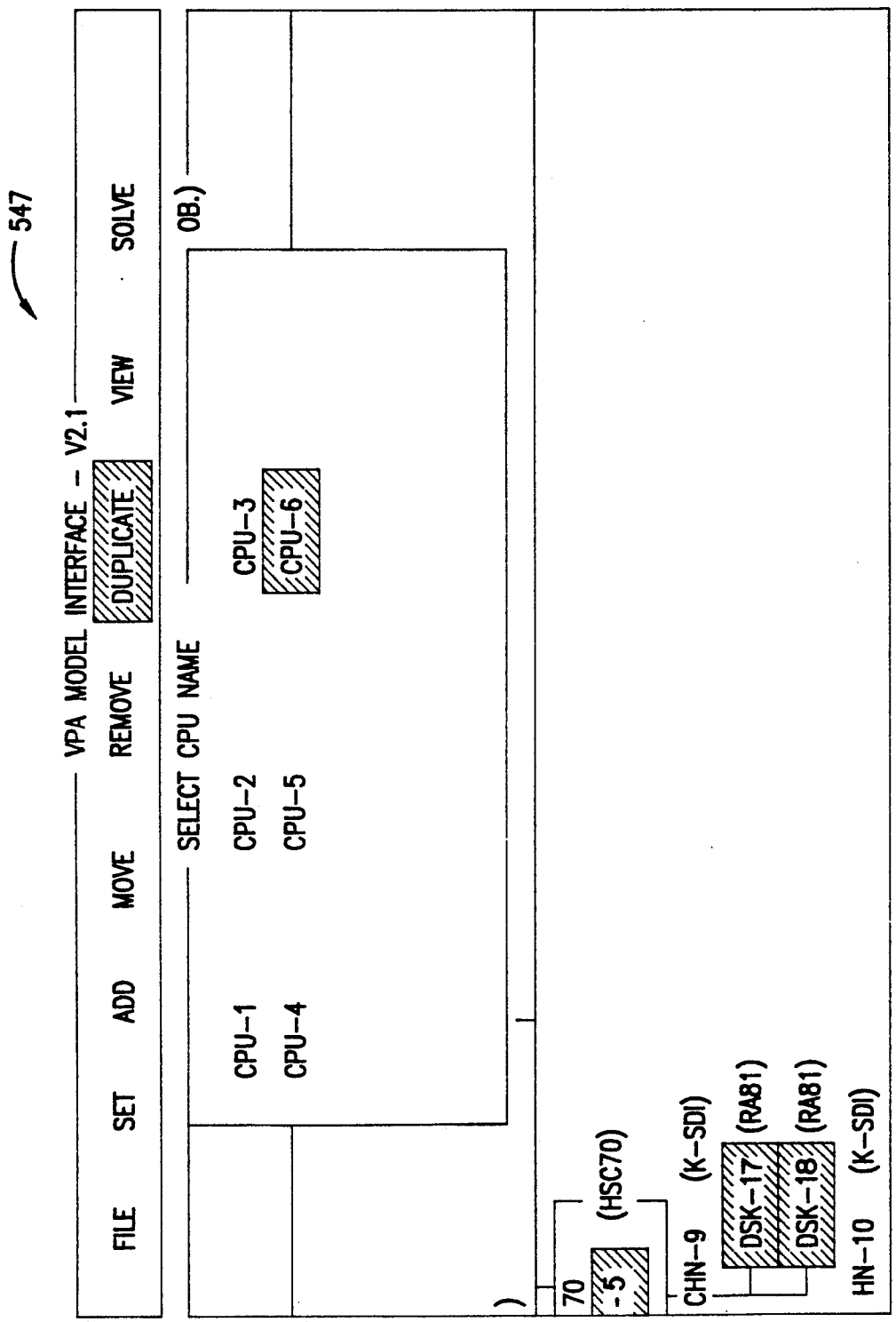

If the DUPLICATE option is chosen from main menu 500 in FIG. 5(a), a display 545 shown in FIG. 5(u) appears. In the preferred implementation, the elements which can be duplicated include a model, a bus, an adapter, a CPU, an HSC, a channel, a disk, a workload, a user group, or MSCP server information. If the CPU option is chosen, as indicated by the reverse text in display 545, a display 547 as shown in FIG. 5(v) appears on display/keyboard 320. Display 547 indicates the possible CPUs which can be duplicated. The device chosen is then duplicated. Both the chosen device and the duplicate device have the same physical connections to the other devices.

Figure 5W:
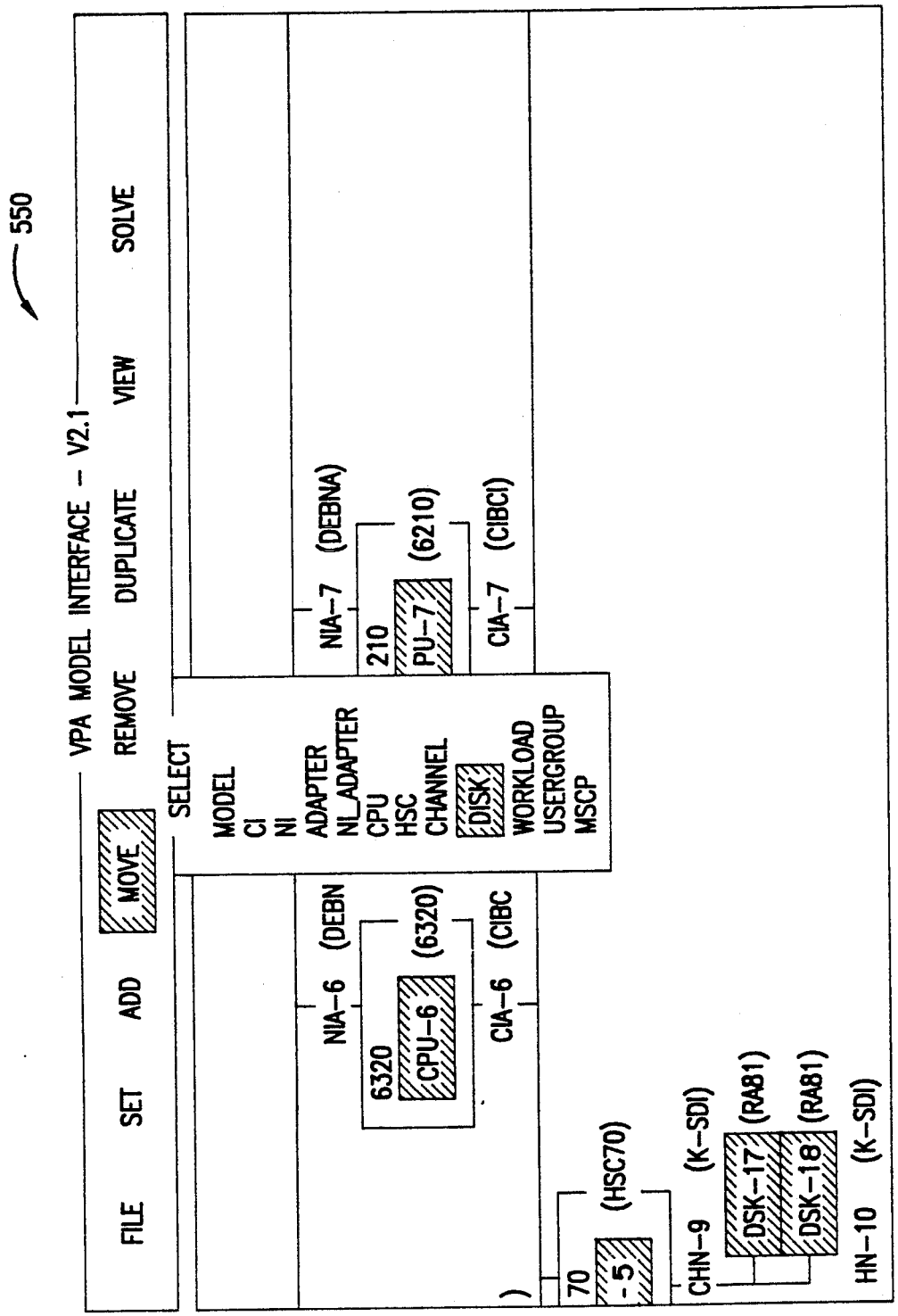
Figure 5X:
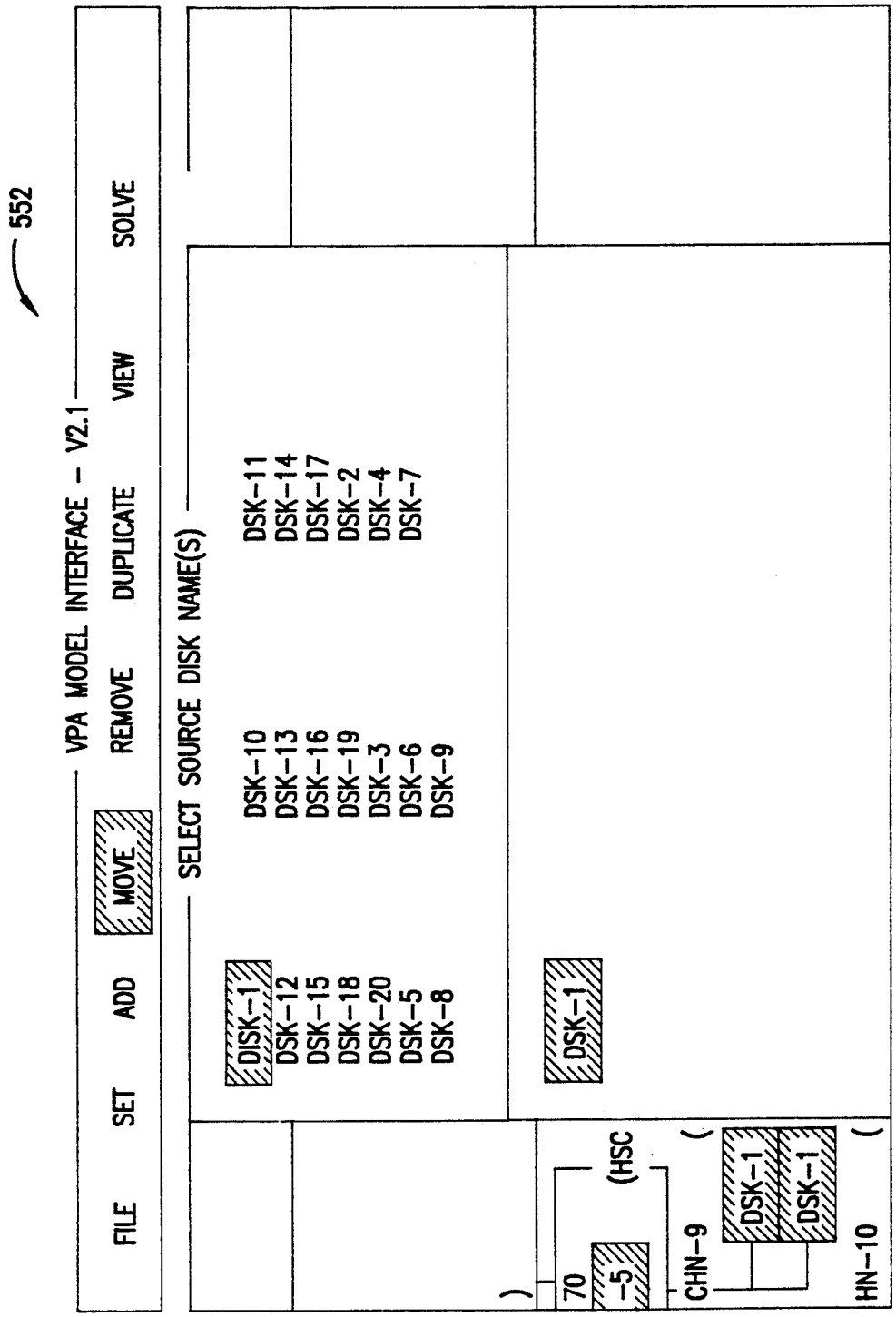

To change a connection, the MOVE option in main menu 500 of FIG. 5(a) is chosen. If this option is chosen, display 550 shown in FIG. 5(w) appears. The move option allows an operator to move an adapter, a CPU, an HSC, a channel, a disk, or a workload. If a disk is chosen to be moved, as shown by the reverse text in display 550, then a display 552, shown in FIG. 5(x), appears.

Display 552 lists all the possible disks that can be moved in the computer system. Using display 552, the operator chooses the disk, called the source disk, to be moved.

Figure 5Y:
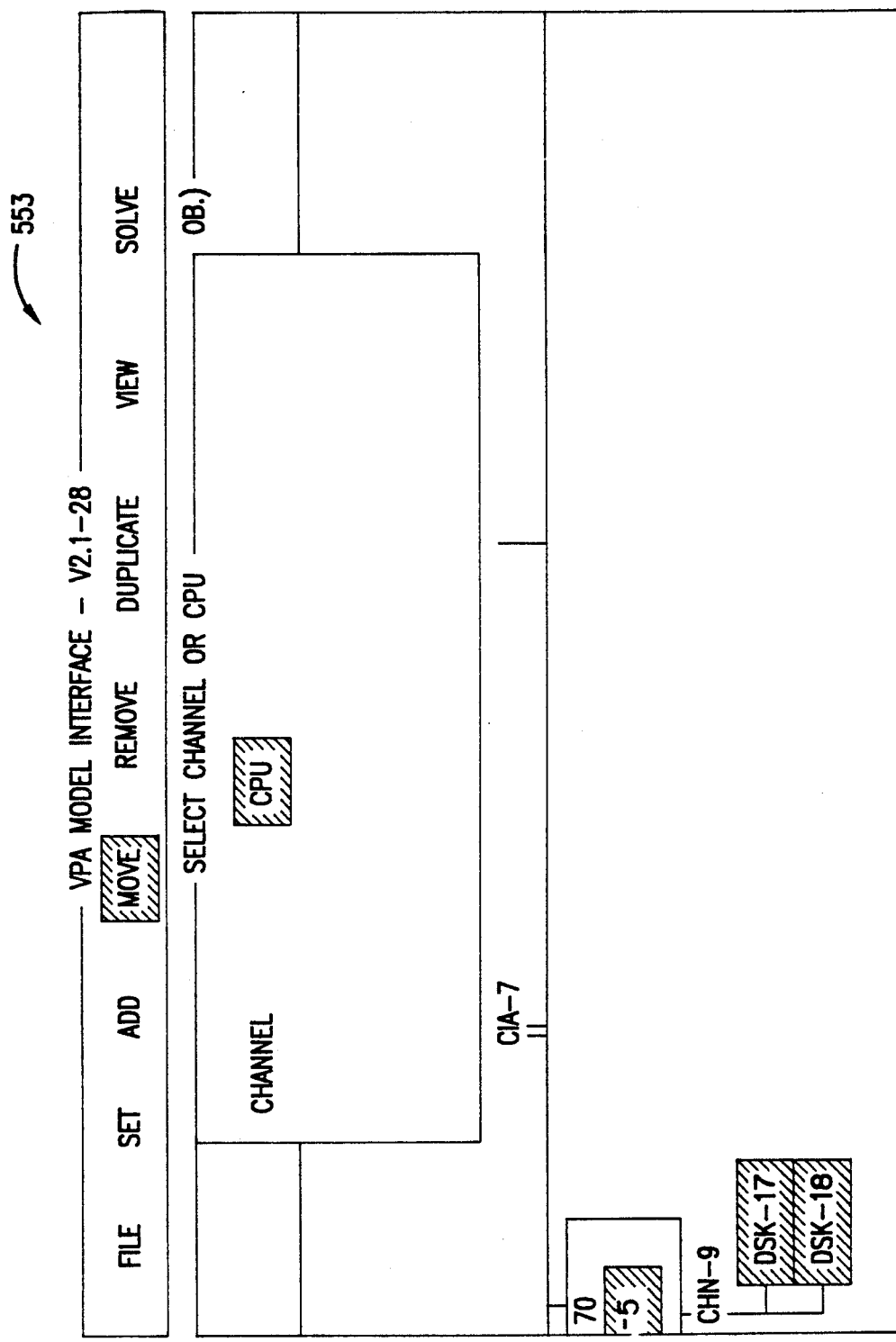

When moving a source disk, the CPU or the channel to which the source disk is to be moved must be chosen. In the preferred implementation, this selection is accomplished using a display 553 shown in FIG. 5(y), which appears on display/keyboard 320 after a disk is selected.

Figure 5Z:
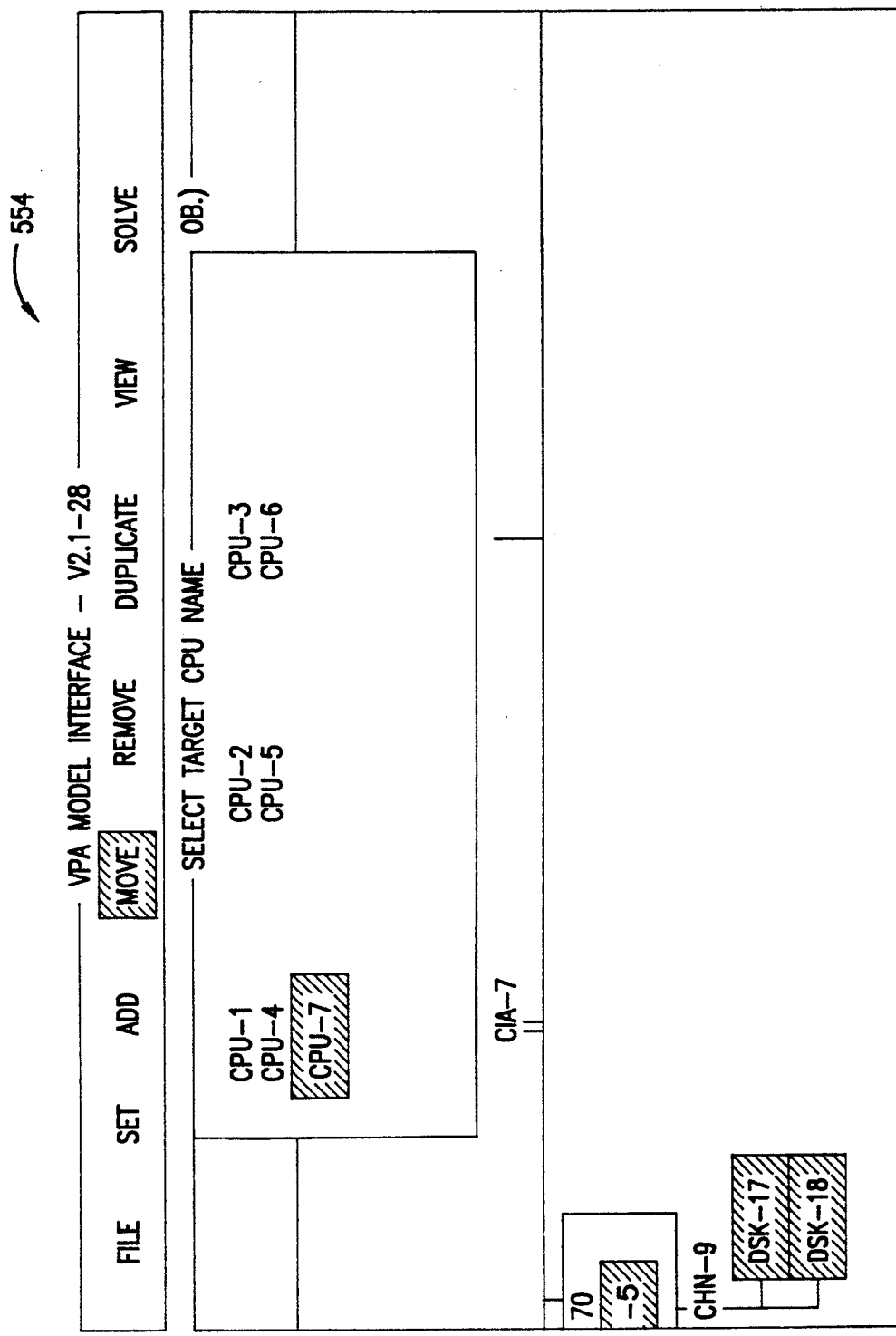

Display 553 indicates whether the disk is to be moved to a channel or to a CPU. In display 553, a CPU has been chosen, as indicated by the reverse text. The selection of a CPU causes display 554, shown in FIG. 5(z), to appear. Display 554 lists the possible CPUs to which a disk can be moved. As shown in display 554, the source disk is to be moved to a target CPU identified as CPU-7.

A physical device or workload can also be deleted from the computer system configuration using the REMOVE option in main menu 500 shown in FIG. 5(a). Selection of this option causes the appearance of a display 555, shown in FIG. 5(aa) Display 555 indicates the types of devices which can be removed. Display 555 shows that a CPU has been chosen, which causes a display 557, shown in FIG. 5(bb), to appear. When a device is to be removed, the operator is asked for a confirmation because removal of a device has far-reaching effects that are difficult to undo in the preferred implementation. Also in the preferred implementation, removal of a device removes all devices connected to that device.

Returning to FIG. 4 and flow chart 400, the next step after receiving an input is the modification of the model of the computer system in accordance with received input to reflect the modified configuration of the computer system (step 430). Modification using the SET option uses the keyboard logic 323 and data storage 315. Modification using the ADD, DUPLICATE, MOVE, and REMOVE options uses changer 330. The details of how such modification occurs in data storage 315 will be described in greater detail below.

If a change has been made which affects the distribution of the workloads, the new workload distributions must be determined (step 440). The steps for redistributing are shown in greater detail to the side of flow chart 400.

Redistributing involves identifying a set of physical devices in the computer system to which the load will be redistributed. The devices in the set are those which also support the workload as the identified physical device (i.e., the one added or removed, or the one which had its workload altered) (step 443). For example, if a CPU had four disks and one was removed, the remaining three would constitute the set of physical devices involved in redistribution.

The workloads are then redistributed among the members of the set according to the Balancing Mode (step 447). This redistribution requires first determining which members of the set have FLOATING probabilities, and then distributing the probabilities among those members in accordance in the Balancing Mode.

Next, new values of the selected metrics for the modified model of the computer system are determined (step 450). Preferably, this is accomplished by selecting the SOLVE option from main menu 500 shown in FIG. 5(a).

After the new values for the metrics are determined, the diagram of the modified configuration of the computer system, with new values for the metrics, are displayed on display/keyboard 320 (step 460). The resulting displays have current information.

Figure 5:
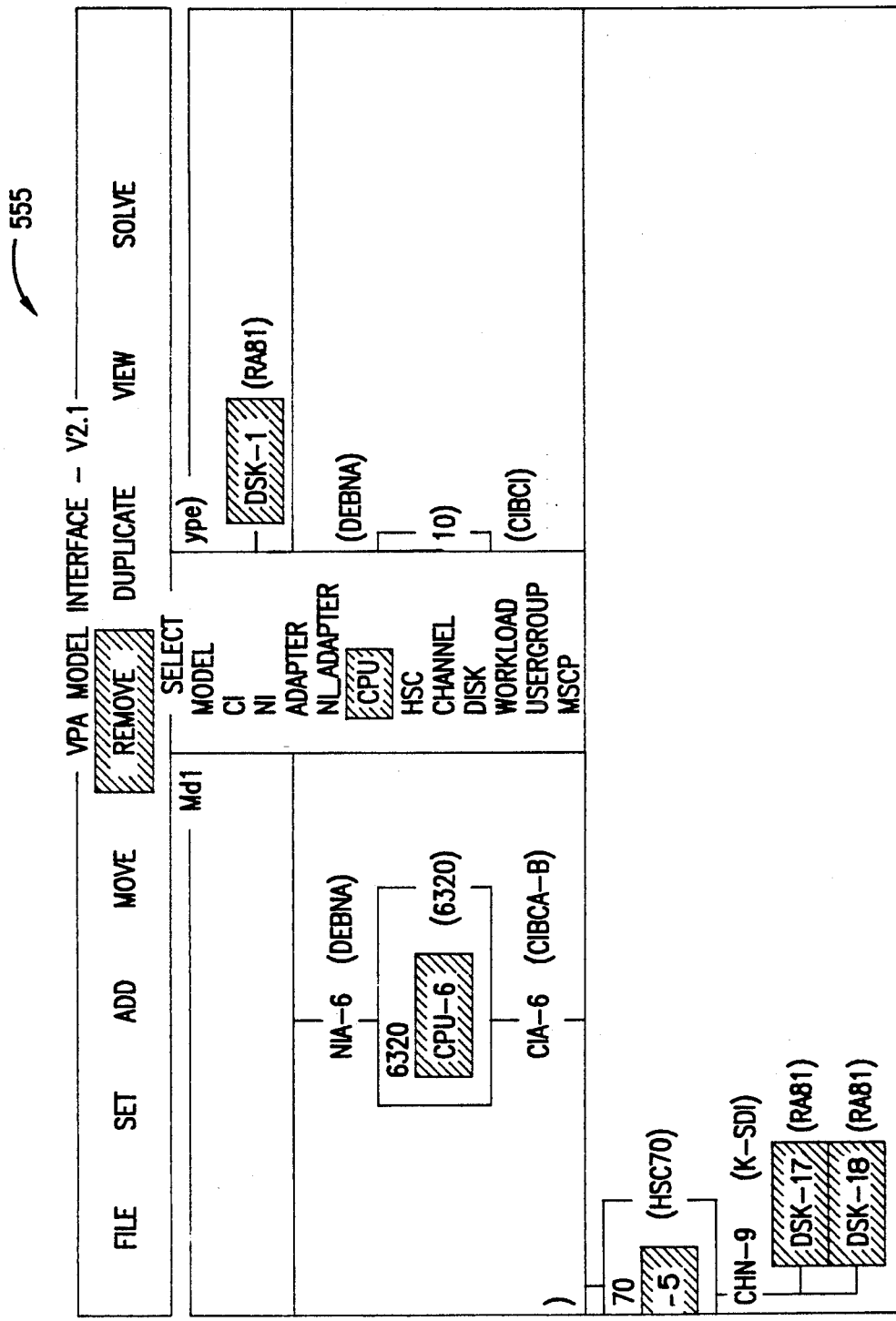
Figure 5:
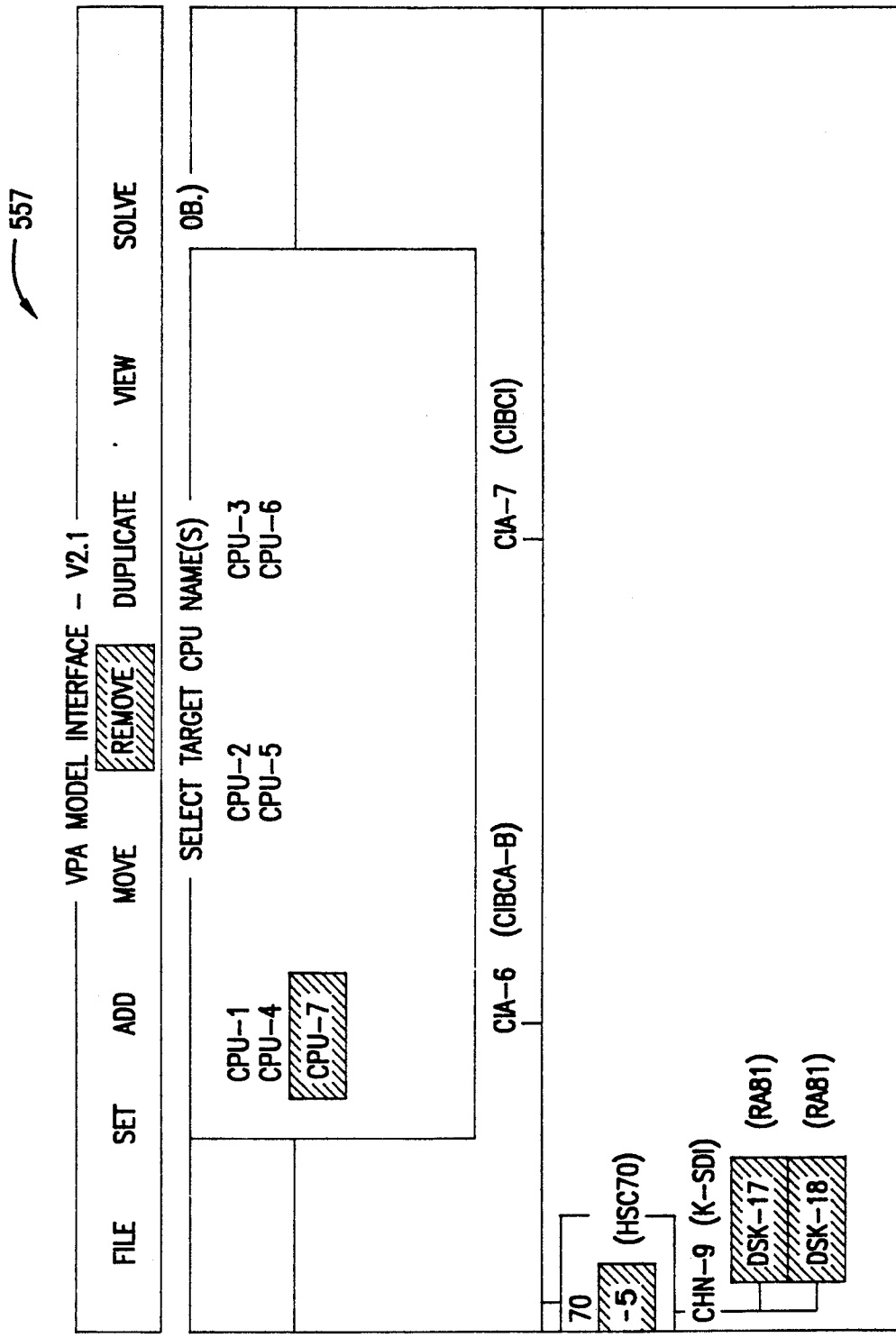
Figure 5:
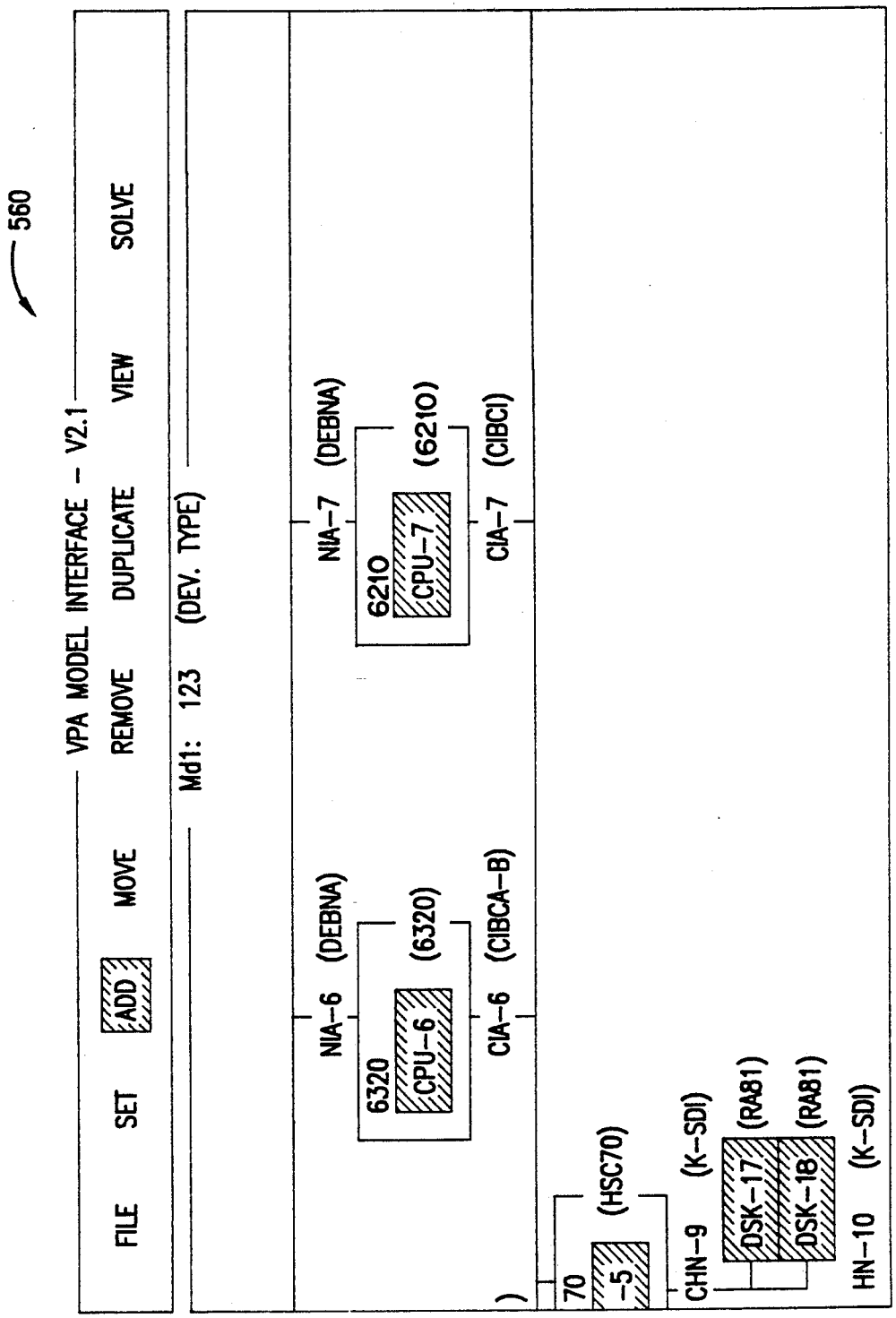
Figure 5:
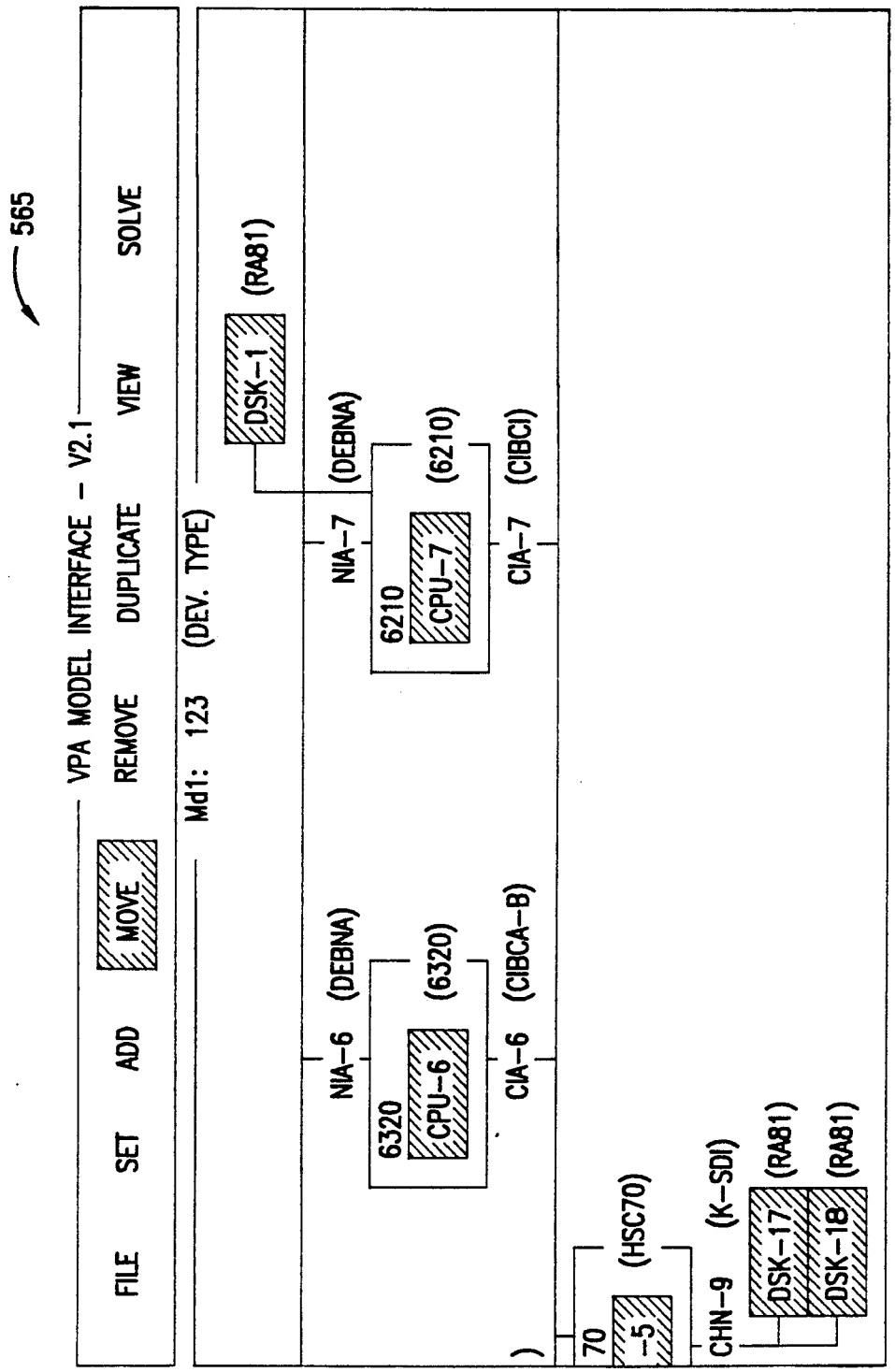
Figure 5:
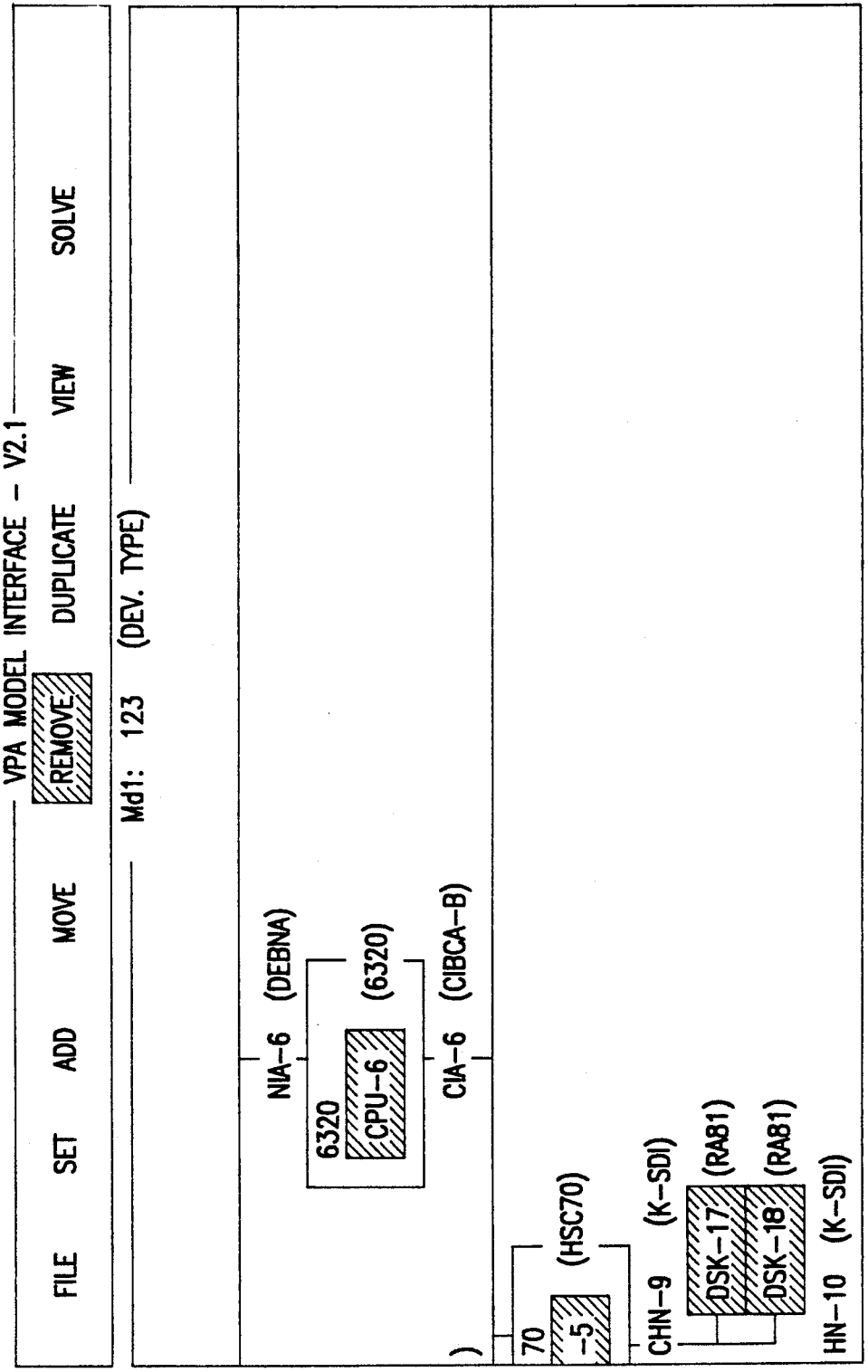
Figure 5:
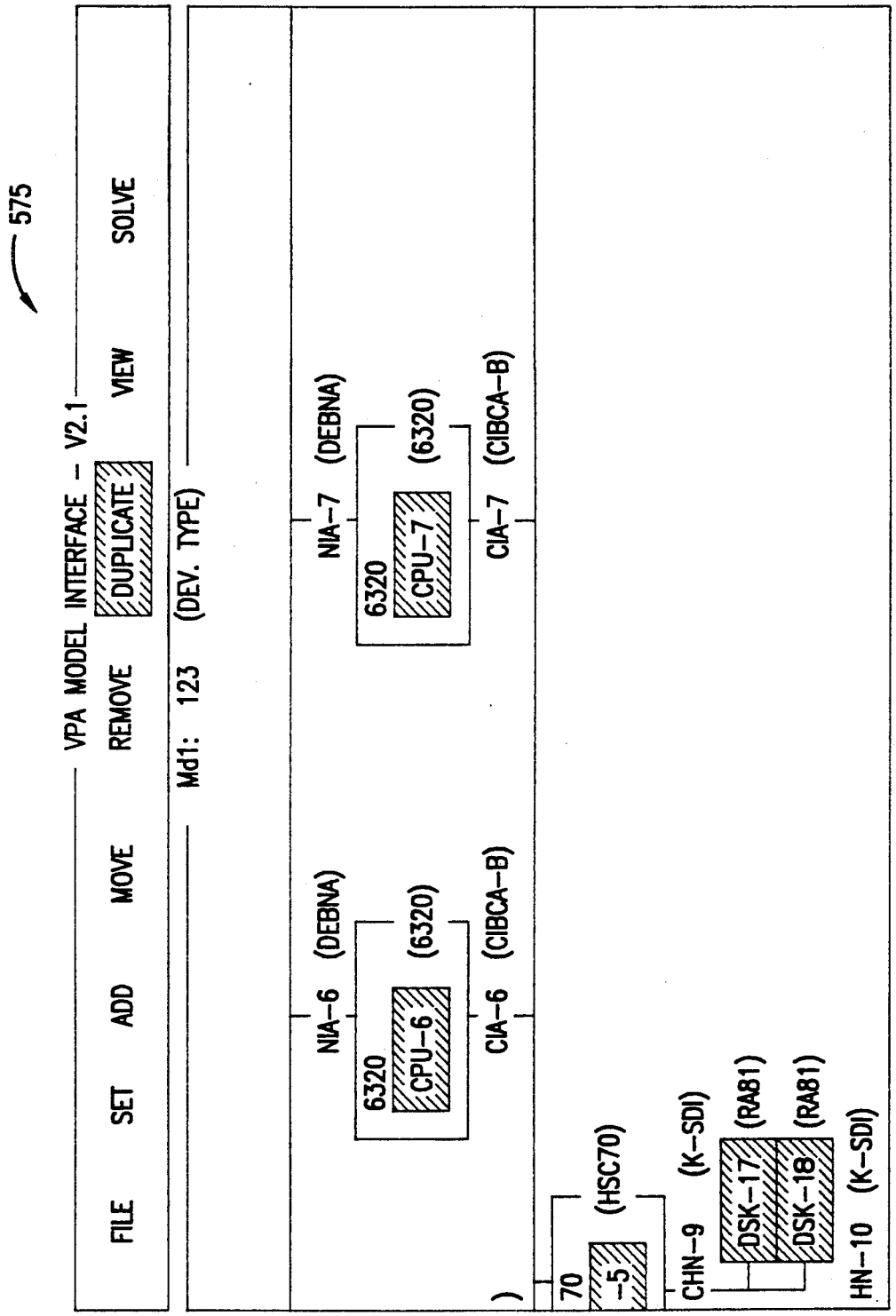
Figure 5:
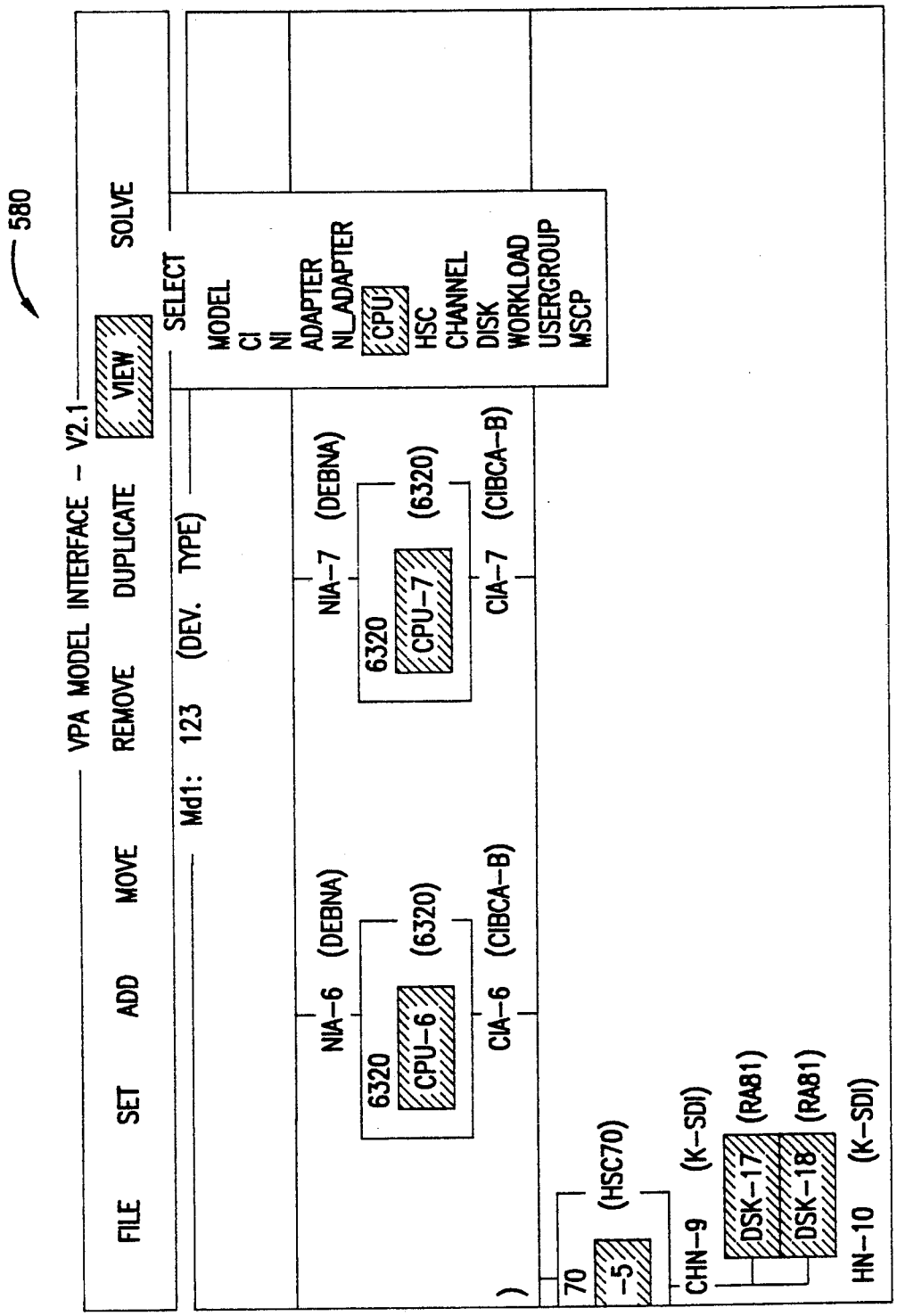
Figure 5:
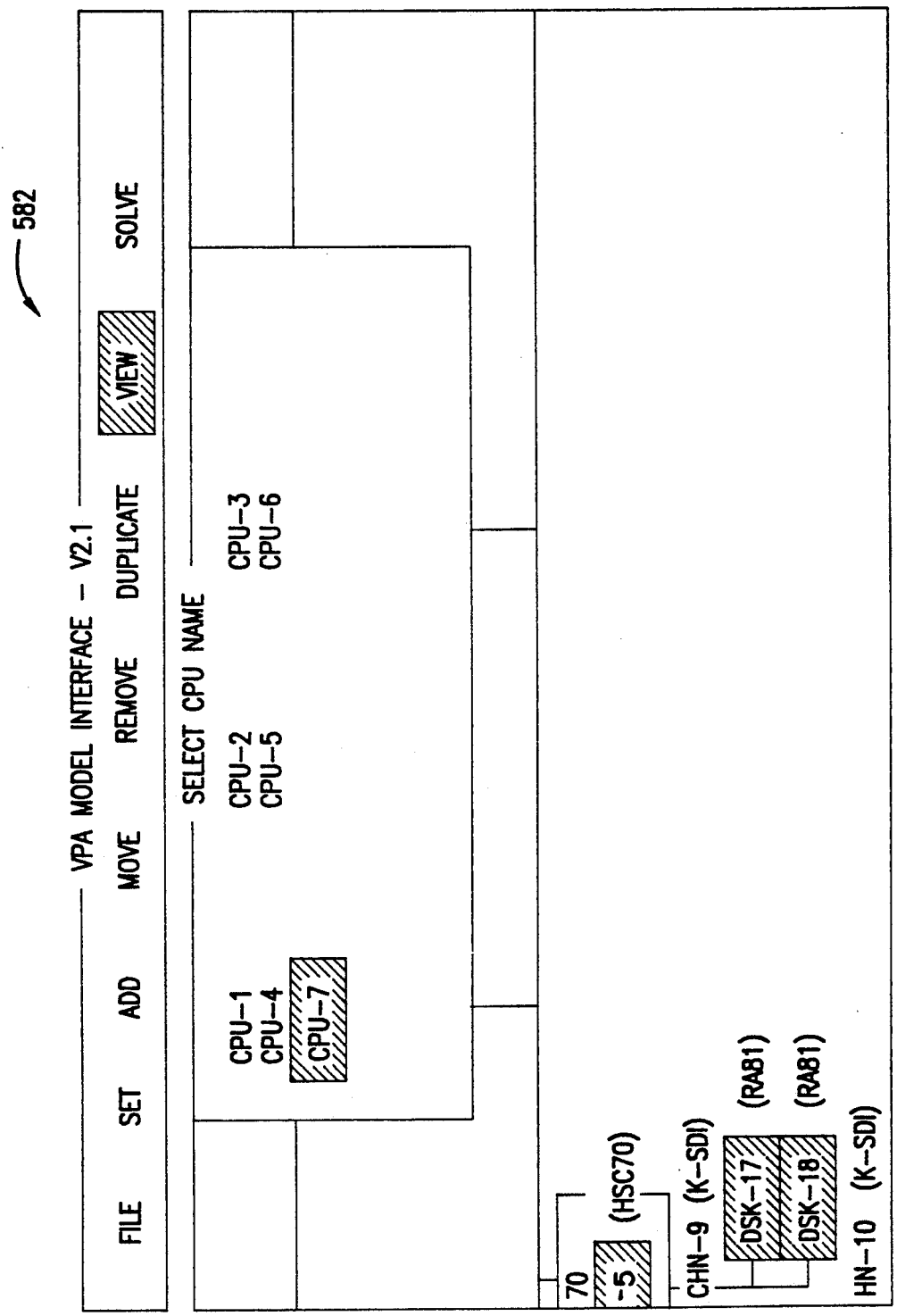
Figure 5:
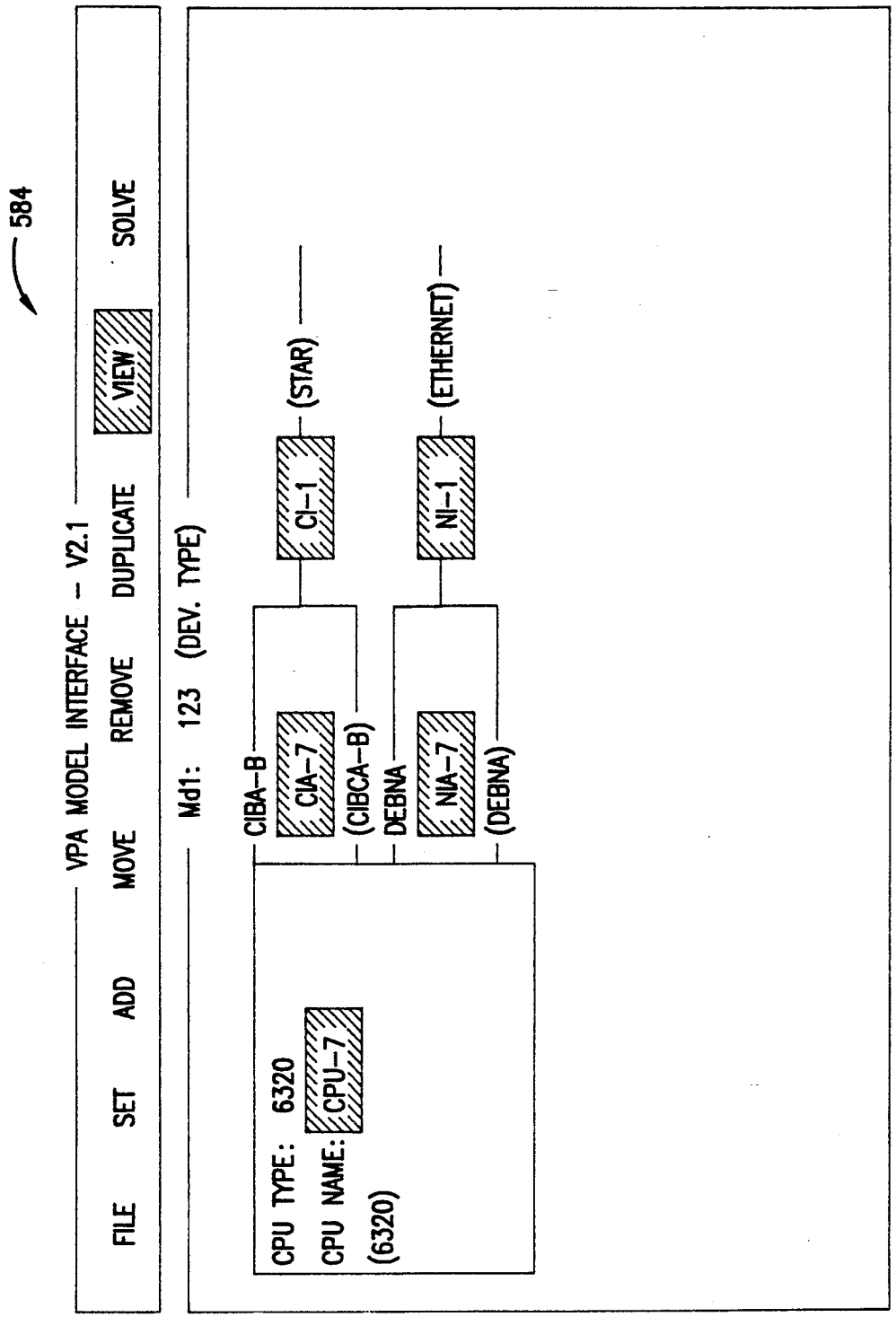

As examples, display 560 in FIG. 5(cc) results from the addition of a CPU. Display 565 in FIG. 5(dd) results from the movement of a disk. Display 570 in FIG. 5(ee) results from the removal of a CPU. Display 575 in FIG. 5(ff) results from the duplication of a CPU.

Another feature provided by the preferred implementation is the VIEW option which allows an operator to examine specific portions of a model. The view option permits a one level ZOOM capability to show more detail. For example, if the VIEW option is chosen from main menu 500 in FIG. 5(a), then a display 580 (FIG. 5(gg)) appears on display/keyboard 320 prompting the operator to indicate which elements are desired to be viewed.

If as indicated in display 580, a CPU is to be viewed, then the focus of the model is on the new CPU rather than on the entire model or some other device. The display 582 in FIG. 5(hh) then appears.

Display 582 allows an operator to select the CPUs in the system to be viewed. If, as indicated in display 582 in FIG. 5(hh), CPU-7 is chosen, then display 584 as shown in FIG. 5(ii) appears showing the CPU-7, its adapters, and the busses to which it is connected in greater detail.

B. Data Structures

Figure 6:
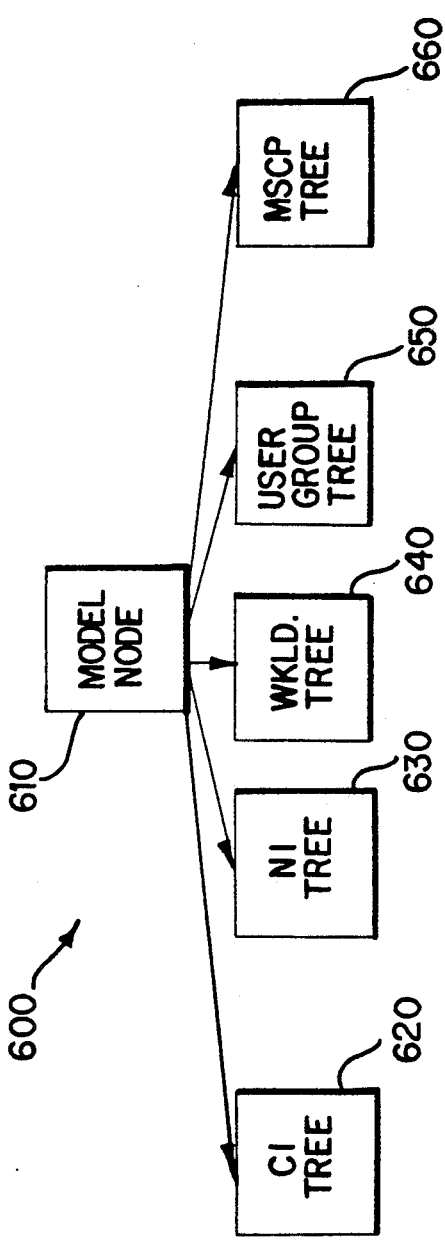
FIG. 6 is an overview of the data structure used in the preferred implementation of this invention.

FIG. 6 is a block diagram of a model 600 showing the relationship between individual data structures stored within data storage 315. The root of model 600 is the model root 610 which identifies a model for a computer system created from the .MDL file and which is represented in a node described below. Model root 610 has five children, all of which interrelated, as described in detail below.

Two of the children, the CI tree 620 and NI tree 630, together constitute a device data structure. Workload tree 640 is a data structure showing the relationships of the different workloads to different devices. User group tree 650 is a data structure showing the different user groups and their relationship to different workloads. MSCP tree 660 is a data structure showing the relationships of devices providing MSCP services.

Although in the preferred embodiment, trees 620-660 have a modified tree data structure, such a structure is not strictly required to practice the present invention. As will be apparent from the description of the invention which follows, one advantage of a tree structure is the ease by which modifications may be made to computer system configurations. Persons of ordinary skill in the art will recognize that other data structures which permit easy modification may also be used.

1. Device Data Structure

Figure 7:
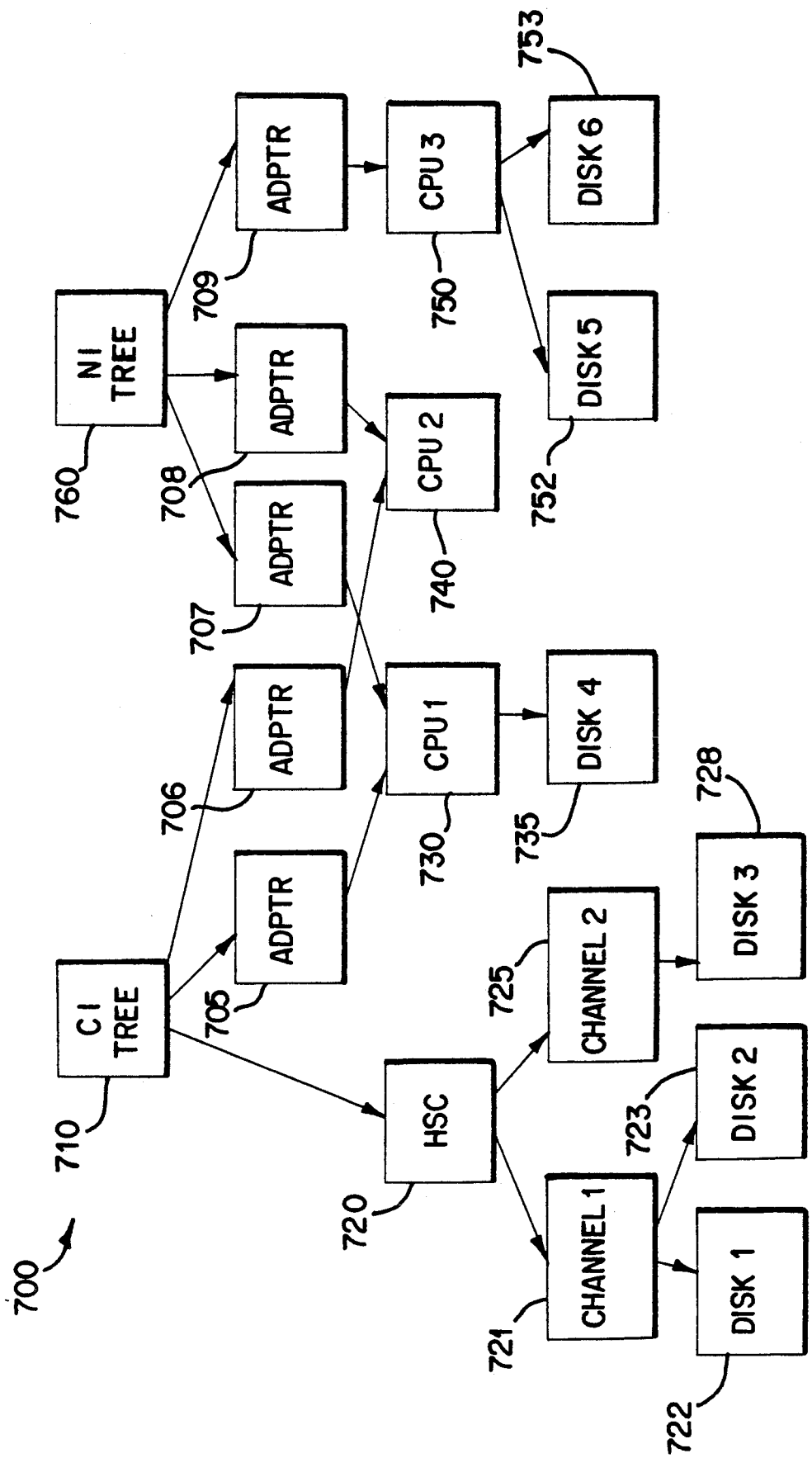
FIG. 7 is a diagram of a preferred implementation of a device tree.

An example of a CI tree 620 and an NI tree 630 are shown in greater detail in FIG. 7. In FIG. 7, a device data structure 700 is represented as including both a CI tree and an NI tree. The particular configuration represented by device data structure 700 is that of computer system 100 shown in FIG. 1.

The CI tree 701 includes a CI root node 710 which has, as children, nodes for HSC 140, represented by HSC node 720, and adapters 112, and 123 for the CPUs coupled to CI bus 106 in FIG. 1. Node 705 corresponds to adapter 113, and node 706 corresponds to adapter 123. The child of adapter node 705 is CPU1 node 730 corresponding to CPU1 110, and the child of adapter node 706 is CPU2 node 740 corresponding to CPU2 120. The children of the HSC node 720 are channel1 150, represented by channel1 node 721, and channel2 155, represented by channel2 node 725.

The children of channel1 node 721 are nodes representing disk1 160 and disk2 162 (FIG. 1). These nodes are disk1 node 722 and disk2 node 723, respectively. Similarly, the child of channel2 node 725 is disk3 node 728, which corresponds to disk3 164 (FIG. 1).

CPU1 node 730 has a single child, disk4 node 735. Disk4 node 735 corresponds to disk4 166 (FIG. 1).

The NI tree 702 includes an NI root node 760 which has as children adapter nodes 707, 708, and 709, corresponding respectively to adapters 112, 122, and 132. The children of adapter nodes 707, 708, and 709 are respectively CPU1 node 730, CPU2 node 740, and CPU3 node 750, corresponding respectively to CPU1 110, CPU2 120, and CPU3 130 (FIG. 1). CPU1 node 730 and CPU2 node 740 have already been described above in the discussion of CI tree 701. CPU3 node 750 has two children, disk5 node 752 and disk6 node 753. Disk5 node 752 corresponds to disk5 168, and disk6 node 753 corresponds to disk6 node 170, both in computer system 100 (FIG. 1).

Figure 8:
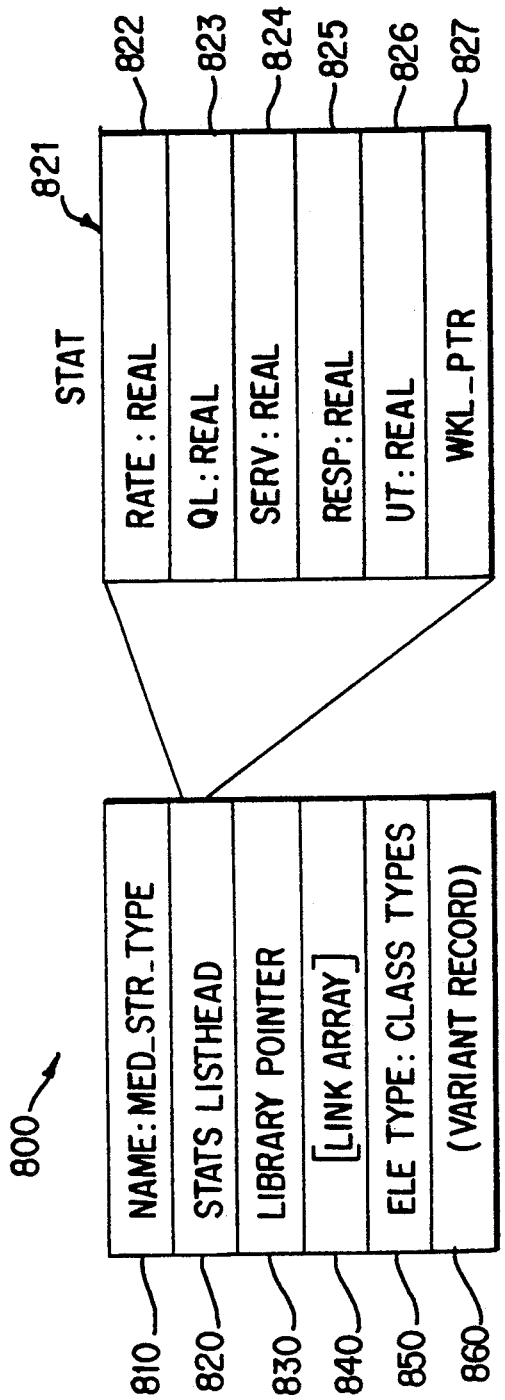
FIG. 8 is a diagram of a preferred implementation of a generic node for use in the data structure of FIG. 6.

Device data structure 700 includes nodes each of which correspond to a different physical device of the computer system represented. FIG. 8 shows a diagram of a preferred implementation of a generic node 800. The node is called generic because it can be used, with slight modification, as a node for model root 610 or any of the trees 620-660 shown in FIG. 6. Node 800 has several fields 810-860.

Name field 810 contains the name of the element represented by the node. The contents of name field is preferably a string.

Statistics record list head 820 for a device identifies the location of a linked list of statistics elements 821 each of which contains certain statistics for a workload supported by the device. For a device, statistics record 821 includes a rate subfield 822 indicating the number of processing transactions (TPS) or I/O transactions (I/Os) from the device for the corresponding workload. Queue length subfield 823 indicates the length of the queue that is waiting to use the device for the corresponding workload. Service time subfield 824 indicates the amount of time that takes the device to process a request for the corresponding workload. Response time subfield 825 equals the service time plus any queuing delays. Utilization subfield 826 indicates the percentage of the devices capabilities currently being utilized for the corresponding workload. Workload pointer 827 indicates the node for the corresponding workload.

In addition, there is an additional statistics element in the linked list. This element has the composite statistics for all of the workloads of the device.

The statistics list head for workload nodes has entries for rate subfield 822 indicating the throughput for the entire workload, and for response time subfield 825, which represents the time to complete an entire transaction for that workload. The workload pointer subfield 827 indicates the model node.

All of the subfields in statistics record 821 are represented as real numbers, except for the workload pointer, and the values in all of the subfields except the rate subfield are determined as a result of performing the SOLVE option. The value in the rate subfield is either input by a user, or is received from the .MDL file.

The library pointer subfield 830 of generic node 800 references a library record specific to a device type. The library record describes parameters associated with that device type. For example, the library for a certain type of disk would contain its seek time, latency, transfer rate, etc.

Figure 9:
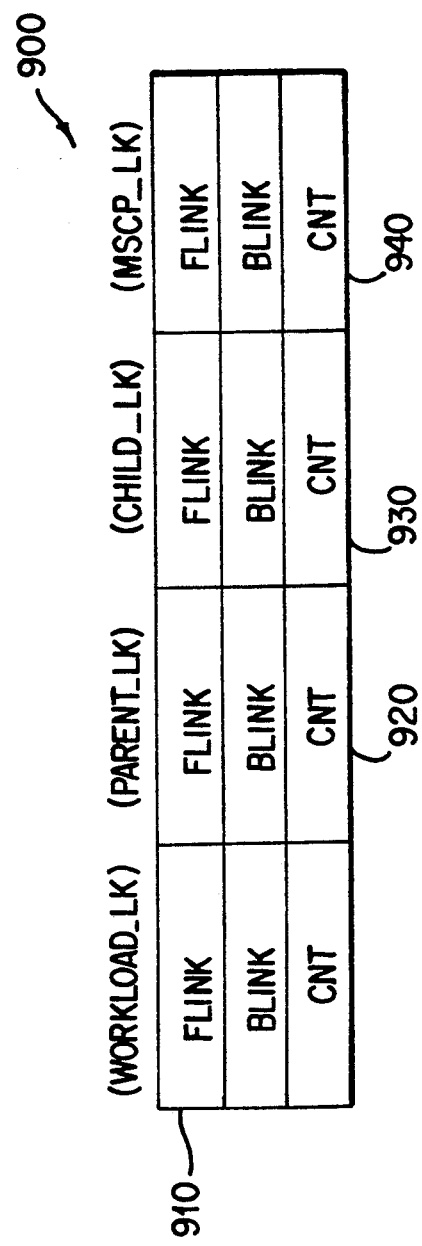
FIG. 9 is a preferred implementation of a link array for use in the node of FIG. 8.

Link array field 840 identifies headers for various linked lists which relate to the element corresponding to node 800. One set of headers is shown in detail in FIG. 9 as link header list 900. Link header list 900 includes a workload linked list header 910, a parent linked list header 920, a child linked list header 930 and an MSCP linked list header 940.

Workload linked list header 940 is a header for a linked list of workloads which the corresponding device supports. Parent linked list header 920 is the header for a linked list of nodes which are parents to the corresponding element node. In a similar manner, child linked list header 930 is the header for a linked list of the children of the corresponding element. MSCP linked list header 940 is the header for a linked list of MSCP trees involving the device corresponding to the node. In the preferred embodiment, the link header list, and more specifically the linked lists, are specific to the different types of nodes.

Figure 10:
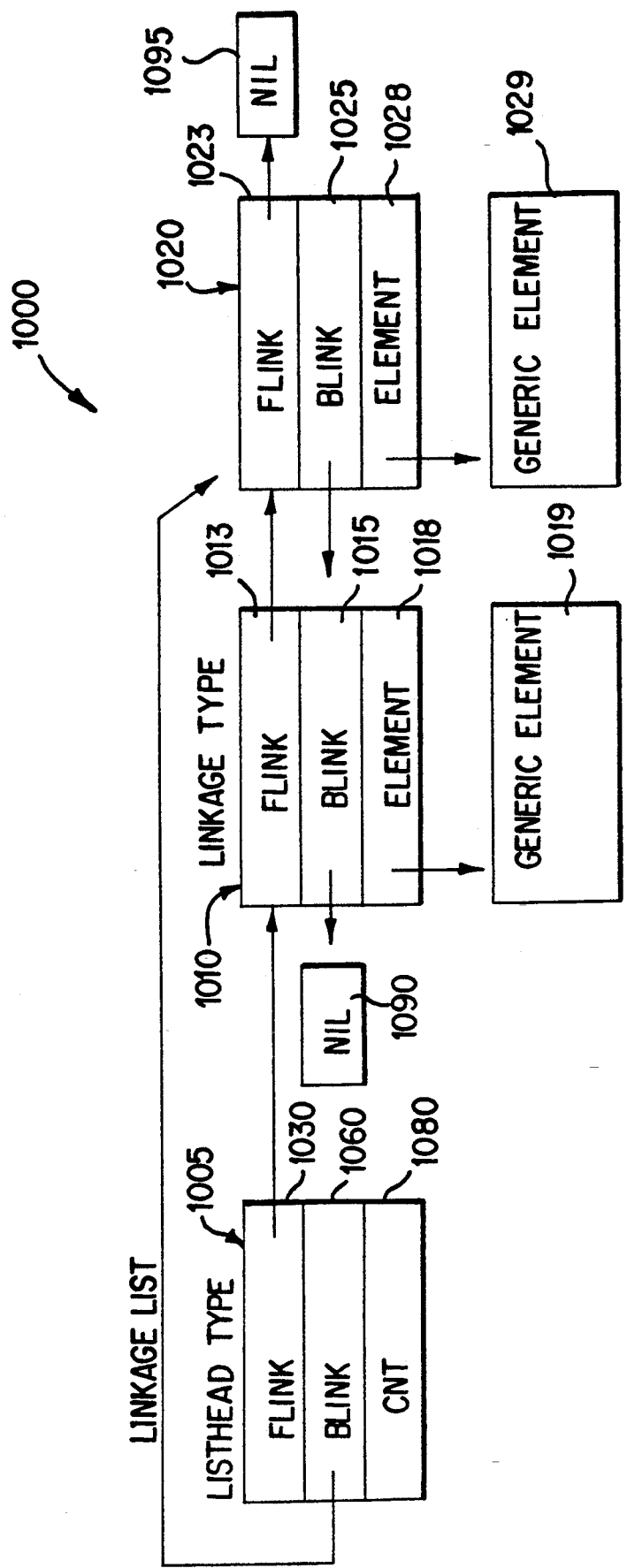
FIG. 10 is a diagram of a linkage list represented by the link array in FIG. 9.

FIG. 10 shows an example of a linked list 1000 which can be used as any of the linked lists described above. In FIG. 10 the linked list 1000 includes a list head type 1005 and link elements. List head type 1005 in turn includes a forward link 1030, a backwards link 1060, and a count 1080. Forward link 1030 indicates the location of the first element in linked list 1000, backward link 1060 indicates the location of the last element in linked list 1000, and count 1080 indicates the number of elements in linked list 1000.

Linked list 1000 is called a doubly-linked list because it is linked in the forward direction through the forward links 1013 and 1023, and in the backwards direction through backward links 1025 and 1015. Note that the last link element, element 1020, has a forward link 1023 to a nil record 1095, and the first link element 1010 has a backward link 1015 to a nil element 1090.

Linked list element 1010 has pointer 1018 which identifies a corresponding node, and linked list element 1020 has a pointer 1028 to a corresponding node 1029.

Returning to generic node 800 in FIG. 8, subfield 850 indicates the type of node. The different node types include model types, device types, workload types, branching types, user group types, and MSCP types.

Figure 11A:
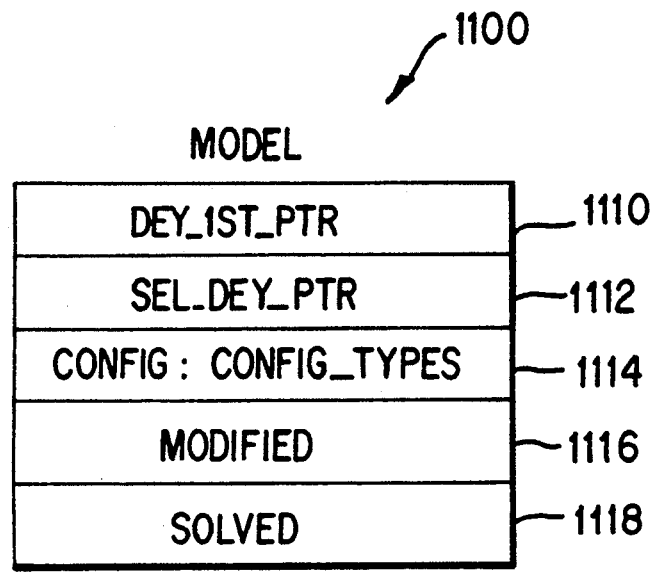
FIG. 11(a) is a diagram of variant record for a model node.

Associated with many of the types of nodes is a variant record 860 which contains information unique to different node types. One example of a variant record is variant record 1100 shown in FIG. 11(a) for a model node. It includes as subfields a device list pointer 1110, a selection device pointer 1112, a configuration field 1114 defining the particular configuration type of the model, a modified flag 1116, and a solved flag 1118.

Figure 11B:
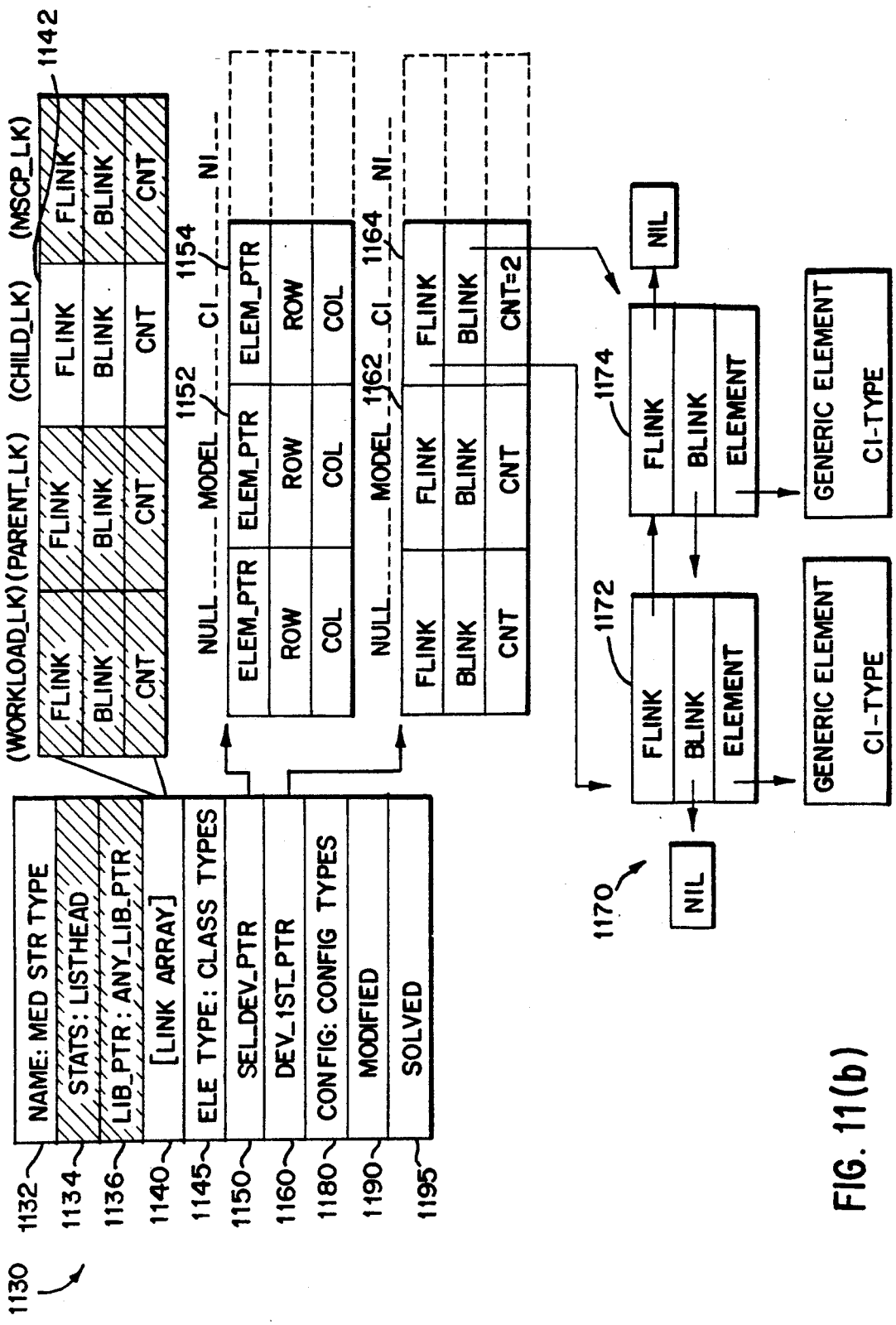
FIG. 11(b) is a diagram of an exemplary model node in accordance with the present invention.

FIG. 11(b) shows a model node 1130 including the variable record portion. The name field 1132 contains the name of the corresponding model. The statistics list head field 1134 and the library pointer field 1136 are empty.

The link array 1140 only has entries for the child linked list with header 1142. In the preferred embodiment for model node 610, the linked list for header 1142 would identify a list with nodes for the CI node 710 and the NI node 760.

Element type field 1145 identifies node 1130 as a model.

Select device pointer 1150 points to a list of items identifying either a current model 1152, a current device, such as the entry for the current CI bus 1154, or a current workload (not shown). The row and column entries identify the location of the corresponding model, device, or workload on the screen of display/keyboard 320.

Device list pointer 1160 identifies list header for each of the components of the corresponding model. Model list head 1162 is for a single element identifying the model node. CI list head 1164 is for a list 1170 of CI linked list elements 1172 and 1174. Lists would also exist for CPUs, HSCs, disks, etc. List 1170 indicates that the model corresponding to node 1130 includes two CI busses.

Figure 12A:
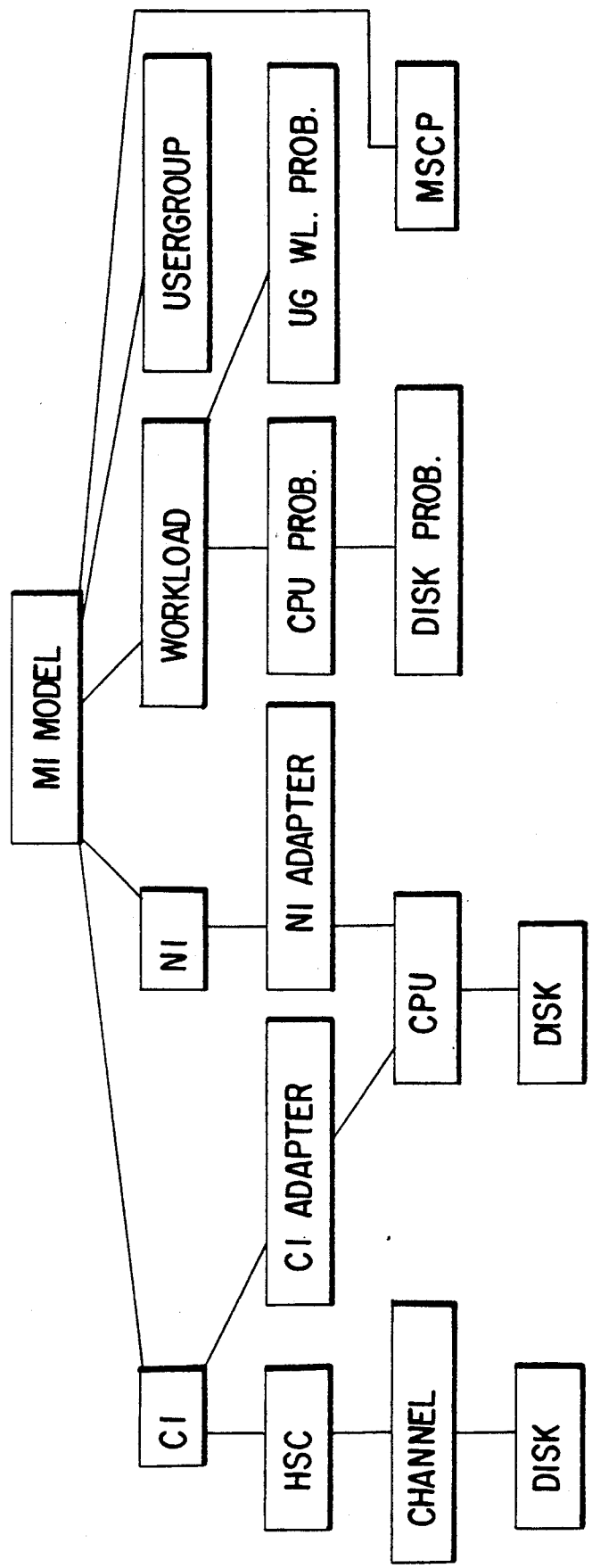
FIGS. 12(a), 12(b), 12(c) and 12(d) are examples of different model configurations.
Figure 12B:
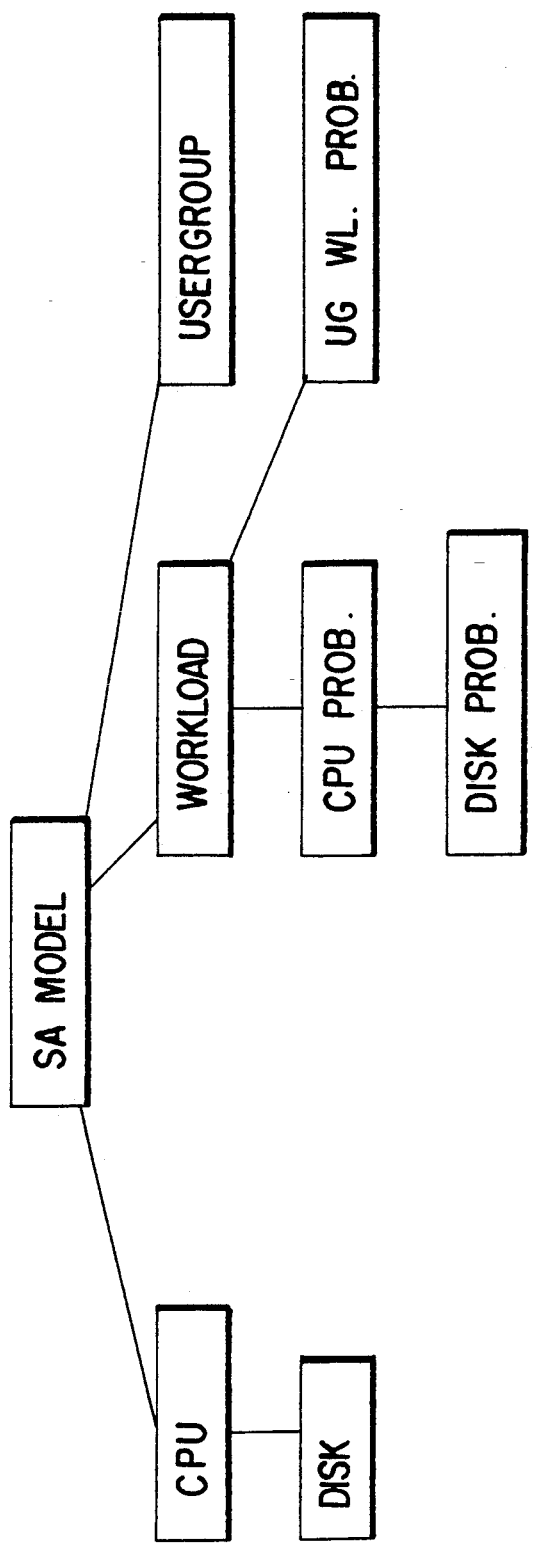
Figure 12:
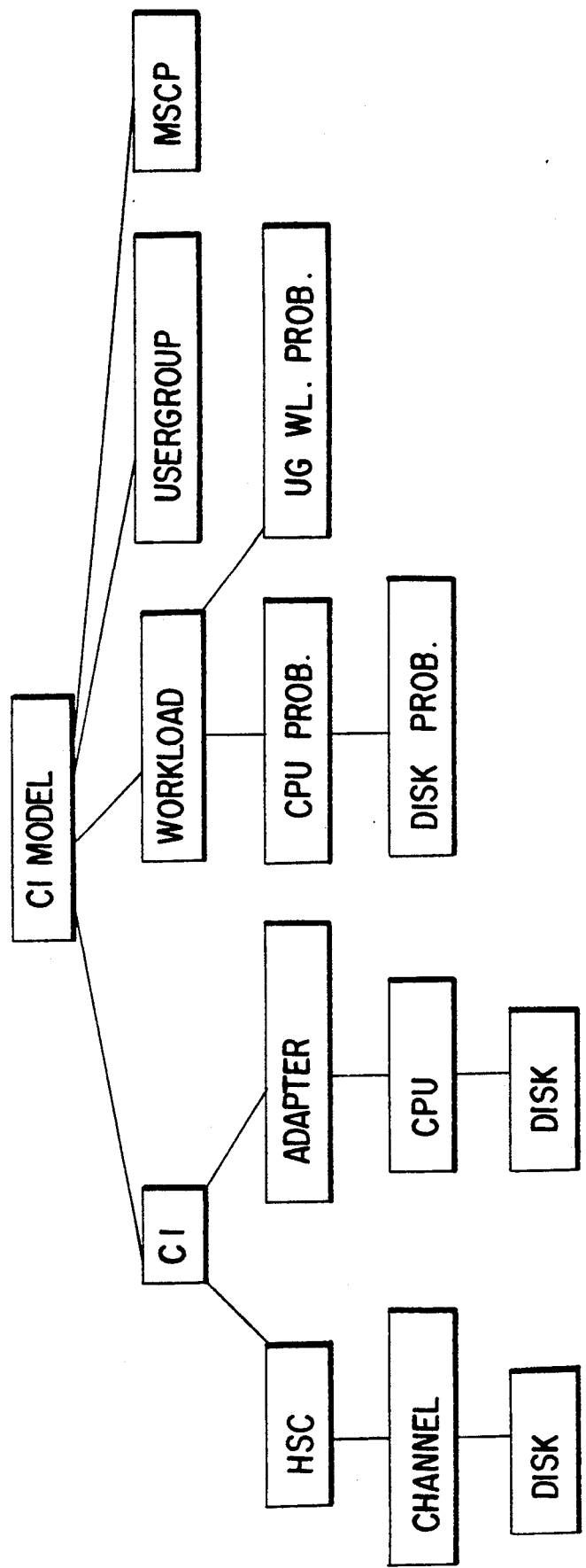
Figure 12D:
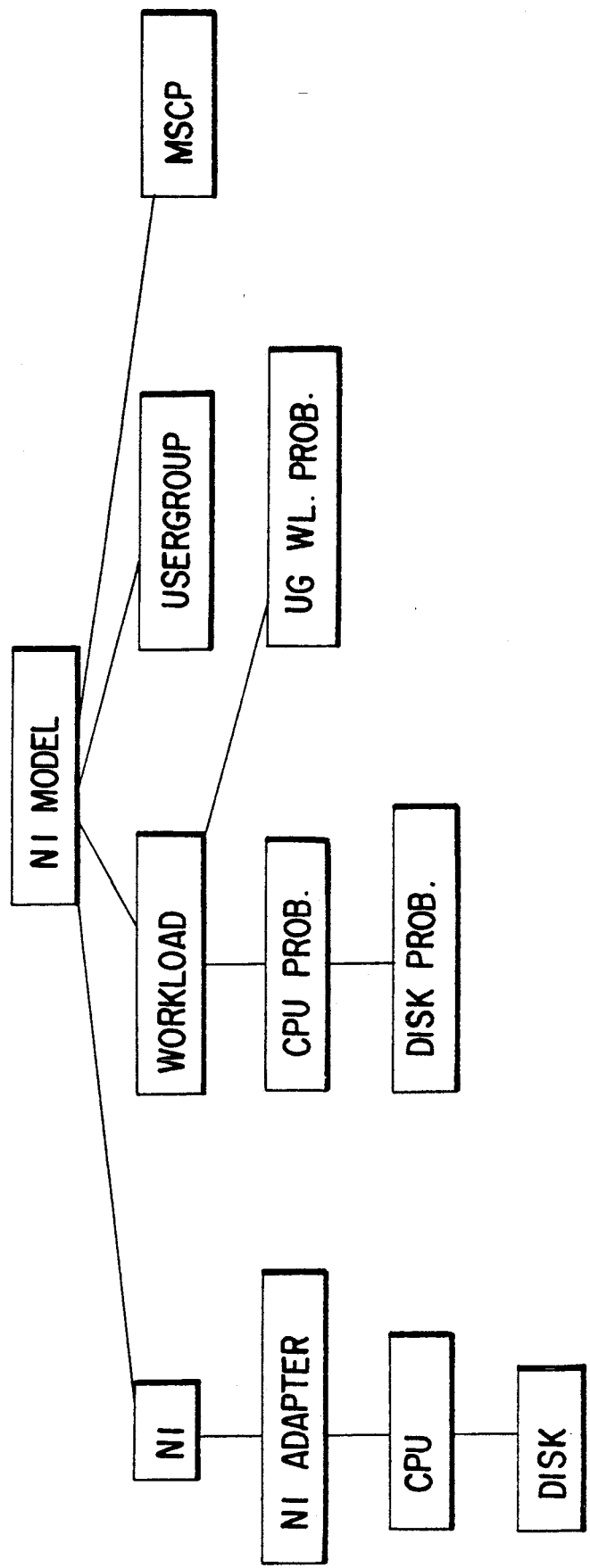

Configuration field 1180 identifies the configuration of the corresponding model. A model can have several different configurations. Model 600, for example, is a mixed cluster configuration, another example of which is shown in FIG. 12(a). FIG. 12(b) shows a standalone configuration. FIG. 12(c) shows a CI cluster, and FIG. 12(d) shows an NI cluster.

Modified flag 1190 indicates whether the model has been modified. Solved flag 1195 indicates whether the model has been solved (i.e., whether the SOLVE option has been invoked) after all the changes have been made. Modified flag 1190 and solved flag 1195 are Boolean values and together indicate whether any data is stale and should be displayed in bold text.

Figure 13:
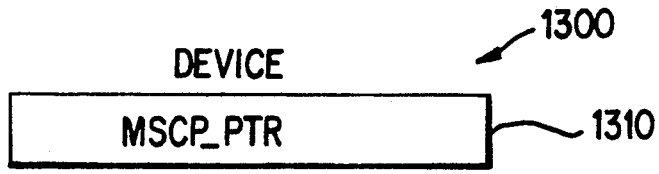
FIG. 13 is a diagram of the variant record for a device node.

FIG. 13 shows another example of a variant record, variant record 1300 for a device. Record 1300 includes an MSCP pointer 1310 which identifies a corresponding MSCP tree if the device is a CPU or a disk.

2. Workload Data Structure

Also in accordance with the present invention, a workload data structure includes a plurality of second data entries each corresponding to a different one of the workloads which the computer system supports. In the preferred embodiment, the workload data structure is also a tree.

Figure 14:
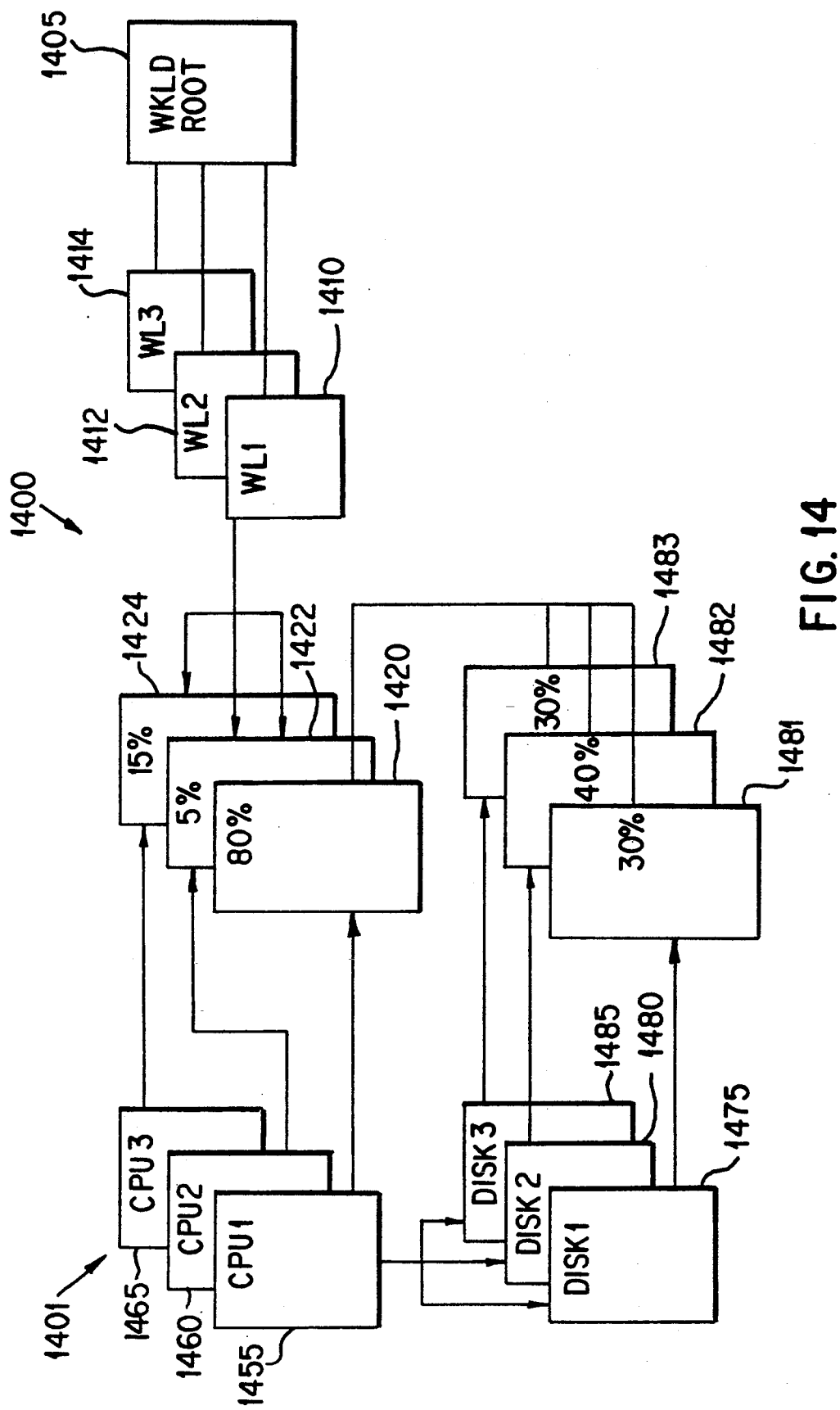
FIG. 14 is a diagram of a workload data tree showing its relationship to a device tree.

FIG. 14 includes a workload tree 1400 for workload 1, and shows its relationship to a portion of a device tree 1401. That relationship is by way of branching probabilities.

The portion of the device data tree 1401 shown in FIG. 14 includes CPU nodes 1455, 1460, and 1465 for CPU1, CPU2, and CPU3, respectively. CPU1 node 1455 has as children three disk nodes, disk1 node 1475, disk2 node 1480 and disk3 node 1485.

Workload tree 1400 includes a workload root node 1405, which has as children workload-1 node 1410, workload2 node 1412, and workload3 node 1414. Workload1 node 1410 has as children a CPU branching probability node 1420 for CPU1, a CPU branching probability node 1422 for CPU2, and a CPU branching probability node 1424 for CPU3. This structure mirrors the structure for device tree 1401.

CPU branching probability node 1420 has three nodes as children: disk1 branching probability node 1481, disk2 branching probability node 1482, and disk3 branching probability node 1483, which correspond to disk nodes 1475, 1480, and 1485, respectively. This structure also mirrors the structure for device tree 1401.

CPU1 node 1455 is related to workload1 by branching probability node 1420. CPU2 node 1460 is related to workload1 by branching probability node 1422, CPU3 node 1465 is related to workload1 by branching probability node 1424.

As explained above, the branching probability for a corresponding device and workload is an indication of what percentage of the corresponding workload has services provided by the corresponding device. Thus, as represented by branching probability nodes 1420, 1422 and 1424, workload1 has 80% of its CPU services provided by CPU1, 5% of its CPU services provided by CPU2, and 15% of its CPU services provided by CPU3. The percentages in the branching probabilities must add to 100%.

The branching probabilities for the disks also add to 100%, although it should be understood that the percentages represented by the branching probabilities of nodes 1481, 1482 and 1483 represent only the percentage of the disk services which are provided for the portion of workload1 supported by CPU1. For example, the branching probability for workload1 provided by disk1 is 30%, the branching probability for workload1 provided by disk2 is 40%, and the branching probability for workload1 provided disk3 is 30%, but these are percentages of the workload1 services provided by CPU1. To determine the total amount of system resources which disk1 provides for workload1, the branching probability for disk1, 30%, has to be multiplied by the branching probability for CPU1, 80%. In this case, the result of such multiplication would yield 24%, indicating that disk1 provides 24% of the disk resources required by workload1.

Figure 15:
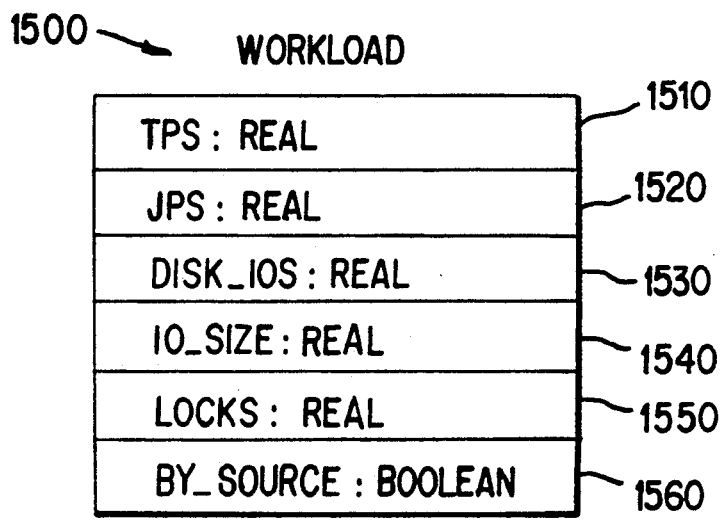
FIG. 15 is a diagram of a variant record portion of a workload node.

The workload data node has the basic structure of the generic node 800, except the library pointer 830 is not used, and the linked list field does not include an MSCP linked list 940. The variant record portion for a workload node is shown in FIG. 15 as record 1500. The information provided in the workload variant record 1500 includes the required transactions per second provided in subfield 1510, the required instructions per second provided in subfield 1520, the required disk I/Os provided in subfield 1530, and the required I/O size provided in subfield 1540. In addition, workload variant record 1500 includes a lock subfield 1550 which is the lock explained above, and a BY SOURCE field 1560 which was also explained above. All of the fields in variant record 1500 are real, except for BY SOURCE field 1560 which is Boolean.

Figure 16:
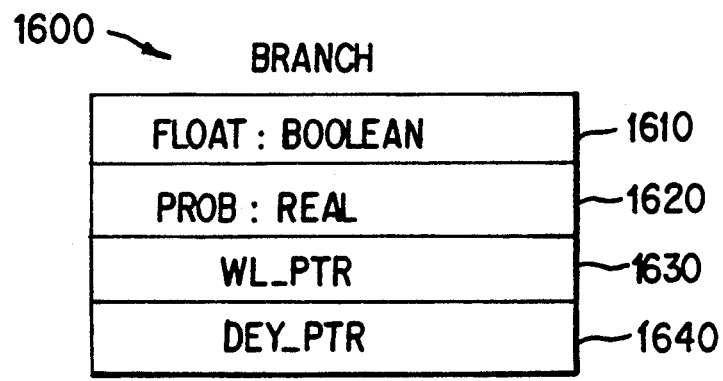
FIG. 16 is a diagram of branch probability node.

The branching probability nodes are also similar to the generic node 800, except they do not include a name field, a statistics list head 820, a library pointer 830, and element type field 850 and there is no workload linked list 910 or MSCP linked list 940. The variant record for a branching probability node is shown in FIG. 16 as record 1600. Record 1600 includes four subfields. Float subfield 1610 contains a Boolean value indicating whether the branching probability is FLOATING or FIXED, as explained above. Probability subfield 1620 contains the corresponding branching probability. Workload pointer subfield 1630 identifies the node for workload corresponding to this branching probability, and device pointer subfield 1640 identifies the node for the corresponding device.

Figure 17:
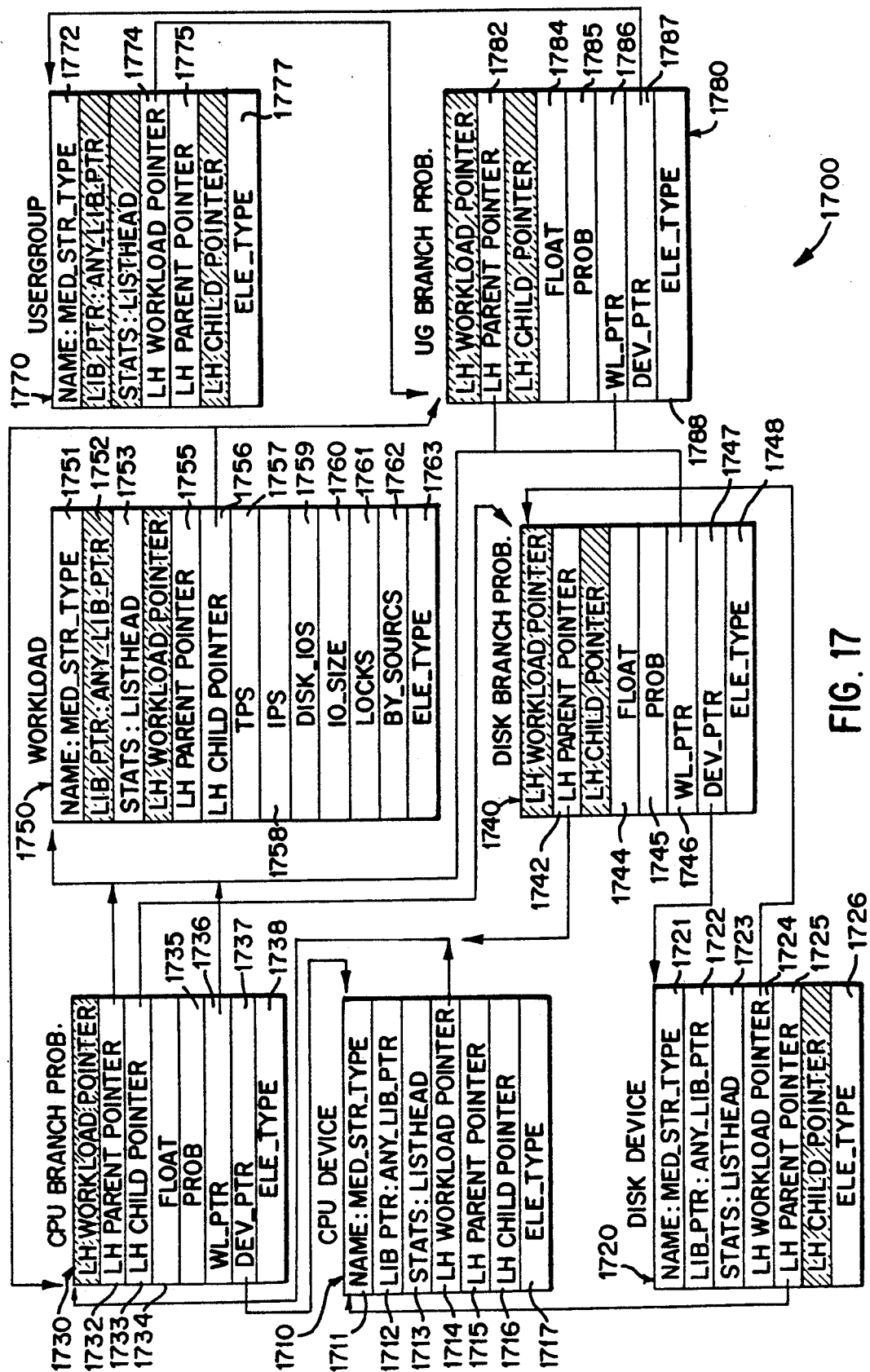
FIG. 17 is a diagram showing relationship between nodes of device tree, a workload tree and a user group tree.

FIG. 17 is a diagram 1700 showing the interrelationship between various nodes for device and workload trees. Diagram 1700 also indicates the fields of each node which are active for the corresponding node.

CPU device node 1710 includes a name field 1711, a library pointer 1712, a statistics list head 1713, and an element type field 1717. Pointers 1714–1716 are part of a link array. Workload pointer 1714 identifies a workload linked list of branching probability nodes; parent pointer 1715 identifies a linked list of nodes for the parents of CPU device node 1710; and child pointer 1716 identifies a linked list of nodes for the children of CPU device node 1710.

As FIG. 17 shows, one of the children in the linked list which pointer 1716 identifies is a disk device node 1720. Disk device node 1720 represents a disk connected to the CPU represented by CPU node 1710.

Disk device node 1720 includes a name field 1721, a library pointer 1722, a statistics list head 1723, and an element type field 1726. As part of its link array subfields, disk device node 1720 includes a workload pointer to a linked list of branch probability nodes, and a parent pointer identifying a linked list of nodes for parents of disk device node 1720. The parent linked list includes CPU device node 1710. Disk node 1720 has no children objects and therefore has an empty children linked list of child nodes.

The branch pointer 1714 of CPU device node 1710 identifies a CPU branch probability node 1730 for the workload represented by workload node 1750. CPU branch probability node 1730 includes a parent pointer 1732, which identifies workload node 1750, and a child pointer 1733, which identifies a linked list containing the disk branch probability node 1740.

The CPU branch probability node 1730 also includes a float field 1734, a probability field 1735 containing the branch probability value, and a type field 1738. Workload pointer field 1736 identifies workload node 1750, and device pointer field 1737 identifies CPU device node 1710.

The disk branch probability node 1740 is similar in content to the CPU branch probability node 1730, except that disk branch probability node 1740 does not contain a linked list for the children nodes. Parent pointer 1742 identifies CPU branch probability node 1730.

Workload pointer 1746 identifies the workload node 1750 for the corresponding workload, and the device pointer 1747 identifies the disk device node 1720 for the corresponding disk. Disk probability node 1740 also contains a float field 1744, a probability field 1745, and an element type field 1748.

The workload node 1750 contains an entry in the name field 1752, as well as entries for statistics list head 1753, parent pointer 1755, and child pointer 1756. Parent pointer 1755 identifies the model node, and child pointer 1756 identifies a linked list with CPU branch probability node 1730 and a user group branch probability node 1780.

Workload node 1750 also contains entries for the transactions per second field 1757, the instruction per second field 1758, the disk I/Os field 1759, the I/O size field 1760, the lock field 1761, the BY SOURCE field 1762, and the element type field 1763.

3. User Group Data Structure

Figure 18:
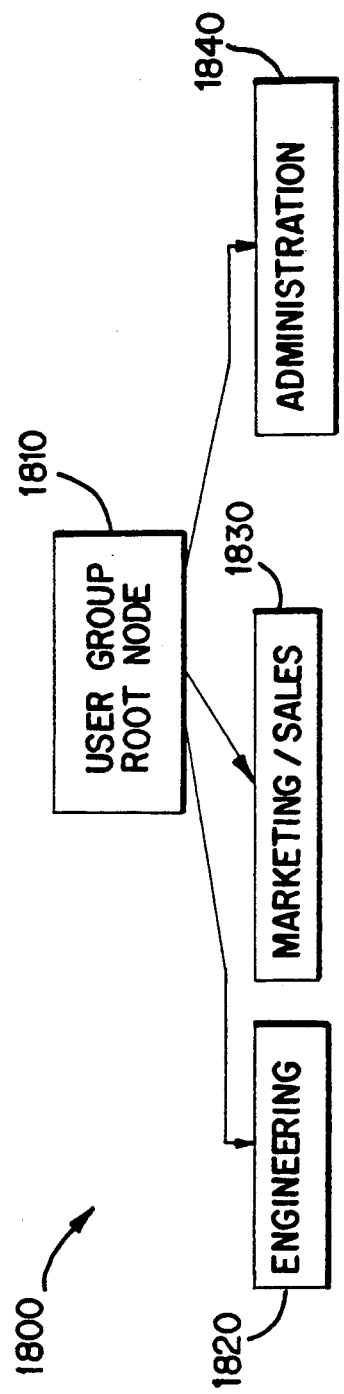
FIG. 18 is a diagram of user group data tree.

As explained above, user groups are mechanisms which can be used to organize the sources of the workloads. FIG. 18 shows an example of a user group data structure 1800 organized in a tree structure. The user group data structure 1800 includes a user group root node 1810, as well as nodes 1820-1840 corresponding to different user groups. In the example shown in FIG. 18, node 1820 corresponds to an engineering user group, node 1830 corresponds to a marking user group, and node 1840 corresponds to administration user group.

The user group data structure includes a plurality of third data entries each corresponding to a user group. The user group data entries, or nodes, are similar to the generic node 800, except that the user group nodes do not have a library pointer 830, a child list head 930, or a MSCP list head 980. User group nodes also do not have a variant record in the preferred embodiment.

In FIG. 17, user group node 1770 has a name field 1772, indicating the name of the corresponding user group, and an element type field 1777. User group node 1770 also includes a parent pointer 1775 to the model node and a workload pointer 1774 to a linked list for user group branch probabilities.

One of the entries in the linked list is user group branch probability node 1780. Branch probability node 1780 has a parent pointer 1782 identifying a linked list which includes workload node 1750. Branch probability node 1780 also includes a workload pointer 1786 identifying a linked list with workload node 1750. Workload node 1750 is in the workload linked list for node 1780 because the user group corresponding to node 1780 contributes to the workload corresponding to node 1750. Additionally, user group branch probability node 1780 includes a device pointer 1787 which identifies the corresponding user group node 1770. This pointer allows traversal of the data structure to find the user group from the workload using the user group branching probability nodes.

User group branch probability node 1780 also includes a float field 1784, a probability field 1785, and a node type field 1788. Probability field 1785 indicates what percentage of the corresponding user group's workload is due to the workload identified by workload pointer field 1786.

4. MSCP Data Structure

Figure 19:
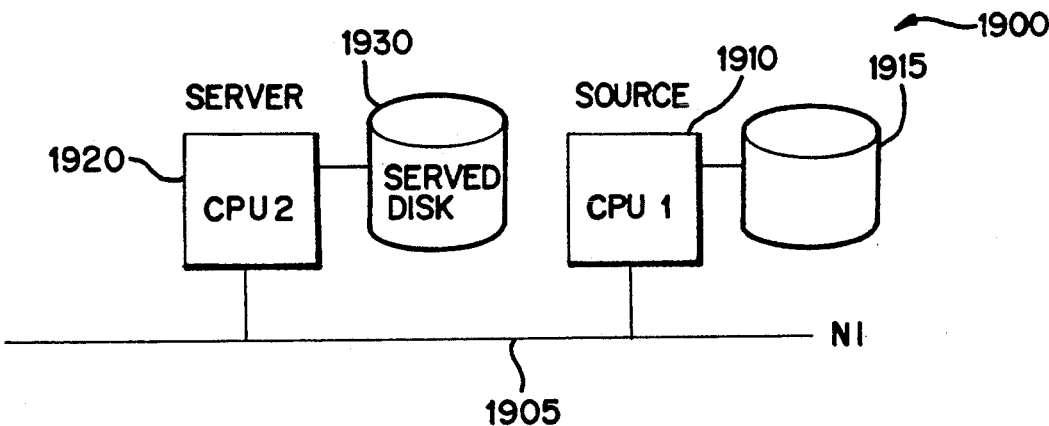
FIG. 19 is a diagram of computer system using MSCP feature.

FIG. 19 shows a computer system 1900 which uses the MSCP protocol. The computer system includes an NI bus 1905 to which are connected a CPU1 1910 and a CPU2 1920. CPU1 1910 is also connected to a disk 1915, and CPU2 1920 is also connected to a disk 1930.

The MSCP protocol, which would be embedded in software in CPU1 1910 and CPU2 1920, allows users of CPU1 1910 to access a file on disk 1930 without having to manage the communication between CPU1 1910 and CPU2 1920. If a user of CPU1 1910 requests to access of a file on a non-connected disk, CPU1 1910 is termed the "source" CPU. The disk which contains the file, in this case disk 1930, is called the "served" disk. The CPU connected to the served disk, in this case CPU2 1920, is called the "server" CPU.

Figure 20:
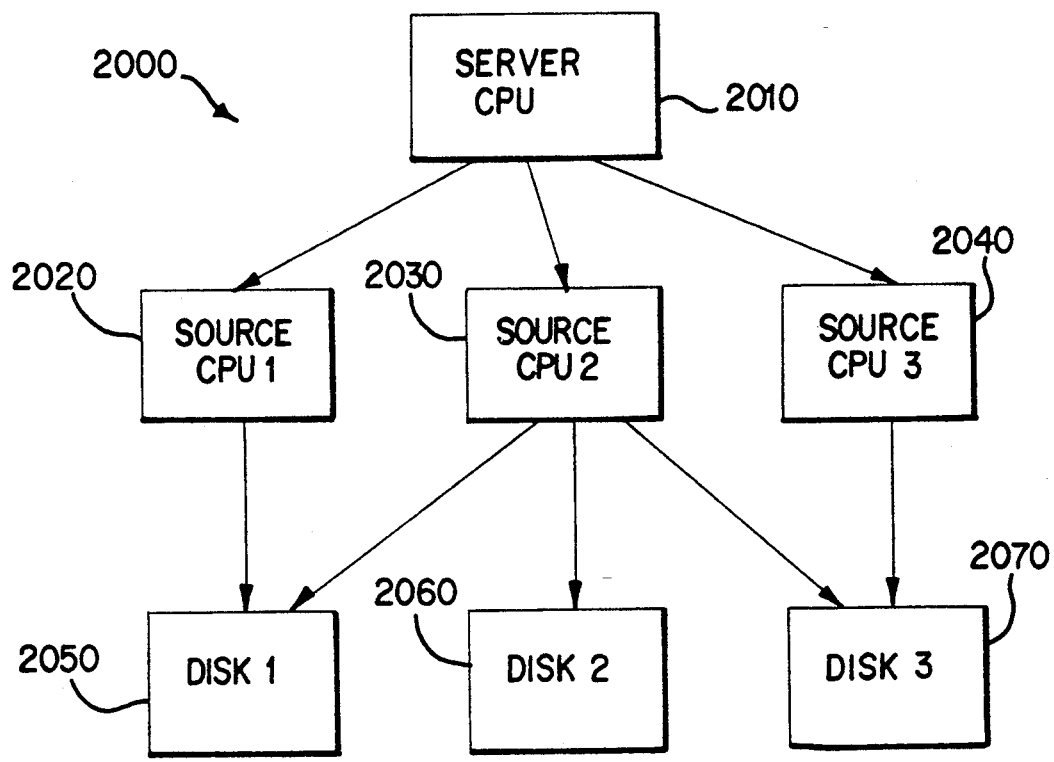
FIG. 20 is a diagram of an MSCP data tree.

A preferred embodiment of an MSCP tree 2000 is shown in FIG. 20. MSCP tree 2000 does not correspond to system 1900 in FIG. 19. The preferred organization has the server CPU being represented by node 2010. The possible source CPUs for the server CPU, source CPU1, source CPU2, and source CPU3, are represented by nodes 2020, 2030, and 2040, respectively. The source CPU nodes are children of the server CPU node.

The served disks are represented as children of the source CPU nodes. Thus, disk1 of which is represented by node 2050, is a child of nodes 2020 and 2030; disk2 is represented by node 2060 which is a child of node 2030, and disk3 is represented by a node 2070 is a child of nodes 2030 and 2040. This organization indicates that disk1 can act as a served disk for CPU1 and CPU2, disk2 can act as a served disk for CPU2, and disk3 can act as a served disk for CPU3 and CPU2. The relationship just described between served disks and source CPUs relates only to the server CPU represented by node 2010.

Figure 21:
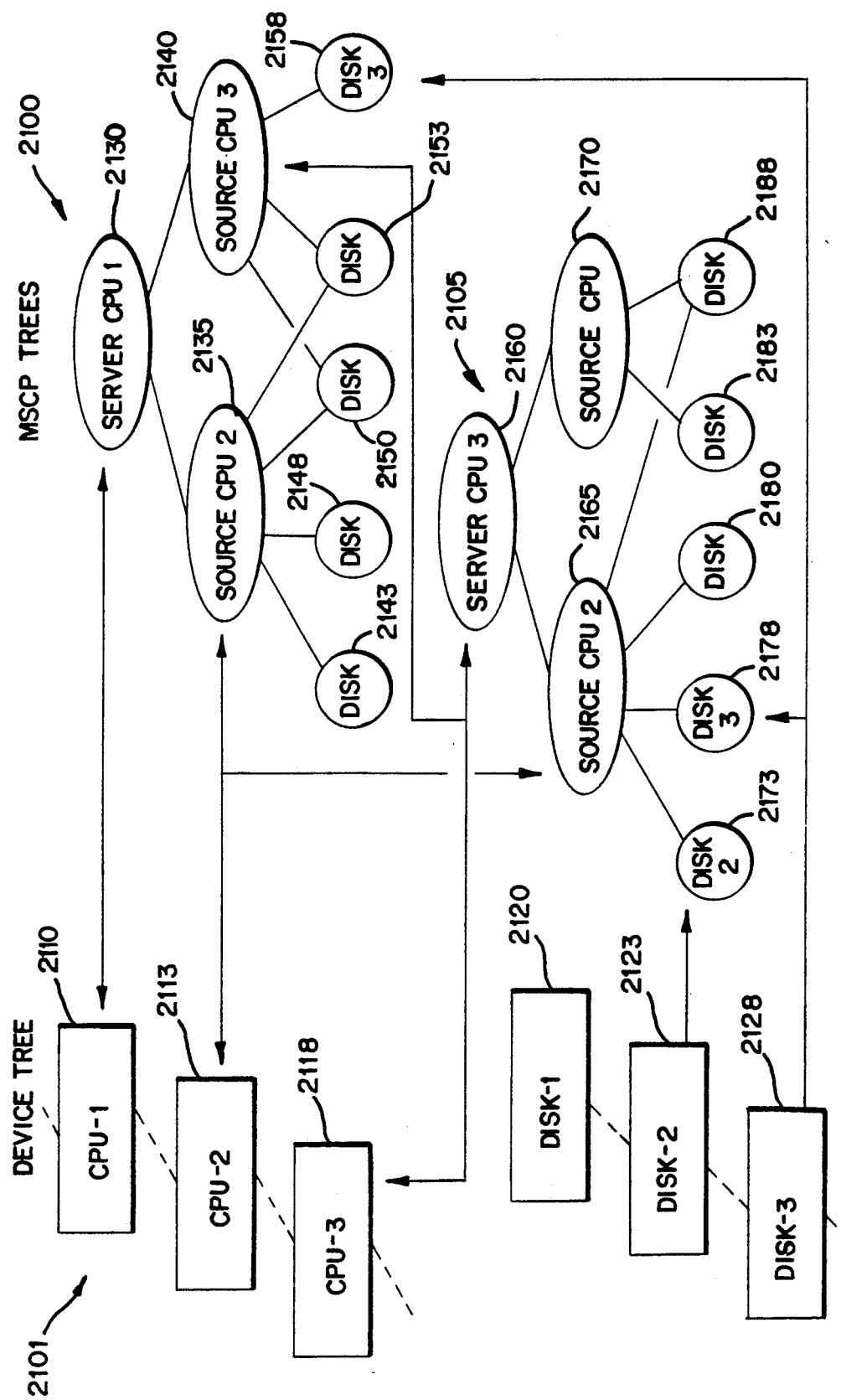
FIG. 21 is a diagram showing the relationship between MSCP data trees and a device tree.

FIG. 21 shows the relationship between MSCP trees 2100 and 2105 and certain nodes of a device tree 2101. In FIG. 21, CPU-1 is represented in device tree 2101 as node 2110, CPU-2 is represented as node 2113, and CPU-3 is represented by node 2118. Similarly, disk-1 would be represented in device tree 2101 by node 2120, disk-2 by node 2123, and disk3 by node 2128.

MSCP tree 2100 contains a server CPU-1 node 2130 which corresponds to CPU-1 node 2110 in device tree 2101. In MSCP tree 2100, the two source CPUs, source CPU-2 and source CPU-3, are represented by nodes 2135 and 2140, respectively. Source CPU-2 2135 corresponds to CPU-2 node 2113 in device tree 2101, and source CPU-3 node 2140 corresponds to CPU-3 node 2118 in device tree 2101. Source CPU-2 node 2135 has as children served disks nodes 2143, 2148, 2150 and 2153. The correspondence between disks 2143, 2148, 2150, and 2153 and device tree 2101 is not shown in FIG. 21.

Source CPU-3 not only has as children served disk nodes 2150 and 2153, it also has as a child served disk node 2158. Served disk node 2158 corresponds to disk-3 node 2128 in device tree 2101.

MSCP tree 2105 is for CPU-3 as the server CPU. Tree 2105 therefore has a server CPU node 2160 as a root. Server CPU-3 corresponds to CPU-3 node 2118 in the device tree 2101. The source CPUs in MSCP tree 2105 would be source CPU-2 node 2165 and source CPU node 2170.

Source CPU-2 node 2165 corresponds to CPU-2 node 2113 in device tree 2101. The children of source CPU-2 node 2165 are served disk-2 node 2173, served disk-3 node 2178, served disk node 2180, and served disk node 2188. Served disk-2 node 2173 corresponds to the disk-2 node 2123 in device tree 2101, and served disk-3 node 2178 corresponds to disk-3 node 2128 in device tree 2101.

Source CPU node 2170 would have as children served disk node 2183 and served disk node 2188. Disk nodes 2183 and 2188 would correspond to disks in device tree 2101, but that relationship is not shown in FIG. 21.

Figure 22:
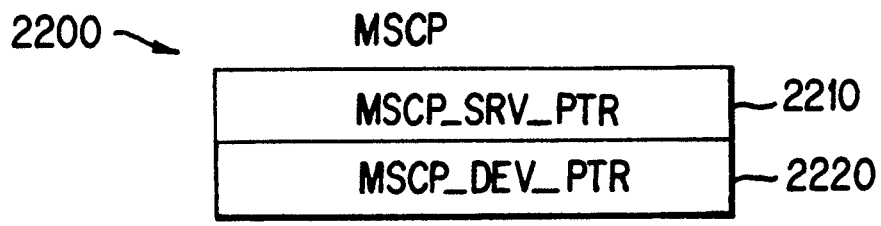
FIG. 22 diagram of the variant record portion of an MSCP node.

In the preferred embodiment, a node of an MSCP tree would resemble node 800 in FIG. 8, and would have a variant record 2200 as shown in FIG. 22. The two subfields in variant record 2200 are MSCP server pointer 2210 which identifies the MSCP tree for which the corresponding node is for a server CPU, and an MSCP device pointer 2220, which identifies the corresponding node in the device tree.

Figure 23:
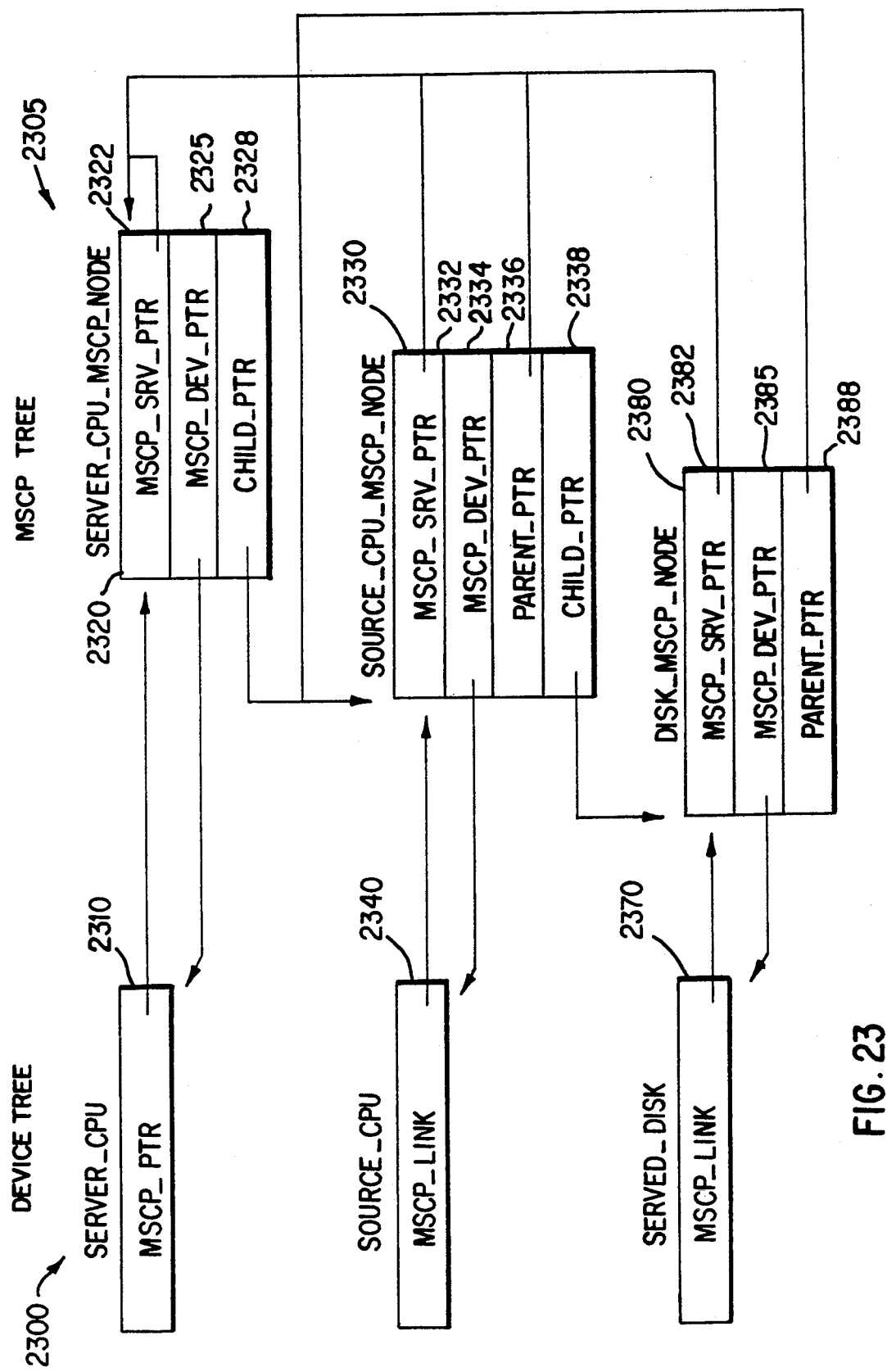
FIG. 23 is a diagram showing the relationship of portions of device tree nodes and MSCP tree nodes.

The relationship between MSCP nodes and device nodes is shown in FIG. 23 in more detail. A device tree 2300 has a CPU node with an MSCP pointer 2310 in its variable record corresponding to the server CPU of a MSCP tree 2305, a CPU node with an MSCP pointer 2340 in its link array identifying a source CPU in MSCP tree 2305, and a disk with an MSCP pointer 2370 in its link array identifying a served disk in MSCP tree 2305.

MSCP tree 2305 includes server CPU MSCP node 2320 with an MSCP server pointer 2322 which identifies the server node 2320, an MSCP device pointer 2325 which identifies the corresponding CPU node in device tree 2300, and a child pointer 2328 which identifies a linked list containing source CPU MSCP node 2330.

Source CPU MSCP node 2330 is a node pointed to by the MSCP link field 2340 and contains an MSCP server pointer 2332 which identifies the server CPU MSCP node 2320 and an MSCP device pointer field 2334 which identifies the corresponding CPU node in device tree 2300. The parent pointer 2336 in source CPU MSCP 2330 identifies the server CPU MSCP node 2320, and child pointer 2338 identifies a linked list containing disk MSCP node 2380 as a served disk for the corresponding source CPU.

The disk MSCP node 2380 is the node pointed to by the served disk MSCP link 2370 from the device tree 2300 and contains an MSCP server pointer 2382 which identifies the server CPU MSCP node 2320, and an MSCP device pointer 2385 which identifies the corresponding disk node MSCP in device tree 2300. Disk MSCP node 2380 also contains a parent pointer 2388 which identifies the source CPU MSCP node 2330.

C. Model Execution

With the understanding of the data structures presented above, a more detailed explanation can be given of how the different operations are implemented using the data structures in data storage 315 and the elements of modeling interface 300 and 350 in FIGS. 3(a) and 3(b). The explanation which follows will usually refer just to the elements in FIG. 3(a), but it should be understood that for the most part the elements in FIG. 3(b) will perform equivalently.

Figure 24:
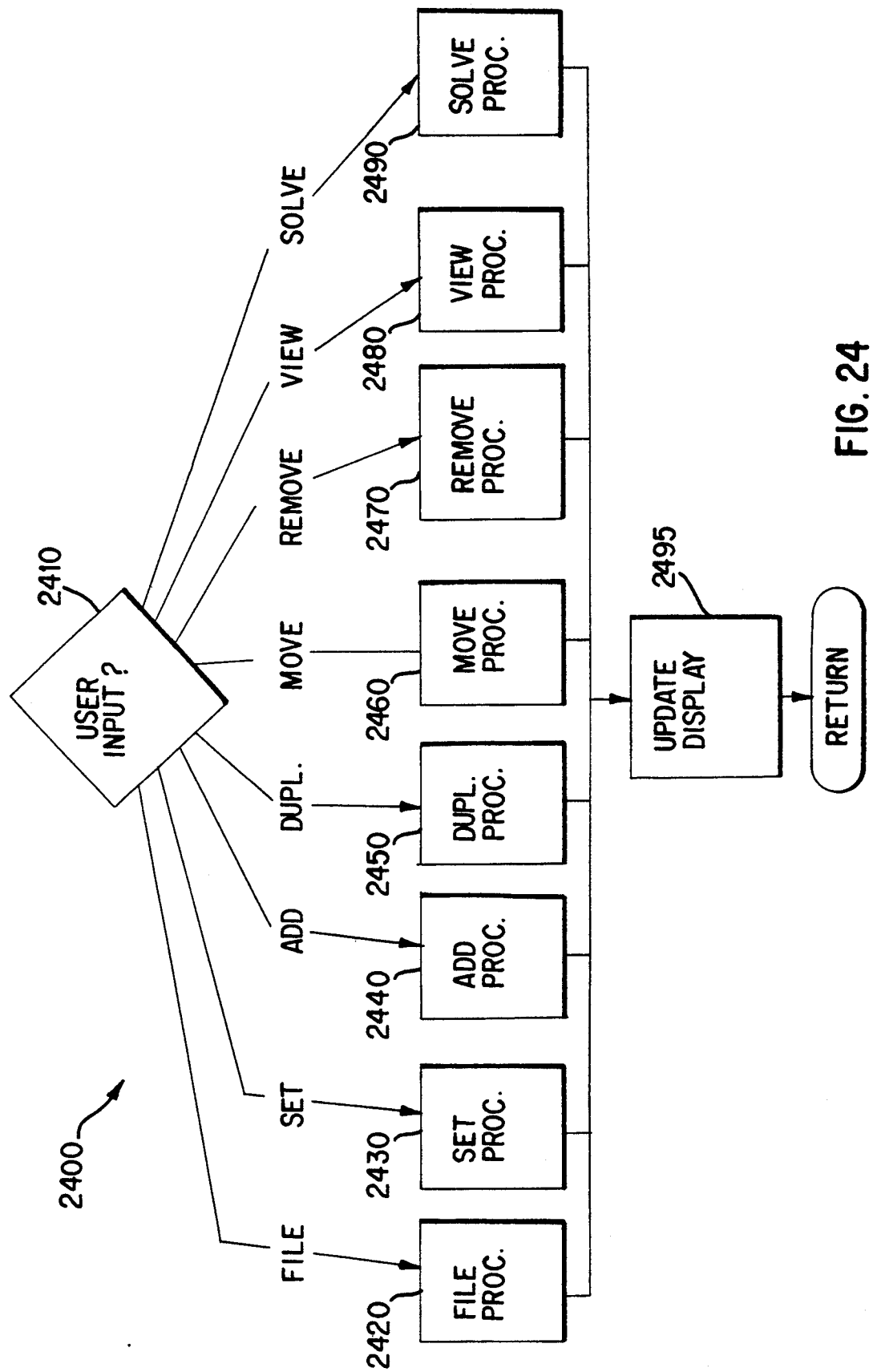
FIG. 24 includes a generalized flow diagram 2400 explaining how this invention reacts to inputs from operators.

FIG. 24 includes a generalized flow diagram 2400 explaining how the modeling interface of this invention reacts to inputs received from operators using modeling interface main menu 500 shown in FIG. 5(a). The software for managing the display, the windows, and the cursor are well-known to persons skilled in the art. Preferably that software would be resident in display logic 322 and keyboard logic 323, although such software, or alternative means of control such as microcode, PLAs, etc., could be implemented in a number of equivalent manners consistent with the present invention.

When main menu 500 is displayed, keyboard logic 323 waits for an operator input to designate the selection of an option. When that input is received (Step 2410), a determination is made of the type of input. If the FILE option was selected, then a FILE procedure is executed (Step 2420). If the SET option is selected, a SET procedure is executed (Step 2430). If the ADD option is selected, an ADD procedure is executed (Step 2440). If the DUPLICATE option is selected, a DUPLICATE procedure (Step 2450) is executed. If the MOVE option is selected, a MOVE procedure is executed (Step 2460). If the REMOVE option is selected, a REMOVE procedure (Step 2470) is executed. If the VIEW option is selected, a VIEW procedure is executed (Step 2480). If the SOLVE option is selected, a SOLVE procedure is executed (Step 2490).

At the conclusion of procedures 2420-2490, the display of display/keyboard 320 is updated as necessary (Step 2495). For example, if the execution of one of the procedures caused the display data to become stale, that data will then be displayed in bold text. After the display is updated, control is returned to main menu 500 and Step 2410 to await another input.

1. FLOW option

FIG. 25 shows a flow diagram 2500 for implementing the FILE procedure 2420 in FIG. 24. In the preferred implementation, the specific functions performed during the FILE option are preferably implemented by parsers 310 and 340 in FIG. 3(a), or by parsers 360 and 390 in FIG. 3(b), although it is not critical to the present invention to have the parsers implementing these functions. These functions could, for example, be implemented by other elements by central software control.

In flow diagram 2500, the operator is queried for an indication of the suboption desired. Upon receipt of an input from the keyboard specifying a type of input (Step 2510), a determination is made of the type of input. If the input indicates selection of the LOAD suboption, the operator is queried for the name of the model file. When modeling interface 300 receives that name (Step 2515), the model file with the specified file name is loaded from the .MDL file 305 into the modeling interface 300. Upon conclusion of the loading, the modeling session is continued.

If either the WRITE or EXIT suboptions were selected by the operator, the current model is written to .MDL file 345 (Step 2530). In the case of the WRITE option, the modeling session is continued (Step 2540). In the case of the EXIT option, the modeling session is ended (Step 2550).

If the QUIT suboption is chosen by the operator, the operator is then asked whether the current model file should be written to disk (Step 2545). If the operator responds in the affirmative, the current model file is written to .MDL file 345 (Step 2530), and the modeling session is ended (Step 2550). If the operator responds in the negative, the model session is ended without writing the model file to .MDL file 345 (Step 2550).

2. SET option

Figure 26A:
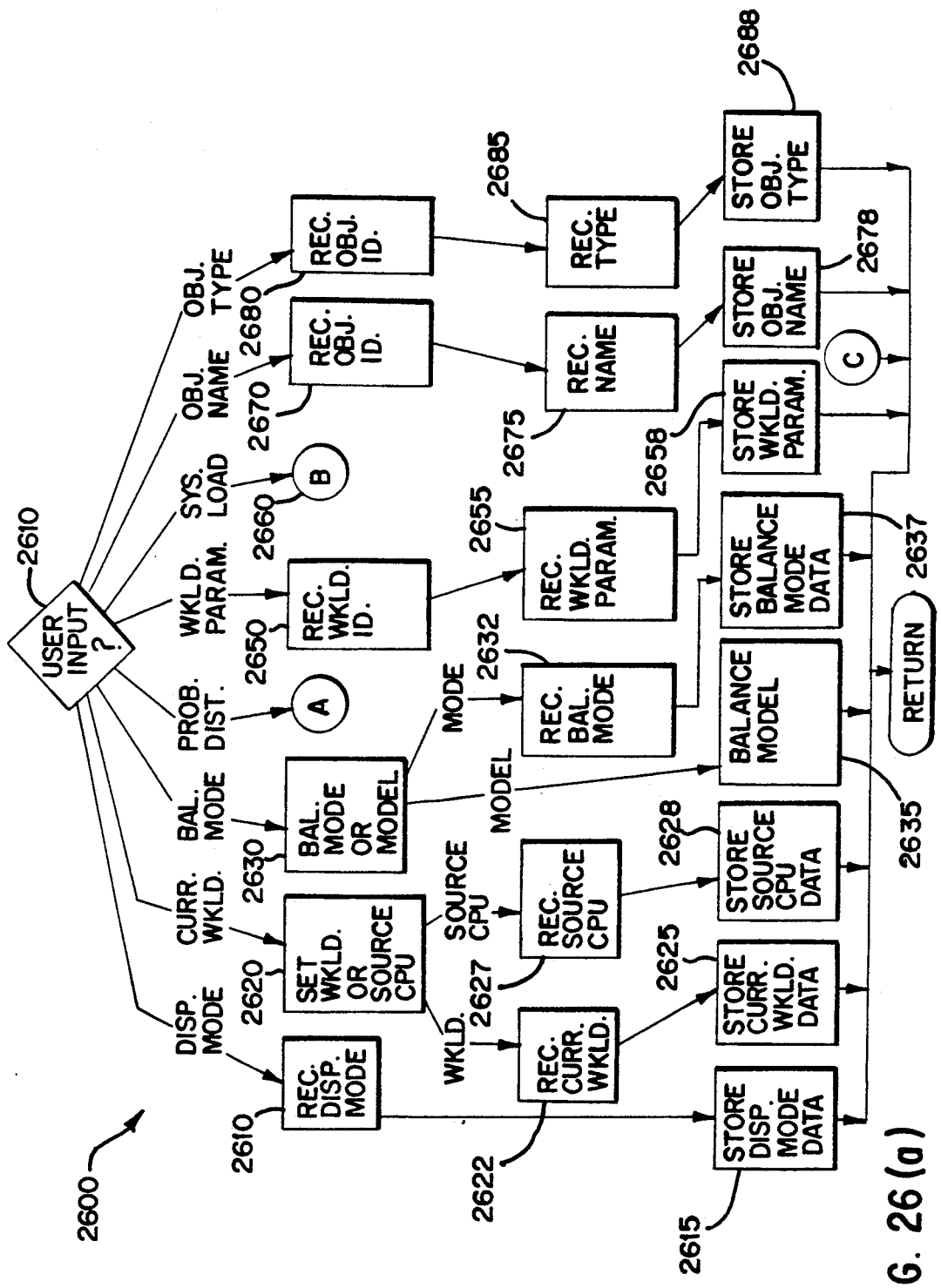
FIGS. 26(a) and 26(b) include a flow diagram for the preferred implementation of the SET procedure shown in FIG. 24.
Figure 26:
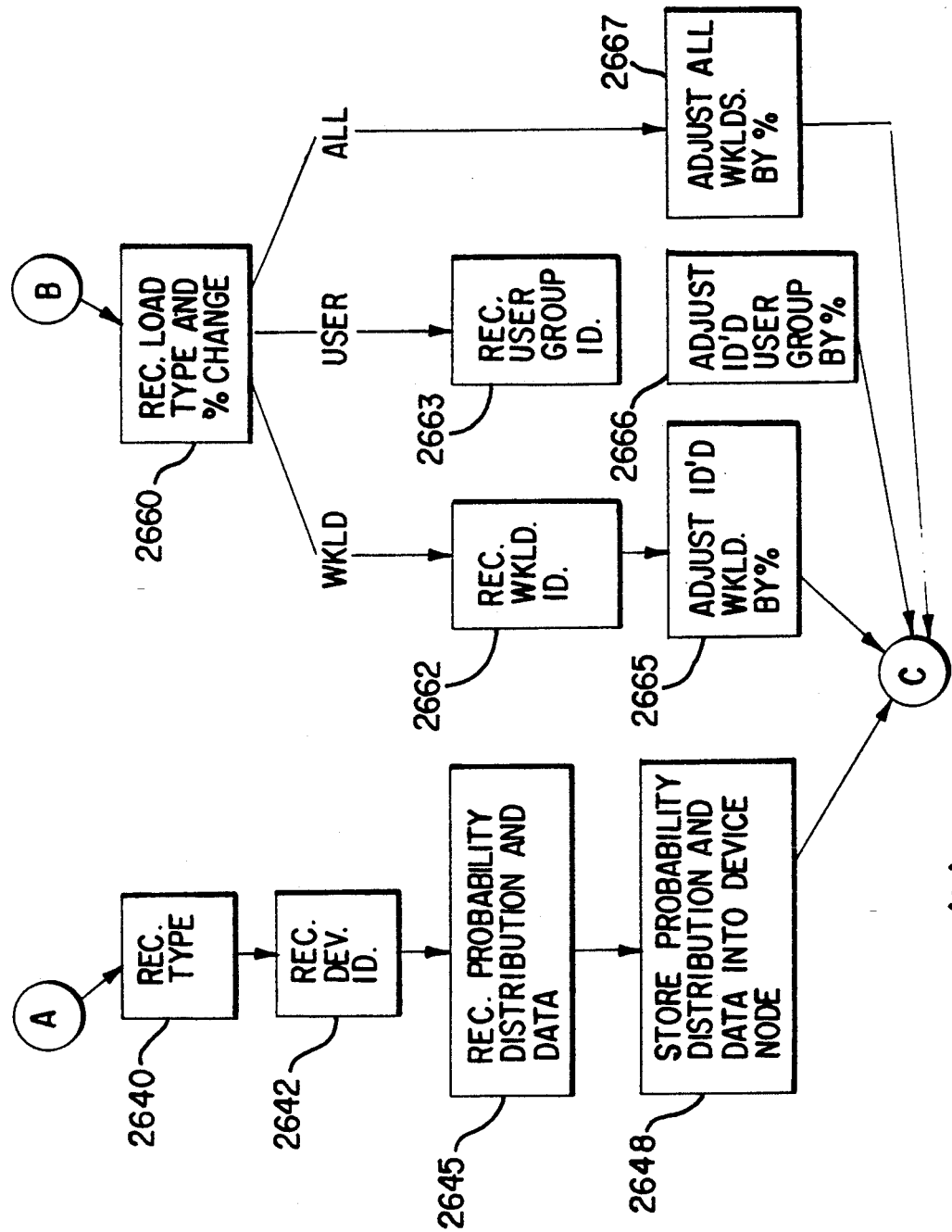

FIGS. 26(a) and 26(b) show a flowchart 2600 containing the preferred implementation for executing the SET procedure (Step 2430 in FIG. 24). In the preferred implementation, many of the functions performed in executing the SET procedure are performed by display logic 322 adjusting data in display context portion 318 (FIG. 3(a)). Changer on the other hand, performs the functions which involve either calculations or the adjustment of the specific data structures in structure context 317. The division of responsibilities among the different elements of modeling interface 300 and 350, however, are not critical to the invention and could be accomplished in equivalent manners.

In flow diagram 2600, when an operator has selected the SET option, a menu is presented asking for a selection of a suboption. In response, the operator supplies an input. When that input is received, one of several actions will occur.

If the operator has selected the DISPLAY MODE suboption (Step 2610), then display/keyboard 320 presents the operator with a menu asking for an indication of the display mode desired. When the desired display mode information is received from the operator (Step 2610), that information is stored by keyboard logic 323 (FIG. 3(a)) into display context data 318. Display logic 322 then uses the stored information to control the display of the information on display/keyboard 320.

If the operator has instead selected the CURRENT WORKLOAD suboption (Step 2610), the operator is queried via a menu whether to set the WORKLOAD or set the SOURCE CPU (Step 2620). If the operator wishes to set the WORKLOAD, the operator is presented with a menu to determine the identification of the workload. Once the modeling interface 300 receives the workload identification (Step 2622), that information is stored by keyboard logic 323 into the display context area 318 (Step 2625).

If the operator instead wishes to set the SOURCE CPU, the operator is requested, via a menu, to supply an identification of the SOURCE CPU. When the modeling interface 300 receives that identification (Step 2627), keyboard logic 322 stores that identification into display context portion 318 (Step 2628).

If, after selecting the SET option, the operator requested the BALANCE MODE suboption (Step 2610), the operator is asked, via a menu, to indicate whether the operator wishes to balance the model or specify a balance mode (Step 2630). If the operator requests to balance the model, for example to ensure that all the branching probabilities for each workload add to 100% (which may be necessary depending upon the .MDL file received or because of other changes made to the probability distributions), the model is balanced (Step 2635), preferably by changer 330.

If operator instead wishes to specify a balance mode, the operator is asked to supply that balance mode, again using a menu in the preferred implementation. When modeling interface 300 receives the specified balance mode (Step 2632), which can be either uniform or relative, keyboard logic 323 stores that mode into display context portion 318.

If, after selecting the SET option, the operator chooses the PROBABILITY DISTRIBUTION suboption (Step 2610), then the operator is queried, via a menu, as to the type of device for which the probability distribution is being set (Step 2640 in FIG. 26(b)). The device type can either be a user group, a CPU, or a disk.

Next, the operator is presented a selection menu appropriate to the selected device type to identify a device and a workload for which the probability is to be set. When the operator selects the desired identification, the modeling interface receives the selection (Step 2642).

Next, the operator is presented with a display screen for input of the probability distribution and other necessary data. The user supplies the probability distribution and data, which can include information such as whether the probability distribution is FIXED or FLOATING. Once that information is received by modeling interface 300 (Step 2645), the probability distribution and data are stored by changer 330 in the node of workload tree 640 corresponding to the identified device (Step 2648).

If the operator input in response to the main menu 500 was a request to set a WORKLOAD PARAMETER (Step 2610), then the operator is presented a menu asking for a workload identification. When that identification is received (Step 2650), the operator is presented a menu to supply an identification of the workload parameters. When modeling interface 300 receives that identification, as well as the values, from the operator (Step 2655), changer 300 stores those workload parameters into the appropriate workload node in structure context portion 317 (Step 2658).

If the operator requests the SYSTEM LOAD option after selecting the SET option from main menu 500 (Step 2610), the operator is presented a menu asking for an identification of the load type (expressed in TPS) and percentage change (Step 2660). Whether the percentage change is positive or negative also indicates whether the change is an increase or a decrease in the load.

The operator is then presented with a menu indicating whether the change is for a single workload, a user group, or for all of the workloads. If the operator indicates that the change should be for a single workload then the operator is presented with a menu asking for an identification of the desired workload. When that identification is received (Step 2662), changer 330 increases or decreases the identified workload by the indicated percentage (Step 2665).

If the operator instead indicates that the load type to be changed is for all of the workloads in a user group, then the operator is presented with a menu asking for an identification of a user group. Once that identification is received (Step 2663), changer 330 accesses all of the workloads to which the indicated user group contributes, and adjusts the workloads by the indicated percentage proportionate to the identified user group's contribution to the workload (Step 2666).

If the operator instead indicates a desire to change all of the workloads, then the TPS for all of the workloads are changed by the indicated percentage (Step 2667). This is preferably also accomplished by changer 330.

Returning to FIG. 26(a), if the operator selects the SET Object Name suboption, the operator is presented with a series of menus asking for an identification of the object. When the operator selects the identification of the object from the menu, and that selection is received (Step 2670), the operator is presented a window asking for the name of the device. When the object name is received (Step 2675), changer 330 stores that name into the name field (see field 810 of FIG. 8) of the node associated with the indicated device (Step 2678).

If the operator has selected the SET Object Type option from main menu 500 (Step 2610), the operator is presented with the series of menus explained previously regarding the SET Object Name option to identify the object. When the identification of the object is received (Step 2680), the operator is presented with a menu asking the operator to identify the object type desired. Once this identification is received by the modeling interface (Step 2685), changer 330 stores that object type in the element type field (see field 850 in FIG. 8) for the identified object (Step 2688).

At the end of the steps in SET option flowchart 2600, control is returned to main menu 500 in FIG. 5(a).

3. ADD option

Figure 27:
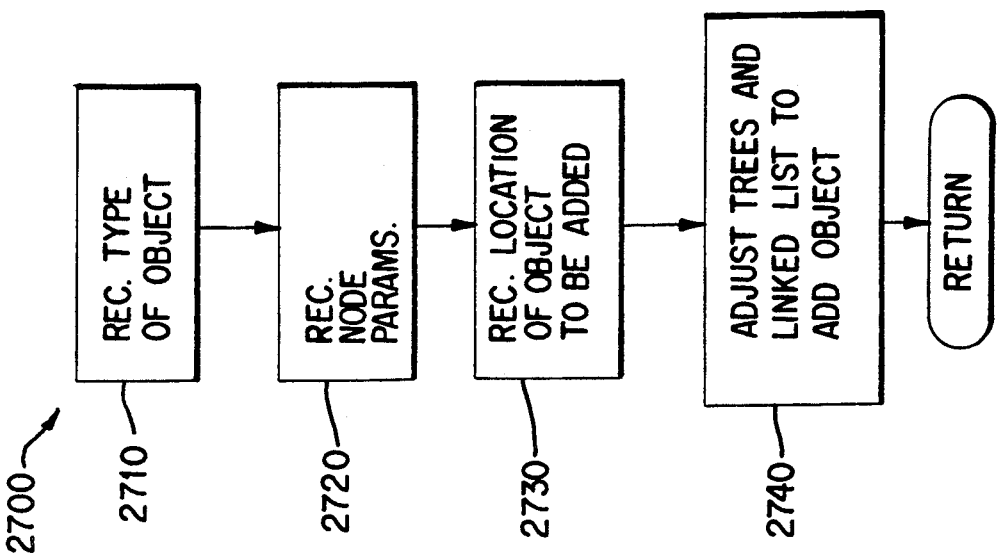
FIG. 27 includes a flow diagram for the preferred implementation of the ADD procedure shown in FIG. 24.

If instead of the SET option, the operator had chosen the ADD option from the main menu 500, then ADD procedure 2440 (FIG. 24) would be executed. A preferred implementation of ADD procedure 2440 is shown by flow diagram 2700 in FIG. 27.

It should be noted, that for the ADD procedure 2440, as well as for DUPLICATE procedure 2450, MOVE procedure 2460, and REMOVE procedure 2470, the changes to data structure 315, particularly structure context 317, are preferably accomplished by changer 330. In other implementations, however, other elements can be used to effect the changes to the data structure 315.

In flow diagram 2700, the operator is first presented with a series of menus for the operator to identify the type of object to be added (Step 2710). Once that identification is received (Step 2710), the operator is presented with a menu to supply the node parameters for the identified object. When those node parameters are received (Step 2720), the operator is presented with menus to specify the destination of the object to be added. For example, if the object to be added is a disk, the operator will be asked to specify whether the disk is to be added to an HSC channel or to a CPU, and then identify the specific HSC channel or CPU. If the object to be added is an HSC or a CPU, the operator will be asked to identify a bus adaptor which will indicate the bus to which the device is added. In the preferred implementation, an HSC or CPU will be added to the current bus, and must be moved using the MOVE option if this is not the desired destination.

Once the location is received (Step 2730), the changer creates a node with the parameters and adds it to the tree in structure context portion 317 at the appropriate location (Step 2740). Note that the addition of an object will likely affect the displayed data which will become stale.

Control is then returned to main menu 500.

4. DUPLICATE option

Figure 28:
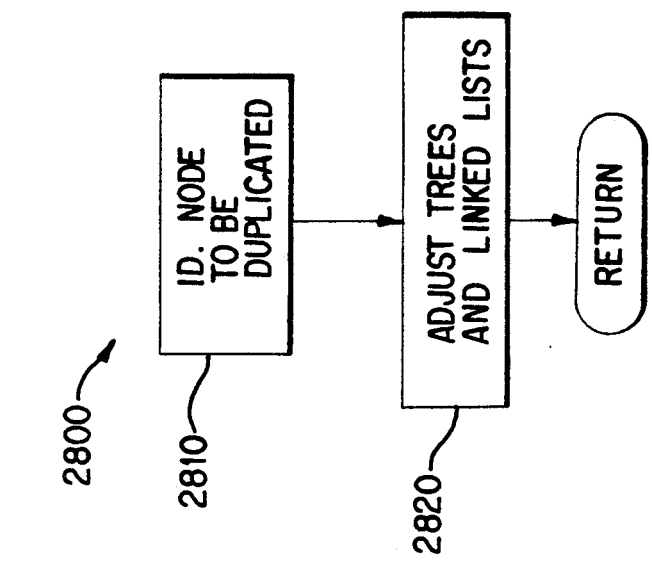
FIG. 28 includes a flow diagram for the preferred implementation of the DUPLICATE procedure shown in FIG. 24.

If the operator had chosen the DUPLICATE option from main menu 500, DUPLICATE procedure 2450 (FIG. 24) would be executed. A preferred implementation of the DUPLICATE procedure is shown by flowchart 2800 in FIG. 28. In flowchart 2800, the first step is to identify the node to be duplicated, which is done in the manner described above. Once the node identification is received by modeling interface 300 (Step 2810), the identified device is duplicated by copying the node for the indicated device exactly, and then adjusting certain of the linked lists to add the device in the model next to the device copied (Step 2820). In the preferred embodiment, however, the MSCP and workload information is not copied for new devices. Control is then returned to the main menu 500.

5. MOVE option

Figure 29:
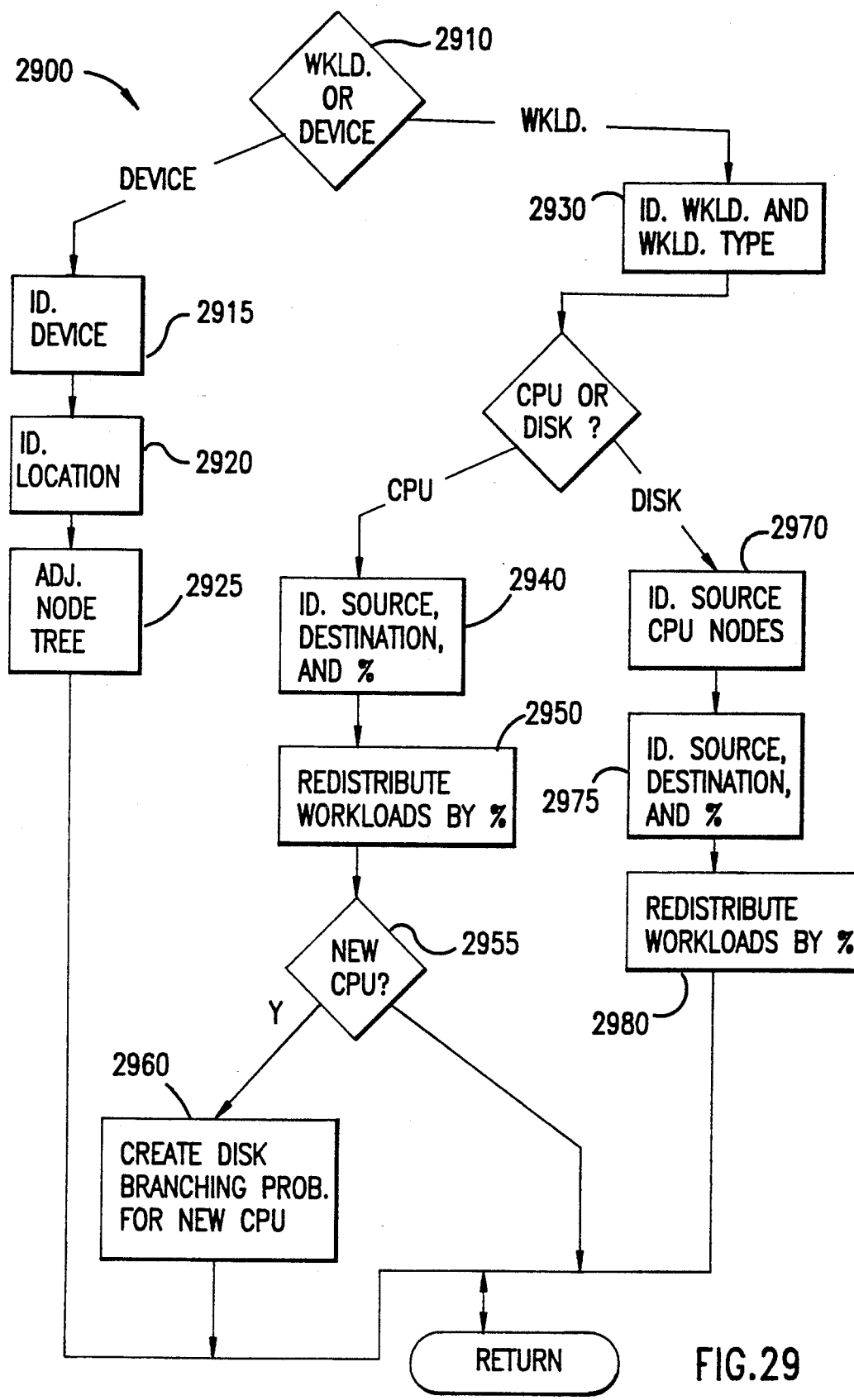
FIG. 29 includes a flow diagram for the preferred implementation of the MOVE procedure shown in FIG. 24.

If the operator chooses the MOVE option from main menu 500, MOVE procedure 2460 (FIG. 24) is executed. The preferred implementation of MOVE procedure 2460 is shown by flow diagram 2900 in FIG. 29.

At the outset of flow diagram 2900, the operator is prompted by a menu to indicate whether the object to be moved is a workload or a device. When the operator makes that indication, it is received by modeling interface 300 (Step 2910).

If the operator indicates that a device is to be moved, then a series of menus are presented for the operator to identify the device. When that identification is received by modeling interface 300 (Step 2915), the operator is prompted by another series of menus to identify the destination of the identified device.

Once the destination is received by modeling interface 300 (Step 2920), changer 330 removes the node for the identified device from its current location and inserts it into the device tree structure 700 at a position corresponding to the destination (Step 2925). This procedure involves, among other functions, reconnection of the parent linked lists in structure context portion 317 to indicate movement of the corresponding node. The data structures for the model node are also updated to reflect the movement of the node.

Once structure context portion 317 is updated by changer 330, control is returned to main menu 500.

If, after selecting the MOVE option, the operator had instead chosen to move a workload, the operator is presented with a series of menus to identify the workload and indicate whether the identified workload is to be moved from a CPU or disk. When this information is received by modeling interface 300 (Step 2930), modeling interface 300 next determines whether the node type is a CPU or a disk (Step 2935).

If the node type is a CPU, then the operator is presented with menus to identify source CPUs of the workload, the destination CPUs of the workload, and the percentage of the workload to be moved. When this information is received (Step 2940), the CPU load is redistributed by moving the indicated percentage of the identified workload to the destination workloads (i.e., those which are already supporting that workload and whose probabilities are not already fixed) according to the balancing mode (Step 2950).

An example of how this might be done is shown in FIG. 30. In FIG. 30, 50% of workload1 is to be moved from CPU1 to CPU2 and CPU3. Before the move, the branching probability for CPU1 is 25%, the branching probability for CPU2 is 35%, and the branching probability for CPU3 is 40%.

After the move, 50% of workload1 will have been taken from CPU1, so the remaining branching probability for CPU1 would be 12.5%. If a uniform balancing mode was chosen, then the amount of the workload taken away from CPU1, or 12.5%, would be shared among CPU2 and CPU3. Thus, both CPU2 and CPU3 would get 6.25%, resulting in a branching probability for workload1 of 41.25% for CPU2 of 46.25% for CPU3. This is represented by the leftmost number in the parenthesis in the AFTER column in FIG. 30.

If a relative balancing mode is chosen, then the ratio of the balancing probability for CPU2 and CPU3 must first be determined. One way of accomplishing this is to add the branching probabilities of the affected CPUs for the identified workload and then determine the ratio of each affected CPU to the sum. The ratio will not only be the percentage of the branching probabilities of CPU2 and CPU3 before moving the workload, it is also used to determine the amount of the moved workload which each CPU should receive to maintain the same ratios.

Using this calculus, CPU2 has a ratio of 35/75 or about 47%, and CPU3 has a ratio of 40/75 or about 53%. Thus, 47% of the change in CPU1's branching probability for workload1, or 47% of 12.5%, would be added to CPU2's branching probability for workload1 and 53% of 12.5% would be added to CPU3's branching probability for workload1. The result would be that CPU2 would have 40.83% as its new branching probability and CPU3 would have 46.67 as its new branching probability. These are shown by the rightmost values in the parenthesis in the AFTER column for CPU2 and CPU3 in FIG. 30.

Preferably, this calculation would be done by changer 330 in FIGS. 3(a) and 3(b), although it is not important to the present invention which element is performing the calculations.

After the workloads are redistributed by percentage, modeling interface 300 determines whether any of the destination CPUs are new participants in this workload (Step 2955). If not, or after the creation of the disk branching probabilities, control is returned to main menu 500.

If so, then a new CPU branching probability node has to be created to reflect the newly computed branching probabilities (Step 2960). The new branching probability node must be set with a value that reflects the redistributed percentage. For example, assume that prior to moving a workload, the following condition existed:

| System | Load | Disk1 | Disk2 |
|---|---|---|---|
| CPU1 | 20% | 80% | 20% |
| CPU2 | 80% | 10% | 90% |
| CPU3 | 0% | 0% | |

If 50% of the workload is moved from CPU1 and CPU2 onto CPU3, the result would be:

| System | Load | Disk1 | Disk2 |
|---|---|---|---|
| CPU1 | 10% | 80% | 20% |
| CPU2 | 40% | 10% | 90% |
| CPU3 | 50% | 24% | 76% |

The load for disk1 is obtained by taking the percent of the load on disk1 from CPU1, or 20%×80%, and adding it to the percentage of the workload on disk1 form CPU2, or 80%×10%. The resulting sum is 24%. Similarly, if the load for disk2 from CPU1, or 20%×20% is added to the percent of the workload in disk2 on CPU2, or 80%×90%, the sum is 76%, which is a percentage of the workload shown in CPU3 for disk2.

If the workload to be moved is from a disk, then the operator is presented a series of menus asking for an identification of the source CPU nodes for the disks. When this identification is received (Step 2970), the operator is then asked, via other menus, to identify the source disks of the workload, the destination disks of the workload, and the percentage of the workload to be moved. When this identification is received (Step 2975), the workloads are redistributed by percentage (Step 2980). Preferably, this involves reducing the percentage of the load from all of the source nodes, and increasing the percentage of the load to all of the destination nodes according to the balancing mode in the same manner as is done when a CPU load is moved.

After redistribution of the workloads, control is returned to main menu 500.

6. REMOVE option

Figure 31A:
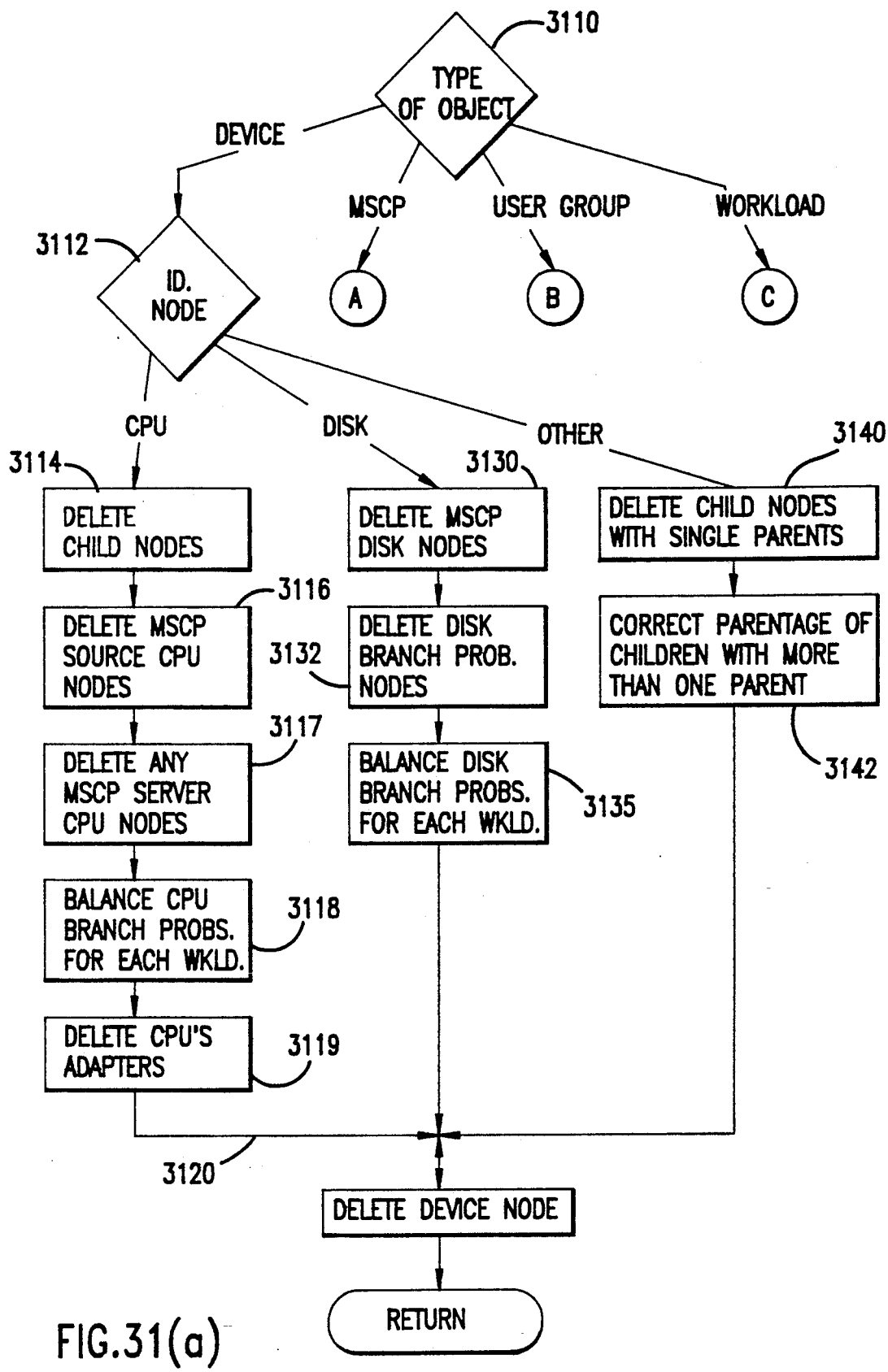
FIGS. 31(a), 31(b), and 31(c) include a flow diagram for the preferred implementation of the REMOVE procedure shown in FIG. 24.

If operator had selected to REMOVE option from main menu 500, then REMOVE procedure 2470 (FIG. 24) is executed. A preferred implementation of REMOVE procedure 2470 is shown by flow diagram 3100 in FIGS. 31(a), 31(b) and 31(c).

In flow diagram 3100, the operator is first presented with a menu to determine the type of object to be removed (Step 3110). If the operator responds by identifying a device, the operator is presented with a menu asking for an identification of the specific device to be removed, and that identification is received by the modeling interface (Step 3112).

If the operator identifies a CPU, then changer 330 first deletes the child nodes of that CPU (Step 3114). The deletion of the child nodes, such as disks, is discussed below.

Next, changer 330 deletes the MSCP source CPU nodes (Step 3116). The source CPU nodes can be located using the MSCP linked list for the corresponding node. Deletion of the source nodes also deletes the served disk nodes that were its children, requiring further modification of device tree 700 and MSCP tree 660 as appropriate.

Next, the corresponding server node MSCP subtree for that node is deleted if one is present (Step 3117). The tree can be found using the MSCP pointer 1310 (FIG. 13) of the device node. This deletion will also have ramifications on all the device nodes corresponding to source CPU nodes or served disk nodes for the deleted MSCP tree, and must be handled appropriately.

After deletion of the MSCP server nodes, the CPU branch probabilities for each workload supported by the identified CPU must be rebalanced for the remaining CPUs in accordance with the balance mode (Step 3118). The details for such rebalancing was described above in the explanation of the MOVE flow diagram 2900.

Next, the nodes for each of the adapters for the CPU are deleted (Step 3119). This effectively disconnects the deleted CPU nodes from the busses.

The final step in removing a CPU node is the deletion of the statistics list and the deletion of the node itself (Step 3120). After that, control is returned to main menu 500.

If the type of node to be removed is a disk, or if a disk is to be deleted as part of the removal of a CPU, the MSCP served disk nodes are deleted (Step 3130). Such nodes can be located by the MSCP linked lists for the node corresponding to the disk to be deleted. The deletion of a disk node from the MSCP tree involves the adjustment of the MSCP subtrees as well to eliminate any pointers to the deleted disk.

After deletion of the MSCP disk nodes, the disk branch probability nodes for the identified disk are deleted by changer 330 (Step 3132). Such probability nodes can be identified using the workload linked lists for the node corresponding to the identified disk.

Next, the disk branch probabilities for each workload that was supported by the identified disk are rebalanced (Step 3135). Again, this rebalancing is performed separately for each workload, and is done in accordance with the identified balancing mode.

The final step in the removal of a disk is the deletion of the statistics list, if present, and the deletion of the disk node itself (Step 3120). When this is done, control is returned to the main menu 500.

If the device to be removed has been identified by the operator as something other than a disk or CPU, such as an HSC, changer 330 first deletes any child nodes whose only parents are either the object to be deleted or a child of an object to be deleted that does not have a parent which survives the deletion (Step 3140). For example, if an NI bus were deleted, CPUs that still were connected to a CI bus would not be deleted, nor would the disks connected to that CI bus. All CPUs connected only to the NI bus, however, would be deleted, as would any devices connected only to those CPUs. The deletion of CPUs and disks has been described above.

For the child nodes that have more than one parent, their parent linked lists are adjusted to reflect the absence of the parent which is being deleted (Step 3142).

Finally, the node for the device to be deleted is itself deleted (Step 3120). If the node has a statistics list, it is deleted. Control is then returned to the main menu.

Figure 31B:
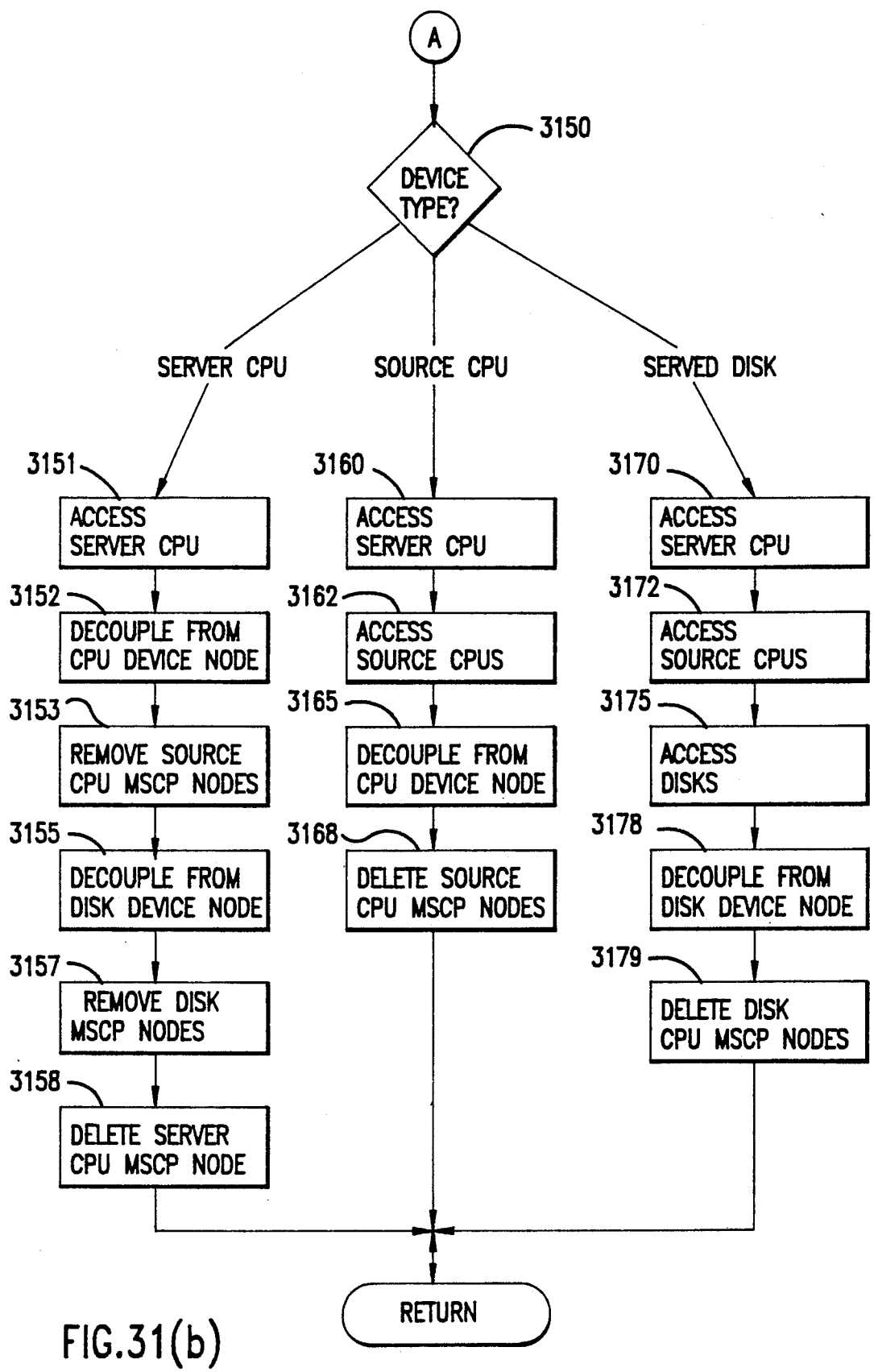

If the operator is using the REMOVE option to delete an MSCP element, the steps shown in FIG. 31(b) are executed, preferably by changer 330. The first determination made is what the type of device is to be deleted from the MSCP element (Step 3150). This is preferably done using a menu.

If an MSCP server CPU node is to be deleted, the node in the MSCP tree for the server CPU to be deleted is accessed by changer 330 (Step 3151). This is preferable done through the MSCP pointer 1310 (FIG. 13) of the device node.

Once the MSCP node is accessed, the source nodes in the trees are decoupled from the CPU device node (Step 3152). This is accomplished by changer 330 in the preferred implementation by adjusting the MSCP linked lists for the CPU nodes. The source CPU MSCP nodes for the MSCP tree are then deleted (Step 3153).

Next, the disk device nodes in the MSCP tree are decoupled from the nodes in device tree 700 (Step 3155). The device tree nodes can be located using the disk MSCP pointers, such as pointer 2382 in FIG. 23. Decoupling involves adjustment of the MSCP linked lists of the nodes in device tree 700 for the corresponding disks. After decoupling, the disk CPU MSCP nodes are deleted (Step 3157).

Finally, the server CPU MSCP node is deleted (Step 3158). Such deletion is accompanied by the clearing of the MSCP pointer 1310 (FIG. 13) in the corresponding device tree node. Control is then returned to main menu 500.

If one or more source nodes are to be removed, the corresponding server CPU node is accessed (Step 3160), and from that access, the designated source CPU nodes are accessed (Step 3162).

Next, the source CPU nodes are decoupled from the corresponding CPU device node by correcting the linked lists accordingly (Step 3165). Then the source CPU MSCP nodes are deleted from the MSCP trees for the corresponding server node (Step 3168). Control is then returned to main menu 500.

If a disk is to be removed from an MSCP relationship, changer 330 accesses the corresponding server CPU MSCP nodes (Step 3170), source CPU MSCP nodes (Step 3172), and disk MSCP nodes (Step 3175). This access is preferably done by locating the proper MSCP trees.

After the disks are accessed, the corresponding disk device nodes in device tree 700 are decoupled from the MSCP tree (Step 3178), and the disk MSCP nodes are deleted (Step 3179). When this is finished, control is returned to main menu 500.

Figure 31C:
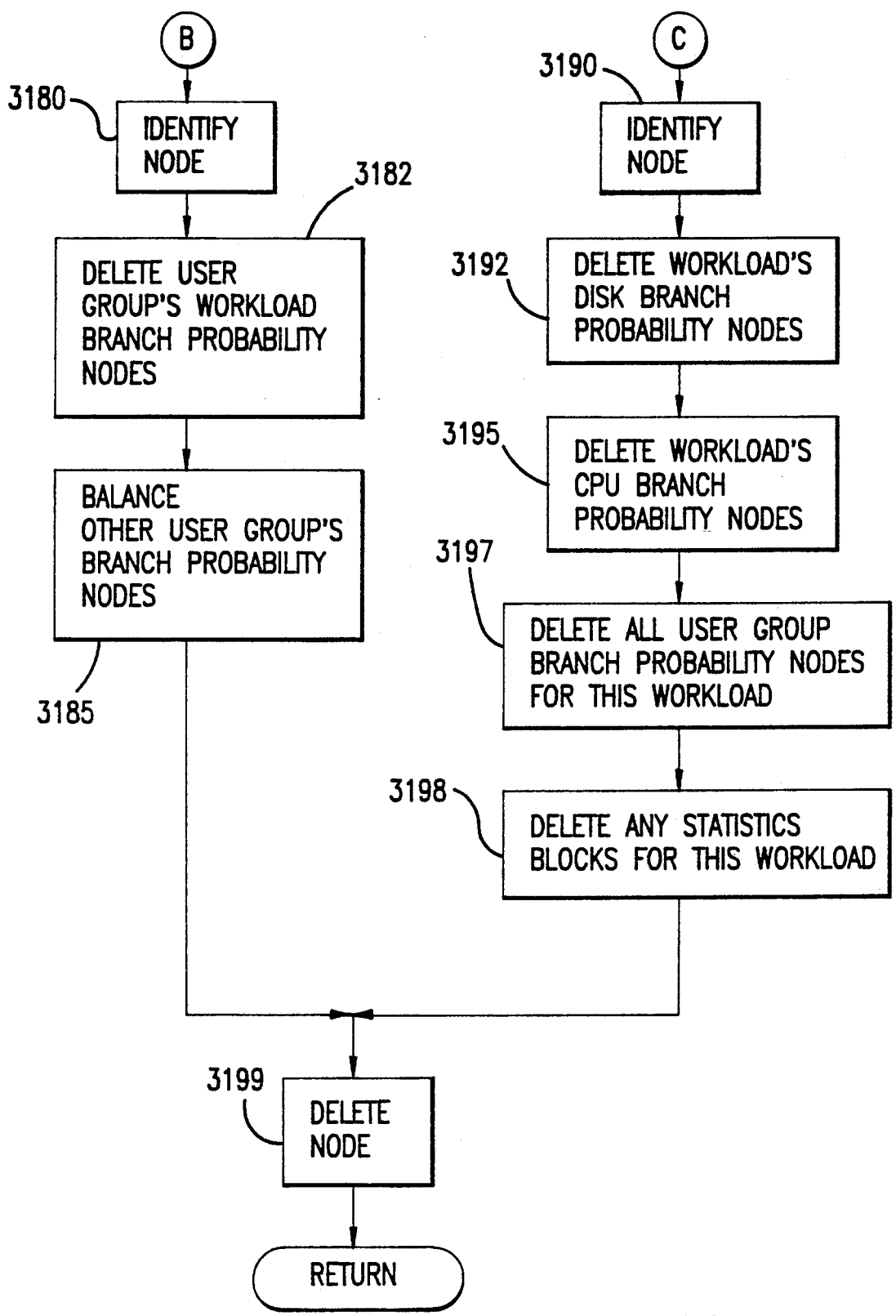
Figure 33:
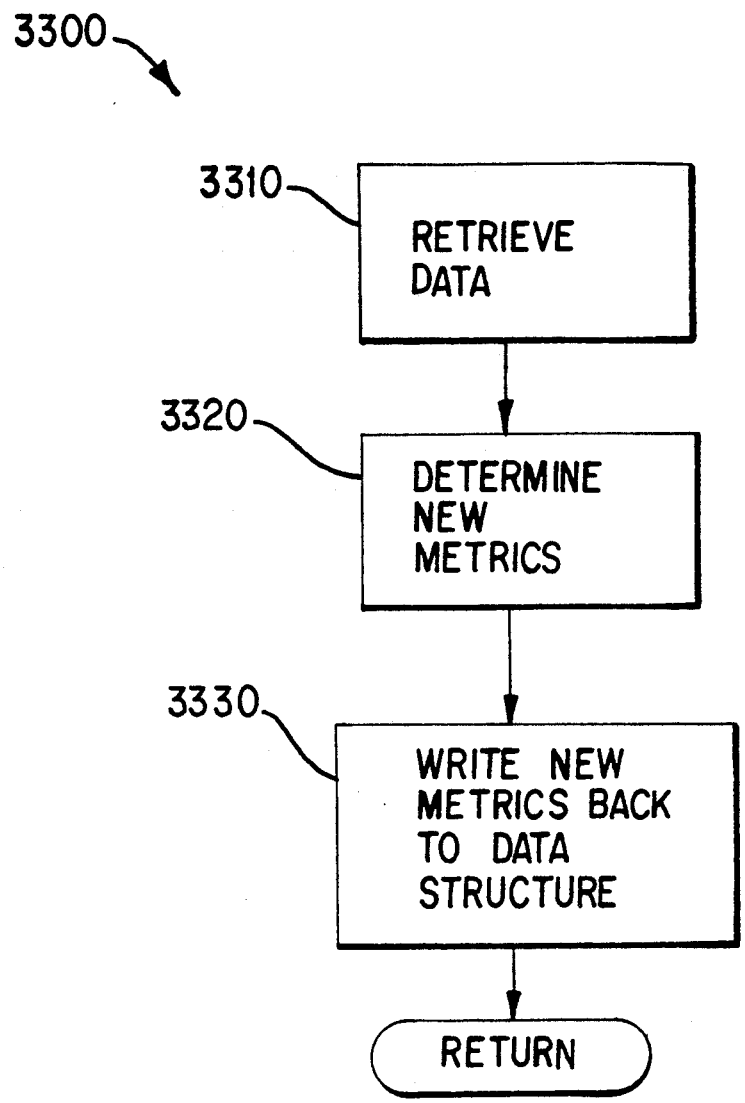
FIG. 33 includes a flow diagram for the preferred implementation of the SOLVE procedure shown in FIG. 24.

Returning to FIG. 31(a), the operator could also choose to delete a user group. If so, the preferred implementation step for such a choice are shown in FIG. 31(c).

The operator is first presented with a window asking for an identification of the user group to be removed. When the operator makes the choice, changer 330 identifies the corresponding user group nodes (Step 3180).

Once the user group node is identified, changer 330 deletes the workload branch probability nodes for that user group (Step 3182). The workload pointers, such as pointer 1774 in FIG. 17, can be used to find the needed user group branch probability nodes.

After deleting the branch probability nodes, changer 330 rebalances the other user groups' branch probability nodes according to the balancing mode (Step 3185). If a user group was responsible for 100% of any workload, that workload is also deleted.

Once this is done, the node for the user group is deleted (Step 3199). Control is then returned to main menu 500.

If the operator chooses to remove a workload, then the operator is presented with menus to select the workload to be removed. Once the workload is identified, changer 330 finds the workload node associated with that workload (Step 3190).

Next, changer 330 deletes all disk branch probability nodes for that workload (Step 3192). This is easily accomplished using the tree structure for the workload tree.

Next, changer 330 deletes the workload CPU branch probability nodes (Step 3195). This too is accomplished easily by virtue of the workload tree's structure.

Next, the user group branch probability nodes for the identified workload are deleted (Step 3197). This too makes use of the structure of the workload tree in the preferred implementation.

Finally, the statistic blocks for this workload in each device's statistics list are deleted (Step 3198).

When all these tasks have been completed, the node for the corresponding workload is deleted (Step 3199). Control is then returned to the main menu 500.

7. VIEW option

Figure 32:
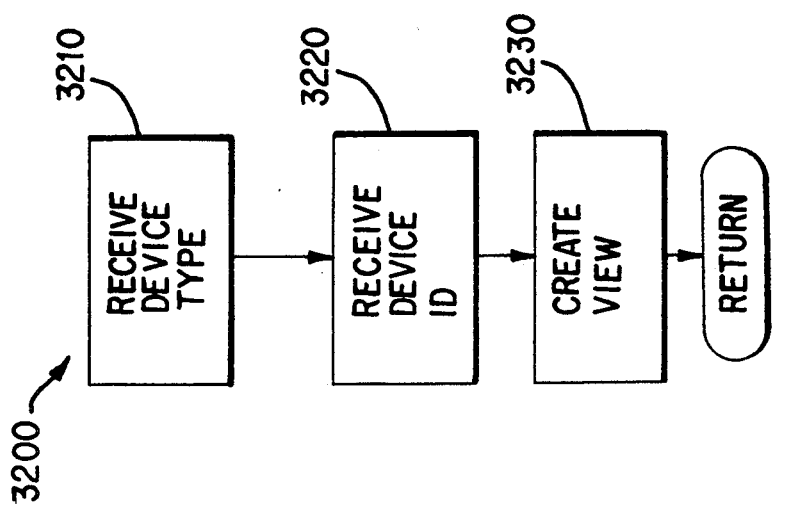
FIG. 32 includes a flow diagram for the preferred implementation of the VIEW procedure shown in FIG. 24.

If, in flow diagram 2400, the operator had chosen the VIEW option, then VIEW procedure 2480 would be implemented. FIG. 32 contains flow diagram 3200 showing a preferred implementation of view procedure 2480.

In flow diagram 3200, the operator is presented with a menu asking for an identification of the device type. When the operator makes a selection and it is received by modeling interface 300 (Step 3210), the operator is presented with a series of menus to identify a specific device. When modeling interface 300 receives the operator's identification of a device (Step 3220), display logic 322 creates the desired zoomed view (Step 3230). This involves the application of display techniques which would be known to persons skilled in the art, and thus does not need to be described further.

After creating the desired view, the control is returned to main menu 500.

8. SOLVE option

The remaining option which an operator could select from the main menu 500 is the SOLVE option. If that option is chosen, then SOLVE procedure 2490 is executed. Preferably, procedure 2490 is executed by solver 335 in FIGS. 3(a) and 3(b).

The preferred implementation of solver 335 is described in detail in U.S. Ser. No. 07/280,171 to Kwag et al., which is herein incorporated by reference. Kwag et al. describes a device for taking information describing a computer system, generating a mathematical model of the computer system, and evaluating results using the computer system statistics.

In the preferred implementation of the invention, solver 335 retrieves the data from data storage 315 (Step 3310). Preferably, solver 335 would have code for retrieving the configuration data directly from the tree structures in data storage 315. Retrieval of data from trees is well known to persons of ordinary skill in this art.

If, however, solver 335 is designed to retrieve data in an array format, then a parser, such as parser 390 shown in FIG. 3(b), can be used to convert the data from a tree structure into an array structure for use by solver 335.

Once the data is retrieved, solver 335 determines new metrics based upon a mathematical model of the computer system configuration (Step 3320). The metrics include information such as queue lengths and delays in the system.

When solver 335 completes its calculations, it writes those new metrics into the data structure 315 (Step 3330). Again, in the preferred embodiment, the metrics would be written directly back into the device, workload, and user group tree structures. Solver 335 could also place the metrics data into an array structure. In this case, parser 390, as well as parser 365, both shown in FIG. 3(b), could be used to place the new metrics values into the appropriate tree structures.

When solver 335 completes its calculations and storage of data, control is returned to main menu 500.

D. Parser

The only elements of modeling interfaces 300 and 350 that have not been discussed in greater detail are the parsers, such as parsers 310, 340, 360, and 390, and interface 365. Parser construction is generally known to persons skilled in the art, especially when providing an interface to tree structures and linked lists.

Figure 34:
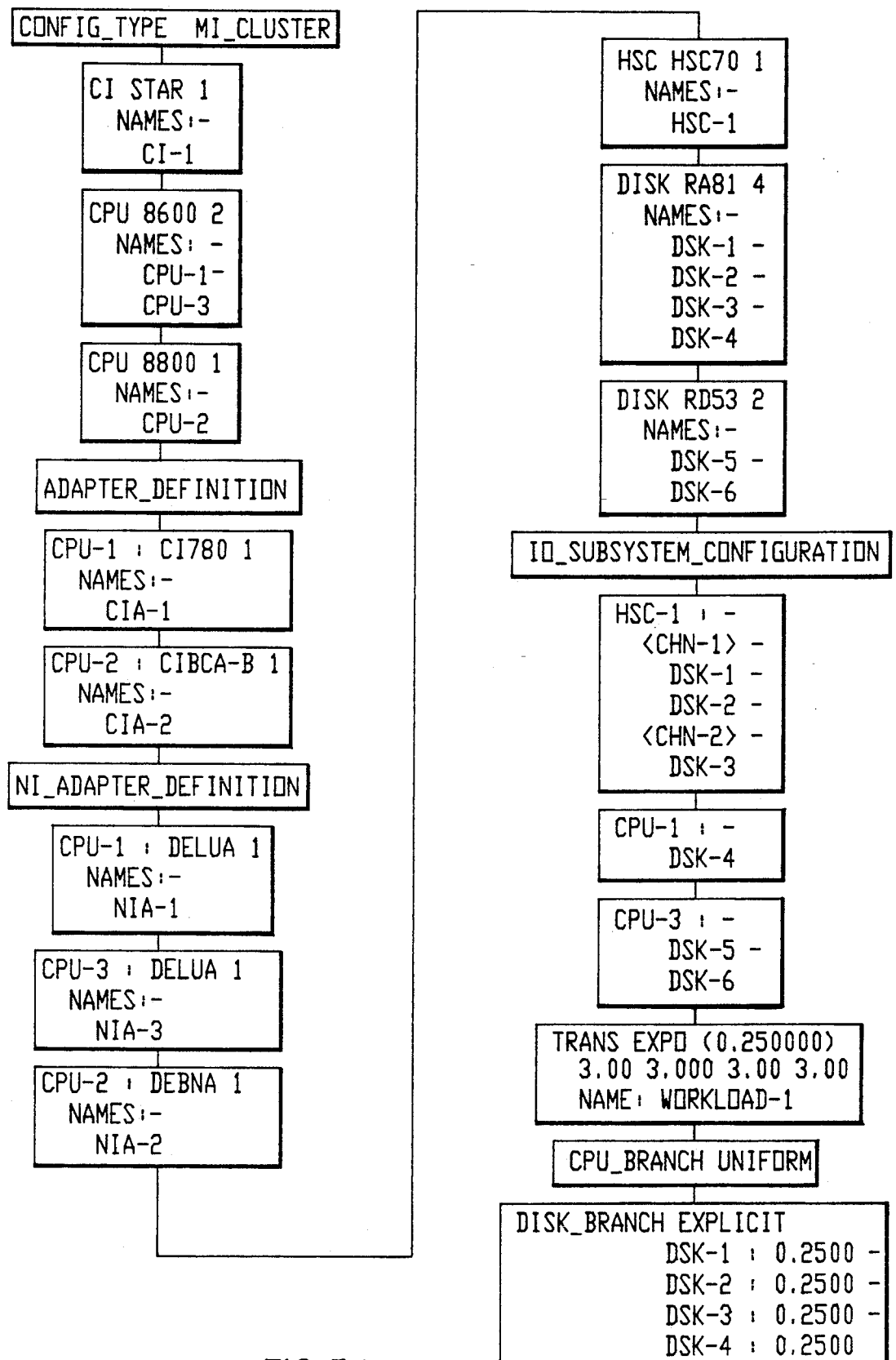
FIG. 34 shows a format for certain files with which the parsers interface.

FIG. 34 shows the format 3400 for the .MDL files 305 and 345. Parsers 310, 340, 360 and 390 would then be designed to provide an interface for such formats, or for any other format used in an implementation of the invention.

E. Summary

From the preceding explanation it can be seen how the modeling interface of this invention achieves the desires set forth. This invention provides a mechanism for performance analysis and capacity planning that allows for a more meaningful presentation of performance information. It does so using the displays and menus described above.

The present invention also provides an improved mechanism for changing the configurations of the computer system, at least in a virtual sense, to determine the effects of such changes. That improved mechanism includes the display of the computer system configuration as well as the display of the selected metrics with that configuration.

Similarly, the present invention provides an improved mechanism for presenting the effects of the changes in configuration in a manner which allows ready decision making. The display discussed above provides a meaningful presentation of changes to a computer system being modeled to enhance capacity planning and performance analysis.

The foregoing description of preferred implementations of the invention has been presented for purposes of illustration and description. It is not intended to be exhaustive or to limit the invention to the precise forms disclosed, and modifications and variations are possible in light of the above teachings or may be acquired from practice of the invention. The embodiments were chosen and described to explain the principles of the invention and its practical application to enable one skilled in the art to use the invention in various embodiments and with various modifications as are suited to the particular use contemplated. It is intended that the scope of the invention be defined by the appended claims and their equivalents.

What is claimed is:

1. A method of evaluating a computer system comprising the steps, executed by a modeling data processor, of:

producing a model of a configuration representing physical devices in the computer system, connections of the physical devices in the computer system, and workloads which are processes that use system resources provided by the physical devices of the configuration of the computer system in the data processor;

displaying, on a visual display device coupled to the modeling data processor, a diagram representative of the configuration of the computer system;

modifying the configuration of the computer system to provide a modified configuration in response to an input to modify;

modifying the model of the computer system in accordance with the modified configuration of the computer system;

determining new values of selected metrics for the modified model of the computer system, with said selected metrics including measurable values representative of a performance characteristic of the computer system; and displaying on the visual display device a diagram of the modified configuration of the computer system.

2. The method of claim 1 wherein the step of producing the model of the computer system configuration includes the substep of:

representing the model of the computer system configuration in the data processor in a device data structure which is organized hierarchically to reflect the relationship of the physical devices of the computer system.

3. The method of claim 2 wherein the step of representing the model of the computer system configuration in the device data structure includes the substep of:

representing the model of the computer system configuration as a tree structure having nodes corresponding to the physical elements.

4. The method of claim 3 wherein the method further includes the steps of:

representing the workloads as entries in a workload data structure; and associating each the workloads represented in the workload data structure with the representations in the device data structure of the physical devices which supply system resources to the associated workload.

5. The method of claim 4 wherein the step of representing the workloads in the workload data structure includes the substep of:

including in the workload data structure information regarding the amount of the system resources required from the associated physical devices by each represented workload.

6. The method of claim 5 wherein the step of including in the workload data structure information regarding the amount of the system resources required from the associated physical devices by each represented workload includes the substeps of:

including in the information an indication of the total amount of system resources required by each workload; and including in the information an indication of the fraction of the total amount of system resources supplied by each of the associated physical devices.

7. The method of claim 1 wherein the step of modifying the model includes the substep of:

determining a redistribution of the workloads among the physical devices in response to a change in one of the workloads.

8. The method of claim 7 wherein the step of determining the redistribution of the workloads includes the substeps of:
identifying for the one of the workloads that is changed a set of physical devices in the model which would be affected by the change in the one workload; and redistributing the one workload to the physical devices in the identified set.

9. The method of claim 8 wherein the substep of redistributing the one workload includes the substep of:
distributing equal percentages of the change in the one workload to each of the physical devices in the identified set.

10. The method of claim 8 wherein the substep of redistributing the one workload includes the substep of:
distributing percentages of the change in the one workload to the physical devices in the identified set proportionately to the ratios of percentages of the one workload supported by the physical devices in the identified set before the change in the one workload.

11. The method of claim 1 wherein the step of displaying a diagram of the modified configuration includes the substep of:
displaying on the diagram on said visual display device, the new values of the metrics.

12. The method of claim 1 further comprising the step of receiving, from the computer system, data describing the configuration of the computer system, and
wherein the step of creating the model of the configuration of the computer system includes the substep of
building the model of the computer system configuration from data describing the configuration of the computer system.

13. The method of claim 1 further including the step of
receiving initial values for the selected metrics based on actual operation of the computer system.

14. The method of claim 1 wherein the step of displaying a diagram on said visual display device, of the computer system configuration includes the substep of:
displaying representations of the physical devices and representations of the connections of said devices.

15. The method of claim 1 wherein each of the workloads in the computer system is associated with one of the physical devices which provide system resources for that workload
the step of displaying a diagram on said visual display device, of the computer system configuration includes the substep of:
displaying a representation of at least one of the workloads in the computer system.

16. The method of claim 1 wherein during the step of modifying the configuration
the input to modify is an input adding a new physical device to the configuration.

17. The method of claim 1 wherein during the step of modifying the configuration
the input to modify is an input deleting one of the physical devices from the configuration.

18. The method of claim 1 wherein during the step of modifying the configuration
the input to modify is an input changing connections of one of the physical devices in the configuration.

19. The method of claim 1 wherein during the step of modifying the configuration
the input to modify is an input changing one of the physical devices in the configuration.

20. The method of claim 1 wherein during the step of modifying the configuration
the input to modify is an input adding a new workload to the configuration.

21. The method of claim 1 wherein during the step of modifying the configuration
the input to modify in an input deleting one of the workloads from the configuration.

22. The method of claim 1 wherein during the step of modifying the configuration
the input to modify is an input changing one of the workloads in the configuration.

23. The method of claim 1 wherein the users of the computer system which contribute to the workloads are organized into user groups
the method further includes the steps of:
representing the user groups as entries in a user group data structure; and
relating each of the entries in the user group data structure to corresponding workloads.

24. The method of claim 1 wherein selected server ones of the physical devices in the computer system are capable of providing facilitated access to other source ones of the physical devices and
the method further comprises the steps of:
representing as entries in an access data structure the selected server and source physical devices, and
associating the entries in the access data structure information to the corresponding physical devices.

25. A computer system, comprising:
a plurality of physical devices supporting a plurality of workloads;
a modeling data processor;
means, coupled to said modeling data processor, for storing a data structure, said data structure including:
a plurality of first data entries each corresponding to different physical devices of the computer system, the first entries including:
device id means for identifying a corresponding physical device; and
device data structure means for indicating a hierarchical relationship in the computer system configuration of the corresponding device with selected other ones of the physical devices; and
a plurality of second data entries each corresponding to one of the workloads which the devices in the computer system support by supplying system resources to the workloads, each of the second entries including:
workload pointer means for identifying a corresponding workload;
device pointer means for associating the corresponding workload with the ones of the devices supporting the corresponding workload; and
probability means for quantifying the system resources supplied to the corresponding workload by the associated one of the physical devices.

26. The computer system of claim 25 wherein the users of the computer system which create the workloads are organized into user groups and
the data structure further comprises:
fourth entries including:

user groups id means for identifying a corresponding one of the user groups, and user group workload id means for indicating t he associated ones of the workloads contributed to by the corresponding user group.

27. The computer system of claim 26 wherein the fourth entries include:

user group probability entries each corresponding to a different one of the associated workloads and containing the user group workload id means, and user group branching probability means for specifying the fraction of resources required by an associated workload which is generated by the corresponding user group.

28. The computer system of claim 27 wherein the fourth entries each include:

user group entries containing the user group id means, and pointers to the user group probability entries for the corresponding user groups.

29. The computer system of claim 25 further including:

a third entries each corresponding to a different workload, each of the third entries including:

workload id means for identifying the corresponding workload;

branching id means for identifying at least one of the second entries; and workload metrics means for listing values for certain parameters for the corresponding workload.

30. The computer system of claim 29 wherein the third entries also include:

statistics id means containing values for metrics for the corresponding workload, with said metrics including measurable values representative of the performance characteristics of the computer system.

31. The computer system of claim 29 wherein each of the second data entries is associated with one of the third entries which corresponds to the same workload that the second entry corresponds to and the workload metrics in each of the third entries each include:

means for indicating an amount of the system resources of the computer system required by a corresponding workload, and wherein the probability means in each of the second entries includes:

branching probability means for specifying the fraction of the computer system resources which is supplied by each one of the associated physical devices for the corresponding workload.

32. The computer system of claim 25 further including:

a model data entry for each model, the model data entries including:

model id means for identifying the corresponding model, device data structure means for identifying the first data structure, workload data structure means for identifying the second data structure, configuration means for identifying a configuration of the model.

33. The computer system of claim 32 wherein the model data entries also include:

means for identifying the location on a visual display of selected ones of the devices and workloads of the model.

34. The computer system of claim 32 wherein the model data entries each include:

means for indicating whether the corresponding model has been modified.

35. The computer system of claim 25 wherein selected ones of the physical devices are organized to provide facilitated access between the selected physical devices and the data structures also comprises:

a plurality of fifth data entries including:

means for representing the selected physical devices as entries in an access data structure, means for describing the organization of the selected physical devices, and means for identifying corresponding ones of the first entries.

36. The computer system of claim 35 wherein the first data entries include:

access structure pointers identifying corresponding ones of the fifth data entries.

37. The computer system of claim 25 wherein the first data entries further include:

statistics id means containing values for metrics for the corresponding device, metrics including measurable values representative of the performance of the computer system.

38. The computer system of claim 37 wherein the statistics id means further includes:

at least one statistics block, each at least one statistics block corresponding to a different one of the workloads supported by the corresponding device and containing values for the metrics associated with the corresponding one of the workloads.

39. The computer system of claim 25 wherein the first data entries further include:

library pointer means for identifying a library containing parameters for the corresponding device.

40. The computer system of claim 25 wherein the first data entries also include;

workload pointer means for identifying the workloads supported by the corresponding device.

41. The computer system of claim 25 wherein the first data entries also include;

element type means for identifying the type of the corresponding device.

42. The computer system of claim 25 wherein the first data entries are organized into a tree data structure; and the device data structure means in each of the first data entries includes:

tree structure means for identifying the ones of the first data entries having a direct tree structure relationship with the corresponding first data entry.

43. The computer system of claim 25 wherein each of the second entries further include:

means for indicating a hierarchical relationship among the third entries reflective of the hierarchical relationship of the physical devices.

44. A modeling system for facilitating analysis of a computer system, the modeling system comprising:

data structure means for holding physical device information and workload information, both representative of a configuration of the computer system, and metrics information representative of a performance characteristic of the computer system, the data structure means including configuration context means for storing the physical device information and the workload information;

change means, coupled to the data structure means, for receiving requests to modify the physical device information, the change means including data structure modification means for transmitting to the data structure means, in response to the received requests, commands to modify the representation of the computer system configuration;

solver means, coupled to the data structure means, for determining values for metrics information for the computer system from the physical device information and the workload information in the data structure means; and user interface means, coupled to the change means and to the data structure means, for providing an interface to a user of the modeling system, the user interface means including means for transmitting to the change means the requests to modify the physical device information made by a user, and means for displaying a diagram of the configuration of the computer system, including values for the metrics information.

45. The modeling system of claim 44 wherein the data structure means includes display context means for storing display information, and wherein the user interface means includes display logic means for accessing the display context means to obtain the display information.

46. The modeling system of claim 44 wherein the modeling system is coupled to an external storage system for maintaining a copy of data representing the configuration of the computer system, and wherein the modeling system also includes parser means for providing an interface between the external storage system and the physical device information and workload information stored in the data structure means.

47. The modeling system of claim 44 wherein the configuration context means includes metrics means for storing the values for the metrics.

* * * * *